US012724510B2

(12) United States Patent
Luo

(10) Patent No.: US 12,724,510 B2
(45) Date of Patent: Sep. 1, 2026

(54) TOUCH AND DISPLAY DRIVER INTEGRATION CHIP, DISPLAY PANEL AND DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventor: Hongqiang Luo, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 19/110,870

(22) PCT Filed: May 15, 2024

(86) PCT No.: PCT/CN2024/093257

§ 371 (c)(1),
(2) Date: Mar. 12, 2025

(87) PCT Pub. No.: WO2024/260163

PCT Pub. Date: Dec. 26, 2024

(65) Prior Publication Data

US 2026/0086669 A1 Mar. 26, 2026

(30) Foreign Application Priority Data

Jun. 21, 2023 (CN) ........................ 202310745495.X

(51) Int. Cl.
*G06F 3/041* (2006.01)
*G06F 3/044* (2006.01)

(52) U.S. Cl.
CPC ........ *G06F 3/04164* (2019.05); *G06F 3/0446* (2019.05); *G06F 2203/04107* (2013.01)

(58) Field of Classification Search
None
See application file for complete search history.

(56) References Cited

U.S. PATENT DOCUMENTS 12,307,042 B2 * 5/2025 Shi ........................ G02F 1/1333
2020/0355972 A1 * 11/2020 Jian ........................ G02F 1/1368
(Continued)

FOREIGN PATENT DOCUMENTS

CN 109426387 A * 3/2019
CN 112201155 A 1/2021
(Continued)

*Primary Examiner* — Krishna P Neupane
(74) *Attorney, Agent, or Firm* — The Webb Law Firm

(57) ABSTRACT

A touch and display driver integration chip has a first output region including a first connection region, a second connection region and a third connection region arranged in sequence along a first direction parallel to a length direction of the chip. The chip includes first connection blocks arranged in the first output region. The first connection blocks are arranged in multiple columns, with a column direction intersecting the first direction, an included angle formed by the two directions being greater than or equal to 60° and less than or equal to 90°. The first connection blocks include first touch connection blocks and data connection blocks. The first touch connection blocks are divided into two groups respectively in the first and third connection regions, and are configured to output first touch signals. The data connection blocks are arranged in the second connection region, and are configured to output data signals.

20 Claims, 23 Drawing Sheets

(56) References Cited

U.S. PATENT DOCUMENTS

| | | | | |
|---|---|---|---|---|
| 2021/0011325 | A1* | 1/2021 | Yeh | G02F 1/13454 |
| 2021/0271143 | A1* | 9/2021 | Yang | H10K 59/131 |

FOREIGN PATENT DOCUMENTS

| | | | |
|---|---|---|---|
| CN | 113380864 | A | 9/2021 |
| CN | 114721546 | A | 7/2022 |
| CN | 114973995 | A | 8/2022 |
| CN | 115699136 | A | 2/2023 |
| CN | 116126166 | A | 5/2023 |
| KR | 2020220000573 | U | 3/2022 |

* cited by examiner

TOUCH AND DISPLAY DRIVER INTEGRATION CHIP, DISPLAY PANEL AND DISPLAY DEVICE

CROSS-REFERENCE TO RELATED APPLICATIONS

This application is the United States national phase of International Patent Application No. PCT/CN2024/093257, filed May 15, 2024, and claims priority to Chinese Patent Application No. 202310745495.X, filed Jun. 21, 2023, the disclosures of which are hereby incorporated by reference in their entireties.

BACKGROUND OF THE INVENTION

Field of the Invention

The present disclosure relates to the field of display technologies, and in particular, to a touch and display driver integration chip, a display panel, and a display device.

Description of Related Art

TDDI (Touch and Display Driver Integration) products, with the advantages of high touch sensitivity, light and thinness, are widely used. With the continuous development of display technologies, touch display devices have been widely used. Usually, a touch panel and a display panel in a touch display device are independently controlled by two chips, leading to a low integration degree.

SUMMARY OF THE INVENTION

In an aspect, a touch and display driver integration chip is provided. The touch and display driver integration chip has a first output region. The first output region includes a first connection region, a second connection region and a third connection region arranged in sequence along a first direction and in a direction from a right end to a left end of the touch and display driver integration chip, the first direction being parallel to a length direction of the touch and display driver integration chip.

The touch and display driver integration chip includes a plurality of first connection blocks arranged in the first output region. The plurality of first connection blocks are arranged in multiple columns, with a column direction intersecting the first direction, an included angle formed by the column direction and the first direction being greater than or equal to 60° and less than or equal to 90°.

The plurality of first connection blocks include a plurality of first touch connection blocks and a plurality of data connection blocks. The plurality of first touch connection blocks are divided into two groups respectively arranged in the first connection region and the third connection region. The first touch connection blocks are configured to output first touch signals. The plurality of data connection blocks are arranged in the second connection region. The data connection blocks are configured to output data signals required for displaying an image.

In some embodiments, the plurality of first connection blocks are arranged in N rows along the column direction, N≥3.

In some embodiments, the first output region further includes a fourth connection region and a fifth connection region. Along the first direction, the fourth connection region and the fifth connection region are respectively located at both sides of the second connection region. The plurality of first connection blocks further includes a plurality of second touch connection blocks, divided into two groups that are respectively arranged in the fourth connection region and the fifth connection region. The second touch connection blocks are configured to output second touch signals.

In some embodiments, the first output region further includes a fourth connection region and a fifth connection region. Along the first direction, the fourth connection region and the fifth connection region are respectively located at both sides of the second connection region. The plurality of first connection blocks further include a plurality of second touch connection blocks, divided into two groups that are respectively arranged in the fourth connection region and the fifth connection region. The second touch connection blocks are configured to output no touch signal.

In some embodiments, the fourth connection region is located between the first connection region and the second connection region, and the fifth connection region is located between the second connection region and the third connection region.

In some embodiments, the touch and display driver integration chip further includes two second output regions respectively located at the left end and the right end of the touch and display driver integration chip. The touch and display driver integration chip further includes a plurality of second connection blocks, divided into two groups that are respectively arranged in the two second output regions. The second connection blocks are configured to output second touch signals, or configured to output no touch signal. In a case where the touch and display driver integration chip includes the plurality of second connection blocks and further includes a plurality of second touch connection blocks, at least one of a second touch connection block and a second connection block is configured to output a second touch signal.

In some embodiments, in each of the second output regions, multiple second connection blocks are arranged in at least one column along a second direction. The second direction is perpendicular to the first direction, or an included angle between the second direction and the first direction is an acute angle. In a case where the multiple second connection blocks are arranged in multiple columns along the second direction, the multiple columns of second connection blocks are arranged in parallel and at intervals along the first direction.

In some embodiments, two adjacent second connection blocks in a same column have a spacing therebetween, and two adjacent columns of second connection blocks are staggered in the first direction.

In some embodiments, a number of the plurality of first touch connection blocks is P, P≥3; and the plurality of first touch connection blocks are numbered in sequence as a first touch connection block (1), a first touch connection block (2), . . . , a first touch connection block (P), and are configured to respectively output the first touch signals to P first touch channels of a display panel electrically connected to the touch and display driver integration chip. Each column of first touch connection blocks includes N first touch connection blocks with consecutive serial numbers.

The first touch connection block (1) to a first touch connection block (P−x) are arranged in the first connection region, 1≤x<x+1≤P; and along a direction from the right end of the touch and display driver integration chip to a center of the touch and display driver integration chip, serial numbers of first touch connection blocks in each row become larger in sequence and are of an arithmetic progression with a difference of N.

A first touch connection block (P−x+1) to the first touch connection block (P) are arranged in the third connection region; and along a direction from the left end of the touch and display driver integration chip to the center of the touch and display driver integration chip, serial numbers of first touch connection blocks in each row become larger in sequence and are of an arithmetic progression with a difference of N.

In some embodiments, a number of the plurality of first touch connection blocks is N×P, P≥3, and the plurality of first touch connection blocks are arranged in N rows and P columns. P first touch connection blocks in each row are numbered in sequence as a first touch connection block (1), a first touch connection block (2), . . . , a first touch connection block (P). N first touch connection blocks in each column have a same serial number, and the P columns of first touch connection blocks are configured to respectively output the first touch signals to P first touch channels of a display panel electrically connected to the touch and display driver integration chip.

The first touch connection block (1) to a first touch connection block (P−x) are arranged in the first connection region, 1≤x<x+1≤P; and along a direction from the right end of the touch and display driver integration chip to a center of the touch and display driver integration chip, serial numbers of the first touch connection blocks become larger in sequence and are consecutive.

A first touch connection block (P−x+1) to the first touch connection block (P) are arranged in the third connection region; and along a direction from the left end of the touch and display driver integration chip to the center of the touch and display driver integration chip, serial numbers of the first touch connection blocks become larger in sequence and are consecutive.

In some embodiments, a number of the plurality of second touch connection blocks is Q, Q≥3; and the plurality of second touch connection blocks are numbered in sequence as a second touch connection block (1), a second touch connection block (2), . . . , a second touch connection block (Q), and are configured to respectively output the second touch signals to Q second touch channels of a display panel electrically connected to the touch and display driver integration chip. Each column of second touch connection blocks includes N second touch connection blocks with consecutive serial numbers.

The second touch connection block (1) to a second touch connection block (Q−y) are arranged in the fourth connection region, 1≤y<y+1≤Q; and along a direction from the right end of the touch and display driver integration chip to a center of the touch and display driver integration chip, serial numbers of second touch connection blocks in each row become larger in sequence and are of an arithmetic progression with a difference of N.

A second touch connection block (Q−y+1) to the second touch connection block (Q) are arranged in the fifth connection region; and along a direction from the left end of the touch and display driver integration chip to the center of the touch and display driver integration chip, serial numbers of second touch connection blocks in each row become smaller in sequence and are of an arithmetic progression with a difference of N.

In some embodiments, a number of the plurality of second touch connection blocks is N×Q, Q≥3, and the plurality of second touch connection blocks are arranged in N rows and Q columns; and Q second touch connection blocks in each row are numbered in sequence as a second touch connection block (1), a second touch connection block (2), . . . , a second touch connection block (Q). N second touch connection blocks in each column have a same serial number, and the Q columns of second touch connection blocks are configured to respectively output the second touch signals to Q second touch channels of a display panel electrically connected to the touch and display driver integration chip.

The second touch connection block (1) to a second touch connection block (Q−y) are arranged in the fourth connection region, 1≤y<y+1≤Q; and along a direction from the right end of the touch and display driver integration chip to a center of the touch and display driver integration chip, serial numbers of the second touch connection blocks become larger in sequence and are consecutive.

A second touch connection block (Q−y+1) to the second touch connection block (Q) are arranged in the fifth connection region; and along a direction from the left end of the touch and display driver integration chip to the center of the touch and display driver integration chip, serial numbers of the second touch connection blocks become smaller in sequence and are consecutive.

In some embodiments, a number of the plurality of second connection blocks is Q, Q≥3; and the plurality of second connection blocks are numbered in sequence as a second connection block (1), a second connection block (2), . . . , a second connection block (Q), and are configured to respectively output the second touch signals to Q second touch channels of a display panel electrically connected to the touch and display driver integration chip. The touch and display driver integration chip further has an input region, arranged opposite to the first output region.

The second connection block (1) to a second connection block (Q−y) are arranged in a second output region at the right end of the touch and display driver integration chip, 1≤y<y+1≤Q; and along the second direction and in a direction from the first output region to the input region, serial numbers of second connection blocks in each column become larger in sequence and are of an arithmetic progression.

A second connection block (Q−y+1) to the second connection block (Q) are arranged in a second output region at the left end of the touch and display driver integration chip; and along the second direction and in the direction from the first output region to the input region, serial numbers of second connection blocks in each column become smaller in sequence and are of an arithmetic progression.

In some embodiments, the plurality of first connection blocks further include a plurality of shielding connection blocks, configured to output shielding signals. The shielding connection blocks are located between first touch connection blocks and second touch connection blocks that are adjacent to each other.

In some embodiments, the first connection region and the fourth connection region are provided therebetween with N shielding connection blocks of the shielding connection blocks, and the third connection region and the fifth connection region are provided therebetween with N shielding connection blocks of the shielding connection blocks. In each row of first connection blocks, a first touch connection block and a second touch connection block that are adjacent to each other are provided therebetween with one of the shielding connection blocks.

In some embodiments, the first output region further includes a sixth connection region and a seventh connection region, the sixth connection region being located at a side of the first connection region away from the second connection region, and the seventh connection region being located at a side of the third connection region away from the second connection region.

The plurality of first connection blocks further include a plurality of display control connection blocks, a plurality of initialization connection blocks, and a plurality of groups of dummy connection blocks. The plurality of display control connection blocks are divided into two groups respectively arranged in the sixth connection region and the seventh connection region, and configured to output display control signals required for driving an image display. The plurality of initialization connection blocks are divided into two groups respectively arranged in the sixth connection region and the seventh connection region, and configured to output initialization signals required for driving the image display. Display control connection blocks in the sixth connection region and display control connection blocks in the seventh connection region are both farther away from a center of the touch and display driver integration chip relative to the initialization connection blocks.

The plurality of groups of dummy connection blocks are configured to output no signal. The display control connection blocks and the initialization connection blocks are provided therebetween with one of the groups of dummy connection blocks, the initialization connection blocks and the first touch connection blocks are provided therebetween with one of the groups of dummy connection blocks, and the second touch connection blocks and the data connection blocks are provided therebetween with one of the groups of dummy connection blocks.

In some embodiments, the plurality of first connection blocks include a first portion, a second portion and a third portion arranged in sequence in the direction from the right end to the left end of the touch and display driver integration chip. The first portion extends along a first set direction, the first set direction intersecting the length direction of the touch and display driver integration chip; the second portion extends along a second set direction, the second set direction being perpendicular to the length direction of the touch and display driver integration chip; and the third portion extends along a third set direction, the third set direction intersecting the length direction of the touch and display driver integration chip. The first set direction and the third set direction are symmetrical about the second set direction.

In some embodiments, the plurality of second connection blocks include a first group and a second group respectively arranged in the two second output regions. The first group extends along a fourth set direction, the fourth set direction intersecting the first direction; and the second group extends along a fifth set direction, the fifth set direction intersecting the first direction. In a case where the second direction is perpendicular to the first direction, the fourth set direction and the fifth set direction are symmetrical about the second direction.

In another aspect, a display panel is provided. A display surface of the display panel includes: a display region, a first frame region and a second frame region respectively located at two opposite sides of the display region in a first direction, a third frame region and a fourth frame region respectively located at two opposite sides of the display region in a second direction, and a first bonding region located at a non-display surface of the display panel opposite to the display surface, the first bonding region and the fourth frame region being arranged on a same side of the display panel. The first direction is perpendicular to the second direction. The first bonding region includes a first pin region, a second pin region and a third pin region arranged in sequence along the first direction and in a direction from the first frame region to the second frame region.

The display panel includes a touch structure, a plurality of first touch leads, and a plurality of first pins. The touch structure is arranged in the display region. The plurality of first touch leads are connected to the touch structure. The plurality of first touch leads are divided into two groups respectively leading from the first frame region and the second frame region, and respectively extending to the first pin region and the third pin region. The plurality of first pins are arranged in the first bonding region, and the plurality of first pins are arranged in multiple columns, with a column direction intersecting the first direction, an included angle formed by the column direction and the first direction being greater than or equal to 60° and less than or equal to 90°.

The plurality of first pins includes a plurality of first touch pins and a plurality of data pins. The plurality of first touch pins are divided into two groups respectively arranged in the first pin region and the third pin region, and are respectively connected to the two groups of first touch leads. The first touch pins are configured to receive first touch signals and transmit the first touch signals to touch electrodes of the touch structure through the first touch leads. The plurality of data pins are arranged in the second pin region, and are configured to receive data signals required for displaying an image and transmit the data signals to pixels of the display panel.

In some embodiments, the plurality of first pins are arranged in N rows along the column direction, $N \geq 3$.

In some embodiments, the first bonding region further includes a fourth pin region and a fifth pin region. Along the first direction, the fourth pin region and the fifth pin region are respectively located at both sides of the second pin region. The display panel further includes a plurality of second touch leads. The plurality of second touch leads are connected to the touch structure. The plurality of second touch leads lead from the fourth frame region, and are divided into two groups respectively extending to the fourth pin region and the fifth pin region. The plurality of first pins further include a plurality of second touch pins, configured to receive second touch signals and transmit the second touch signals to touch electrodes of the touch structure through the second touch leads. The plurality of second touch pins are divided into two groups respectively arranged in the fourth pin region and the fifth pin region, and are respectively connected to the two groups of second touch leads.

In some embodiments, the first bonding region further includes a fourth pin region and a fifth pin region. Along the first direction, the fourth pin region and the fifth pin region are respectively located at both sides of the second pin region. The plurality of first pins further include a plurality of second touch pins, divided into two groups respectively arranged in the fourth pin region and the fifth pin region. The second touch pins are configured to be connected to no touch signal line.

In some embodiments, the fourth pin region is located between the first pin region and the second pin region, and the fifth pin region is located between the second pin region and the third pin region.

In some embodiments, the display panel further includes two second bonding regions, located at a side of the first bonding region away from the display region and arranged to be corresponding to both ends of the first bonding region, respectively. The display panel further includes a plurality of third touch leads and a plurality of second pins. The plurality of third touch leads are connected to the touch structure. The plurality of third touch leads lead from the third frame region, and are divided into two groups respectively passing through the first frame region and the second frame region, and respectively extending to the two second bonding regions. The plurality of second pins are divided into two groups respectively arranged in the two second bonding regions and respectively connected to the two groups of third touch leads. The second pins are configured to receive second touch signals and transmit the second touch signals to touch electrodes of the touch structure through the third touch leads.

In some embodiments, in each of the second bonding regions, multiple second pins are arranged in at least one column along the second direction. In a case where the multiple second pins are arranged in multiple columns along the second direction, the multiple columns of second pins are arranged in parallel and at intervals along the first direction.

In some embodiments, two adjacent second pins in a same column have a spacing therebetween, and two adjacent columns of second pins are staggered in the first direction.

In some embodiments, the touch structure includes P first touch channels arranged in parallel and at intervals along the second direction, P≥3, with each first touch channel extending along the first direction. A number of the plurality of first touch leads is P, and the plurality of first touch leads are respectively connected to the P first touch channels. A number of the plurality of first touch pins is P, and the plurality of first touch pins are respectively connected to the P first touch leads. The P first touch pins are numbered in sequence as a first touch pin (1), a first touch pin (2), . . . , a first touch pin (P).

The P first touch leads are divided into multiple sub-groups, with each sub-group including N first touch leads positioned adjacent to each other; a column of first touch pins includes N first touch pins, the N first touch leads of each sub-group are respectively connected to N first touch pins in one column, and serial numbers of N first touch pins in each column are consecutive.

The first touch pin (1) to a first touch pin (P−x) are arranged in the first pin region, 1≤x<x+1≤P; and along a direction from the first frame region to a reference midline, serial numbers of first touch pins in each row become larger in sequence and are of an arithmetic progression with a difference of N. A first touch pin (P−x+1) to the first touch pin (P) are arranged in the third pin region; and along a direction from the second frame region to the reference midline, serial numbers of first touch pins in each row become larger in sequence and are of an arithmetic progression with a difference of N. The reference midline is a midline of the display panel along the second direction.

In some embodiments, the touch structure includes P first touch channels arranged in parallel and at intervals along the second direction, P≥3, with each first touch channel extending along the first direction. A number of the plurality of first touch leads is P, and the plurality of first touch leads are respectively connected to the P first touch channels. A number of the plurality of first touch pins is N×P, P≥3, and the plurality of first touch pins are arranged in N rows and P columns. P first touch pins in each row are numbered in sequence as a first touch pin (1), a first touch pin (2), . . . , a first touch pin (P); and N first touch pins in each column have a same serial number, and the P columns of first touch pins are respectively connected to the P first touch leads.

The first touch pin (1) to a first touch pin (P−x) are arranged in the first pin region, 1≤x<x+1≤P; and along a direction from the first frame region to a reference midline, serial numbers of the first touch pins become larger in sequence and are consecutive.

A first touch pin (P−x+1) to the first touch pin (P) are arranged in the third pin region; and along a direction from the second frame region to the reference midline, serial numbers of the first touch pins become larger in sequence and are consecutive. The reference midline is a midline of the display panel along the second direction.

In some embodiments, along a direction from the third frame region to the fourth frame region, the P first touch channels are numbered in sequence as a first touch channel (1), a first touch channel (2), . . . , a first touch channel (P). According to the serial numbers of the first touch channels correspondingly connected to the first touch leads, the P first touch leads are numbered in sequence as a first touch lead (1), a first touch lead (2), . . . , a first touch lead (P).

The first touch lead (1) to a first touch lead (P−x) lead from the first frame region; and in a region in proximity to a side of the first bonding region proximate to the display region, serial numbers of the first touch leads become larger in sequence along the direction from the first frame region to the reference midline. A first touch lead (P−x+1) to the first touch lead (P) lead from the second frame region; and in the region in proximity to the side of the first bonding region proximate to the display region, serial numbers of the first touch leads become larger in sequence along the direction from the second frame region to the reference midline.

In some embodiments, the touch structure includes Q second touch channels arranged in parallel and at intervals along the first direction, Q≥3, with each second touch channel extending along the second direction. A number of the plurality of second touch leads is Q, and the plurality of second touch leads are respectively connected to the Q second touch channels. A number of the plurality of second touch pins is Q, and the plurality of second touch pins are respectively connected to the Q second touch leads; and the Q second touch pins are numbered in sequence as a second touch pin (1), a second touch pin (2), . . . , a second touch pin (Q).

The Q second touch leads are divided into multiple sub-groups, with each sub-group including N second touch leads positioned adjacent to each other; a column of second touch pins includes N second touch pins, the N second touch leads of each sub-group are respectively connected to N second touch pins in one column, and serial numbers of N second touch pins in each column are consecutive.

The second touch pin (1) to a second touch pin (Q−y) are arranged in the fourth pin region, 1≤y<y+1≤Q; and along a direction from the first frame region to a reference midline, serial numbers of second touch pins in each row become larger in sequence and are of an arithmetic progression with a difference of N. A second touch pin (Q−y+1) to the second touch pin (Q) are arranged in the fifth pin region; and along a direction from the second frame region to the reference midline, serial numbers of second touch pins in each row become smaller in sequence and are of an arithmetic progression with a difference of N. The reference midline is a midline of the display panel along the second direction.

In some embodiments, the touch structure includes Q second touch channels arranged in parallel and at intervals along the first direction, Q≥3, with each second touch channel extending along the second direction; and a number of the plurality of second touch leads is Q, and the plurality of second touch leads are respectively connected to the Q second touch channels. A number of the plurality of second touch pins is N×Q, Q≥3, and the plurality of second touch pins are arranged in N rows and Q columns; Q second touch pins in each row are numbered in sequence as a second touch pin (1), a second touch pin (2), . . . , a second touch pin (Q); and N second touch pins in each column have a same serial number, and the Q columns of second touch pins are respectively connected to the Q second touch leads.

The second touch pin (1) to a second touch pin (Q−y) are arranged in the fourth pin region, 1≤y<y+1≤Q; and along a direction from the first frame region to a reference midline, serial numbers of the second touch pins become larger in sequence and are consecutive. A second touch pin (Q−y+1) to the second touch pin (Q) are arranged in the fifth pin region; and along a direction from the second frame region to the reference midline, serial numbers of the second touch pins become smaller in sequence and are consecutive. The reference midline is a midline of the display panel along the second direction.

In some embodiments, along a direction from the first frame region to the second frame region, the Q second touch channels are numbered in sequence as a second touch channel (1), a second touch channel (2), . . . , a second touch channel (Q). According to the serial numbers of the second touch channels correspondingly connected to the second touch leads, the Q second touch leads are numbered in sequence as a second touch lead (1), a second touch lead (2), . . . , a second touch lead (Q).

The second touch lead (1) to a second touch lead (Q−y) lead from the fourth frame region; and in a region in proximity to a side of the first bonding region proximate to the display region, serial numbers of the second touch leads become larger in sequence along the direction from the first frame region to the reference midline. A second touch lead (Q−y+1) to the second touch lead (Q) lead from the fourth frame region; and in the region in proximity to the side of the first bonding region proximate to the display region, serial numbers of the second touch leads become smaller in sequence along the direction from the second frame region to the reference midline.

In some embodiments, the touch structure includes Q second touch channels arranged in parallel and at intervals along the first direction, Q≥3, with each second touch channel extending along the second direction; and a number of the plurality of third touch leads is Q, and the plurality of third touch leads are respectively connected to the Q second touch channels.

A number of the plurality of second pins is Q, and the plurality of second pins are respectively connected to the Q third touch leads, and the Q second pins are numbered in sequence as a second pin (1), a second pin (2), . . . , a second pin (Q). The two second bonding regions are respectively a second bonding region (A) and a second bonding region (B), the second bonding region (A) being located at a side of a reference midline proximate to the first frame region, and the second bonding region (B) being located at a side of the reference midline proximate to the second frame region. The reference midline is a midline of the display panel along the second direction.

The second pin (1) to a second pin (Q−y) are arranged in the second bonding region (A), 1≤y<y+1≤Q; and along the second direction and in a direction from the third frame region to the fourth frame region, serial numbers of second pins in each column become larger in sequence and are of an arithmetic progression. A second pin (Q−y+1) to the second pin (Q) are arranged in the second bonding region (B); and along the second direction and in the direction from the third frame region to the fourth frame region, serial numbers of second pins in each column become smaller in sequence and are of an arithmetic progression.

In some embodiments, along a direction from the first frame region to the second frame region, the Q second touch channels are numbered in sequence as a second touch channel (1), a second touch channel (2), . . . , a second touch channel (Q). According to the serial numbers of the third touch channels correspondingly connected to the second touch leads, the Q third touch leads are numbered in sequence as a third touch lead (1), a third touch lead (2), . . . , a third touch lead (Q).

The third touch lead (1) to a third touch lead (Q−y) lead from the third frame region and extend toward the first frame region; and in a region in proximity to a side of the second bonding region (A) away from the first bonding region, serial numbers of the third touch leads become smaller in sequence along the first direction and in the direction from the first frame region to the second frame region.

A third touch lead (Q−y+1) to the third touch lead (Q) lead from the third frame region and extend toward the second frame region; and in a region in proximity to a side of the second bonding region (B) away from the first bonding region, serial numbers of the third touch leads become larger in sequence along the first direction and in a direction from the second frame region to the first frame region.

In some embodiments, the display panel further includes a plurality of fourth touch leads, connected to the touch structure. The plurality of fourth touch leads lead from the third frame region, and are divided into two groups respectively passing through the first frame region and the second frame region, and respectively extending to the fourth pin region and the fifth pin region. Each fourth touch lead has one end connected to one of the second touch channels, and the other end connected to one column of second touch pins.

In some embodiments, part of the plurality of first touch leads are each connected to a corresponding first touch pin through a gap between first pins arranged adjacent to each other along the first direction, and a line width of a portion of the first touch lead located in the gap is less than a line width of a portion thereof located outside the first bonding region. Part of the plurality of second touch leads are each connected to a corresponding second touch pin through a gap between first pins arranged adjacent to each other along the first direction, and a line width of a portion of the second touch lead located in the gap is less than a line width of a portion thereof located outside the first bonding region.

In some embodiments, a first touch lead overlaps with all first touch pins in a corresponding column, and a line width of a portion of the first touch lead located in the first bonding region is equal to a line width of a portion thereof located outside the first bonding region. A second touch lead overlaps with all second touch pins in a corresponding column, and a line width of a portion of the second touch lead located in the first bonding region is equal to a line width of a portion thereof located outside the first bonding region.

In some embodiments, a line width of a first touch lead is greater than or equal to 10 μm, and a distance between two adjacent first touch leads is greater than or equal to 10 μm; and a line width of a second touch lead is greater than or equal to 10 μm, and a distance between two adjacent second touch leads is greater than or equal to 10 μm.

In some embodiments, the display panel further includes shielding lines, located between first touch leads and second touch leads that are adjacent to each other. The plurality of first pins further include a plurality of shielding pins, located between first touch pins and second touch pins that are adjacent to each other. A shielding pin is connected to a shielding line.

In some embodiments, the first pin region and the fourth pin region are provided therebetween with N shielding pins of the shielding pins, and third pin region and the fifth pin region are provided therebetween with N shielding pins of the shielding pins. In each row of first pins, a first touch pin and a second touch pin that are adjacent to each other are provided therebetween with one of the shielding pins.

In some embodiments, the first bonding region further includes a sixth pin region and a seventh pin region, the sixth pin region being located at a side of the first pin region away from the second pin region, and the seventh pin region being located at a side of the third pin region away from the second pin region.

The plurality of first pins further include a plurality of display control pins, a plurality of initialization pins, and a plurality of groups of dummy pins. The display control pins are configured to receive display control signals required for driving an image display and transmit the display control signals to the pixels of the display panel. The initialization pins are configured to receive initialization signals required for driving the image display and transmit the initialization signals to the pixels of the display panel. The plurality of groups of dummy pins are configured to be connected to no signal line.

The plurality of display control pins are divided into two groups that are respectively arranged in the sixth pin region and the seventh pin region. The plurality of initialization pins are divided into two groups respectively arranged in the sixth pin region and the seventh pin region. Display control pins in the sixth pin region and display control pins in the seventh pin region are both farther away from a reference midline relative to the initialization pins, the reference midline being a midline of the display panel along the second direction. The display control pins and the initialization pins are provided therebetween with one of the groups of dummy pins, the initialization pins and the first touch pins are provided therebetween with one of the groups of dummy pins, and the second touch pins and the data pins are provided therebetween with one of the groups of dummy pins.

In some embodiments, the plurality of first pins include a first portion, a second portion and a third portion arranged in sequence along the first direction. The first portion extends along a first set direction, the first set direction intersecting the first direction; the second portion extends along a second set direction, the second set direction being perpendicular to the first direction; and the third portion extends along a third set direction, the third set direction intersecting the first direction. The first set direction and the third set direction are symmetrical about the second direction.

In some embodiments, the plurality of second pins include a first group and a second group respectively arranged in the two second output regions. The first group extends along a fourth set direction, the fourth set direction intersecting the first direction; and the second group extends along a fifth set direction, the fifth set direction intersecting the first direction. The fourth set direction and the fifth set direction are symmetrical about the second direction.

In yet another aspect, a display device is provided. The display device includes the touch and display driver integration chip as described in any one of the above embodiments and the display panel as described in any one of the above embodiments. The plurality of first touch connection blocks of the touch and display driver integration chip are respectively connected to the plurality of first touch pins of the display panel, and the plurality of data connection blocks of the touch and display driver integration chip are respectively connected to the plurality of data pins of the display panel.

BRIEF DESCRIPTION OF THE DRAWINGS

In order to describe technical solutions in some embodiments of the present disclosure more clearly, the accompanying drawings to be used in some embodiments of the present disclosure will be introduced briefly; obviously, the accompanying drawings to be described below are merely some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DESCRIPTION OF THE INVENTION

Figure 1:
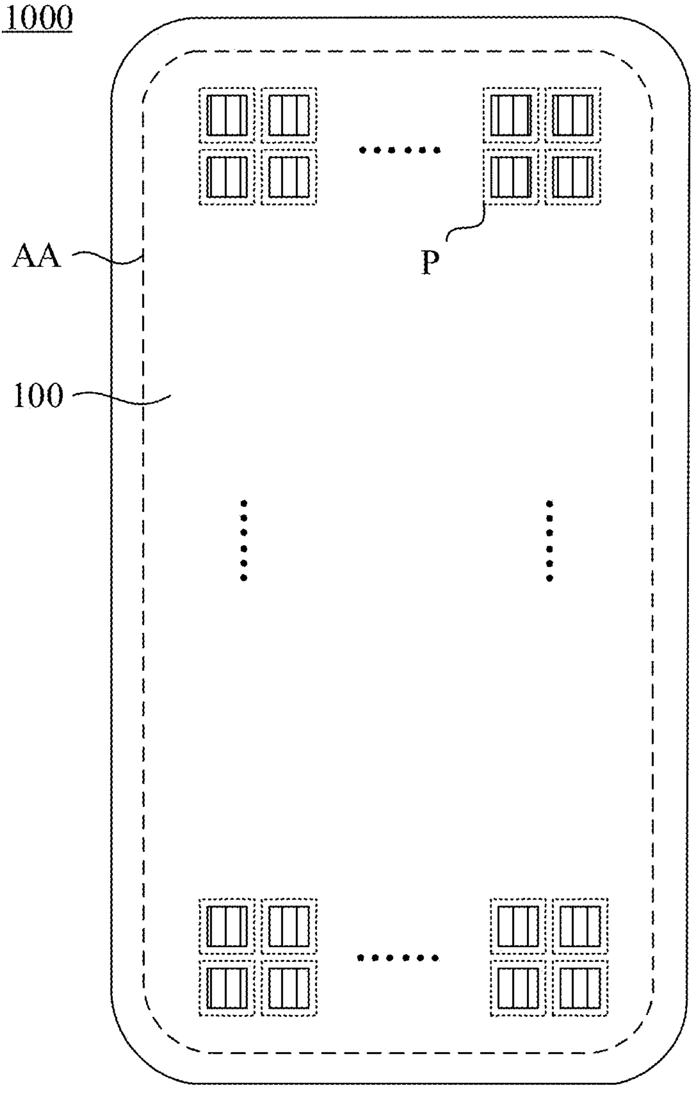
FIG. 1 is a plan view showing a structure of a display device, in accordance with some embodiments.

The technical solutions in some embodiments of the present disclosure will be described clearly and completely with reference to the accompanying drawings; obviously, the described embodiments are merely some but not all embodiments of the present disclosure. All other embodiments obtained by a person having ordinary skill in the art based on the embodiments of the present disclosure shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to." In the description of the specification, terms such as "one embodiment," "some embodiments," "exemplary embodiments," "example," "specific example" or "some examples" are intended to indicate that specific features, structures, materials or characteristics related to the embodiment(s) or example(s) are included in at least one embodiment or example of the present disclosure. Schematic representations of the above term do not necessarily refer to the same embodiment(s) or example(s). In addition, specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, features defined with "first" and "second" may explicitly or implicitly include one or more of the features. In the description of the embodiments of the present disclosure, the terms "a plurality of" and "multiple" each mean two or more unless otherwise specified.

Some embodiments may be described using the terms "coupled," "connected" and their derivatives. For example, the term "connected" may represent a fixed connection, or a detachable connection, or a one-piece connection; alternatively, the term "connected" may represent a direct connection, or an indirect connection through an intermediate medium. For example, the term "coupled" indicates that two or more components are in direct physical or electrical contact. The term "coupled" or "communicatively coupled" may also mean that two or more components are not in direct contact with each other but still cooperate or interact with each other. The embodiments disclosed herein are not necessarily limited to the context herein.

The phrase "at least one of A, B and C" has the same meaning as the phrase "at least one of A, B or C," both including the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The phrase "applicable to" or "configured to" as used herein indicates an open and inclusive expression, which does not exclude apparatuses that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

The term "about," "substantially," or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

The terms such as "parallel," "perpendicular" and "equal" as used herein each include a stated case and a case similar to the stated case within an acceptable range of deviation determined by a person of ordinary skill in the art, considering measurement in question and errors associated with measurement of a particular quantity (i.e., limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°; and the term "equal" includes absolute equality and approximate equality, and an acceptable range of deviation of the approximate equality may be, for example, a difference between two equals being less than or equal to 5% of either of the two equals.

It will be understood that, in a case where a layer or an element is referred to as being on another layer or a substrate, it may be that the layer or the element is directly on the another layer or the substrate, or there may be a middle layer between the layer or the element and the another layer or the substrate.

Exemplary embodiments are described herein with reference to sectional views and/or plan views that are schematic illustrations of idealized embodiments. In the accompanying drawings, thicknesses of layers and sizes of regions are enlarged for clarity. Variations in shape with respect to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown to have a rectangular shape generally has a feature being curved. Therefore, the regions shown in the accompanying drawings are schematic in nature, and their shapes are not intended to show actual shapes of the regions in a device, and are not intended to limit the scope of the exemplary embodiments.

Figures 2, 3:
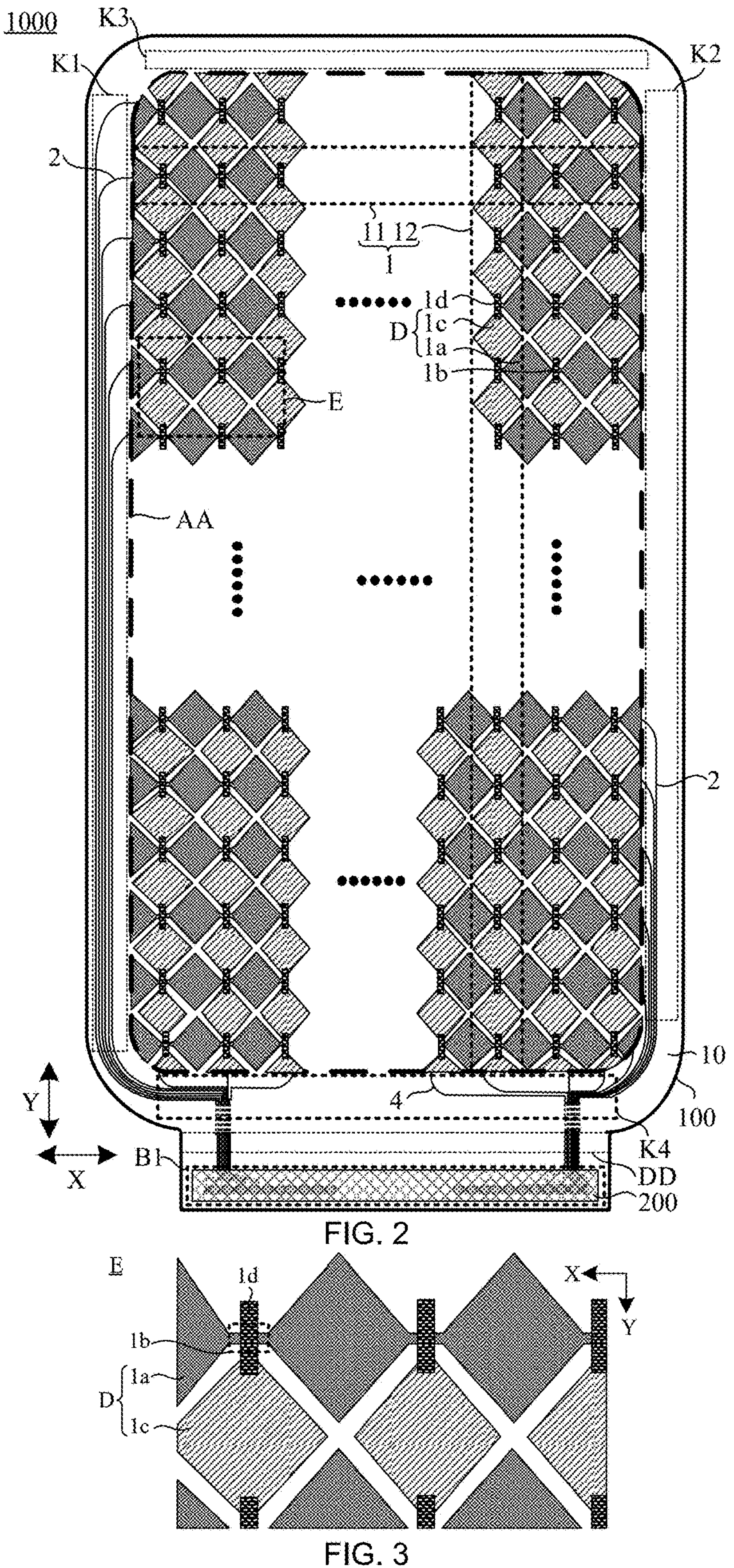
FIG. 2 is a schematic diagram showing the connection between a display panel and a touch and display driver integration chip in a display device, in accordance with some embodiments.
FIG. 3 is an enlarged view showing a structure of the region E, in accordance with FIG. 2.

In embodiments of the present disclosure, FIGS. 1 and 2 are each a plan view showing a structure of a display device 1000. In order to clearly describe the connection manner between a display panel 100 and a touch and display driver integration chip 200, a first bonding region B1 of the display panel 100 is depicted on the same side of a display region AA in FIG. 2, and it will be noted that in the display panel 100 formed finally, the first bonding region B1 is bent to the other side thereof.

Figure 6:
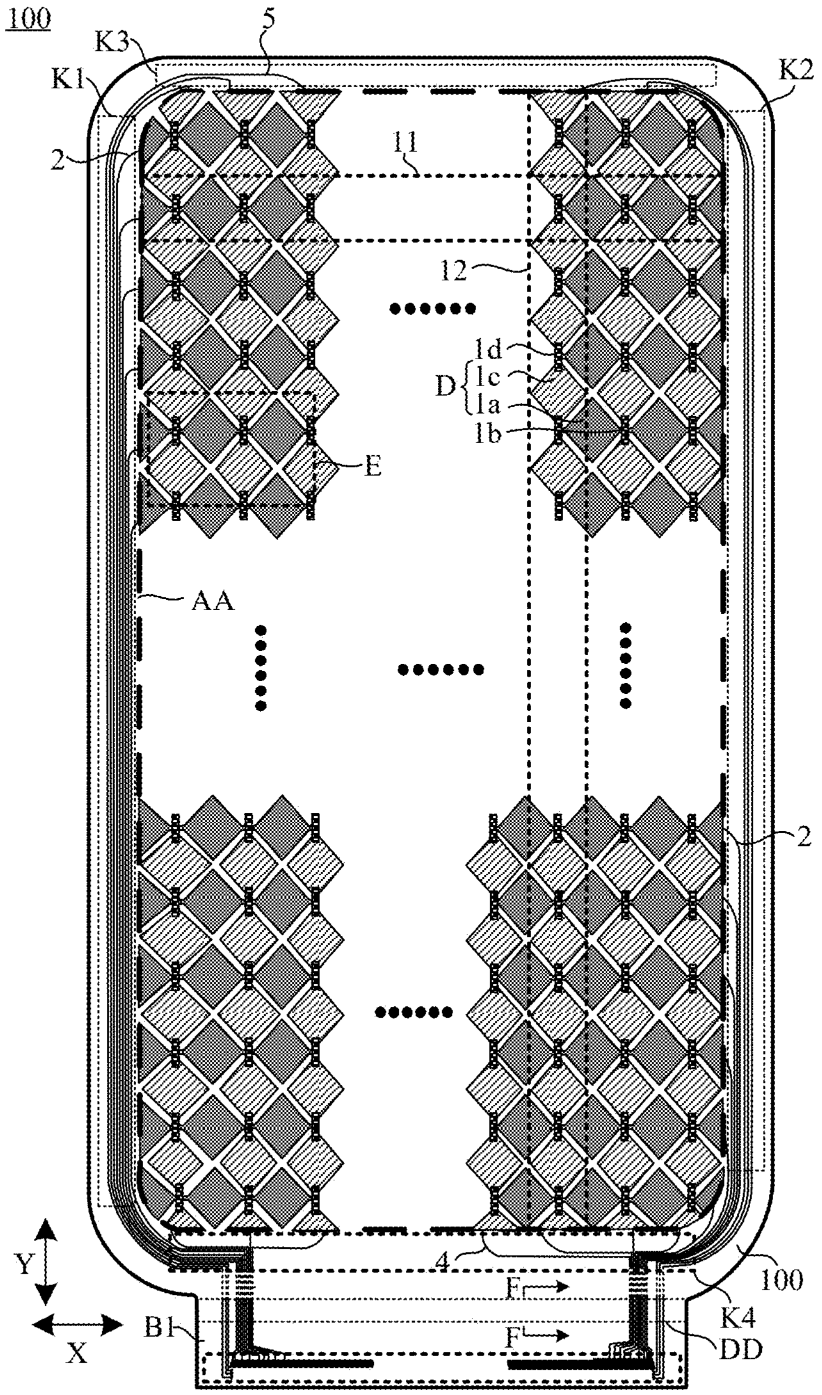
FIG. 6 is a plan view showing a structure of a display panel, in accordance with some embodiments.
Figure 7:
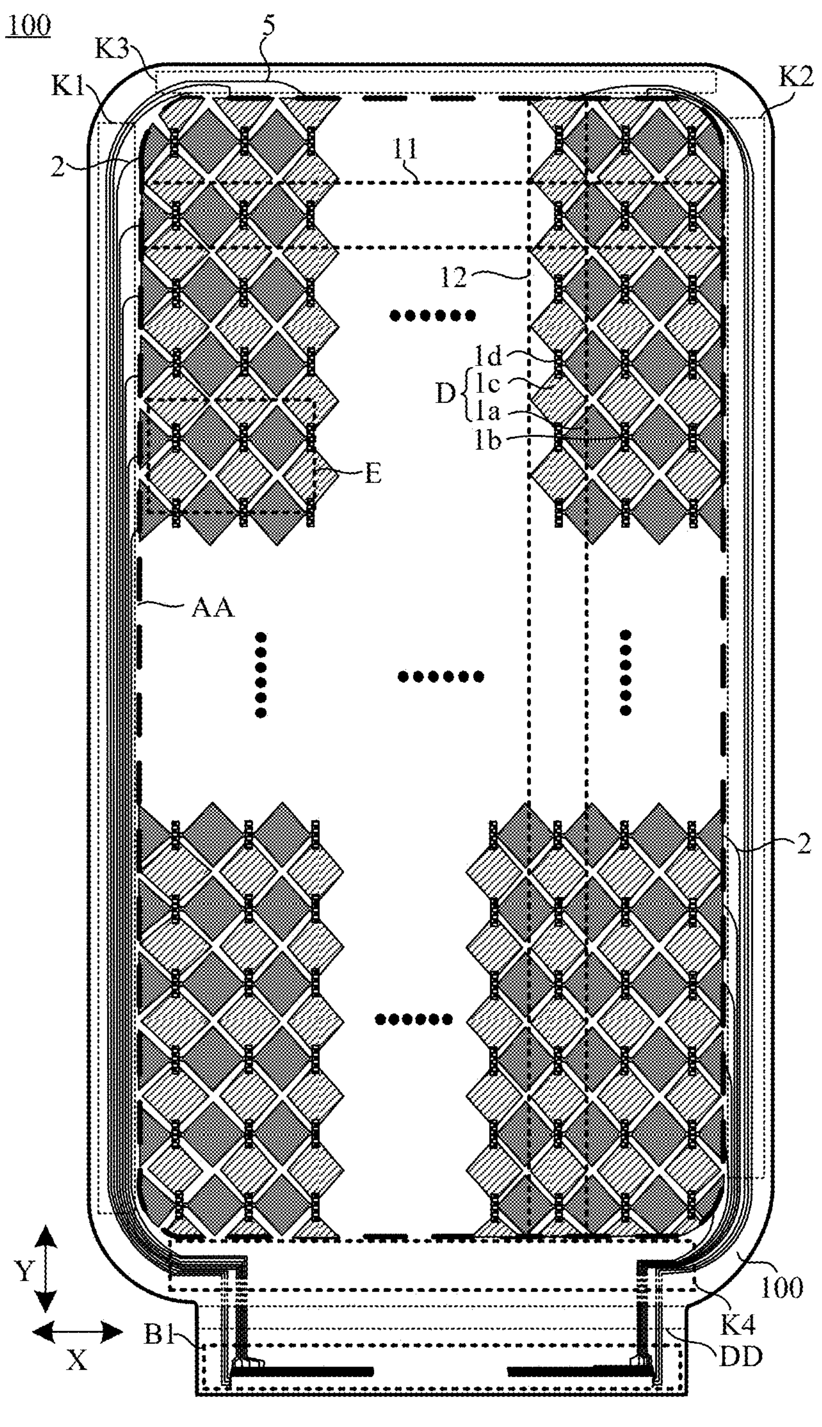
FIG. 7 is a plan view showing another structure of a display panel, in accordance with some embodiments.
Figure 40:
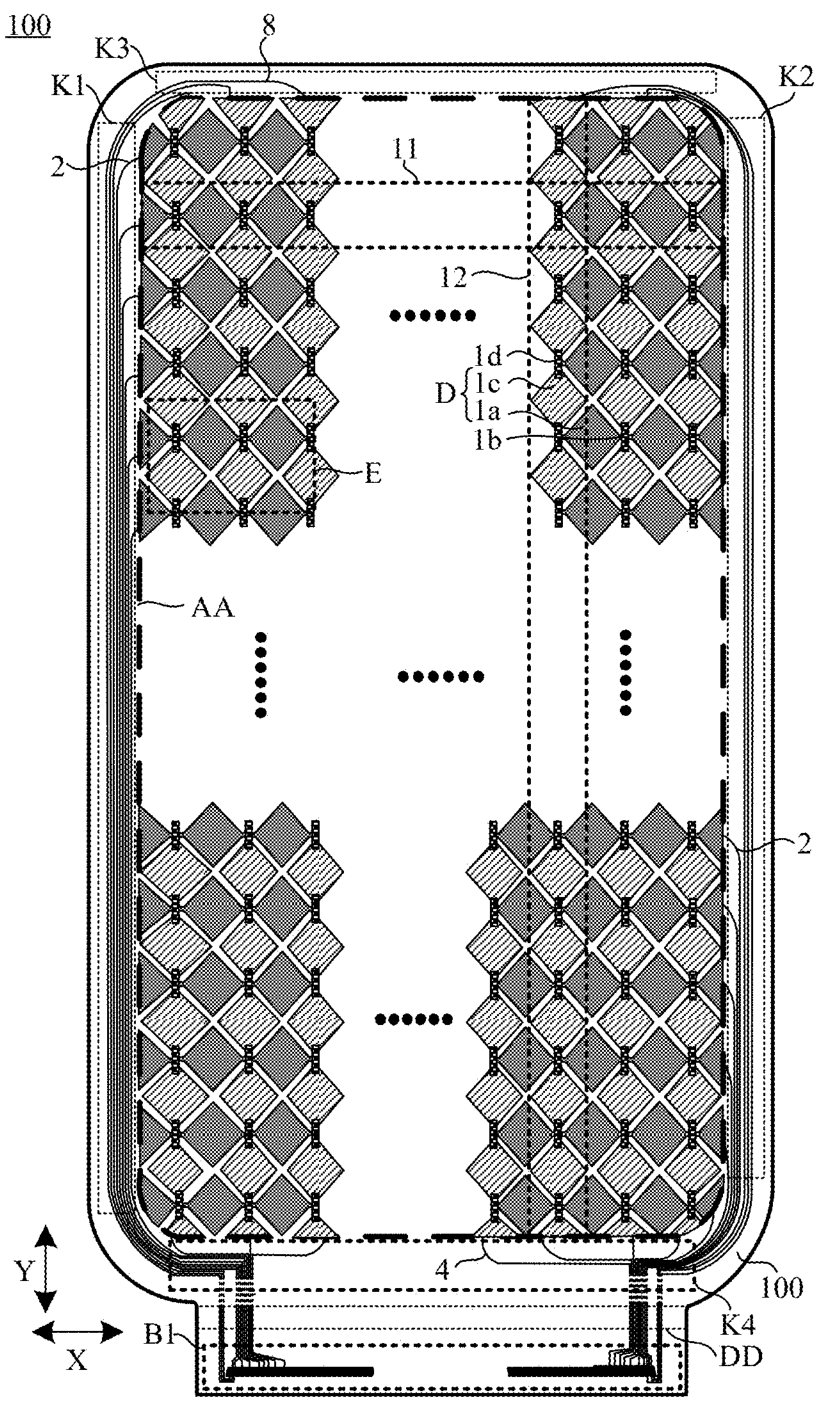
FIG. 40 is a plan view showing a structure of a display panel, in accordance with some embodiments.
Figure 41:
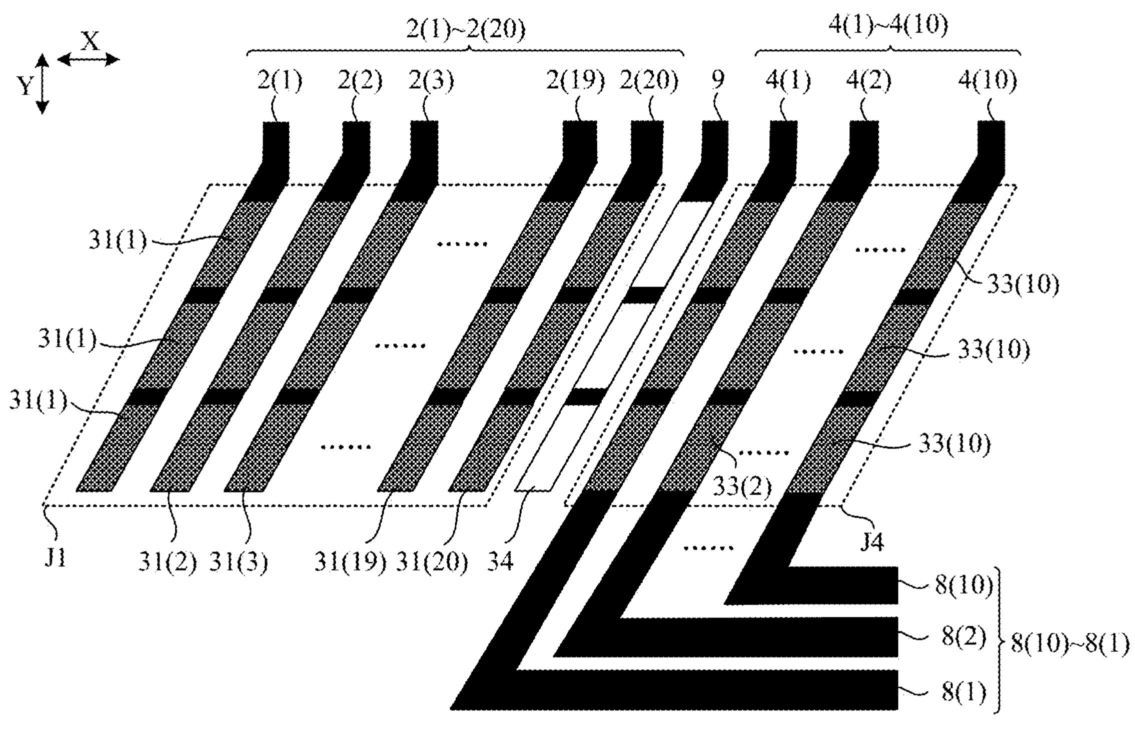
FIG. 41 is an enlarged view showing still yet another structure of the region M, in accordance with FIG. 4.
Figure 42:
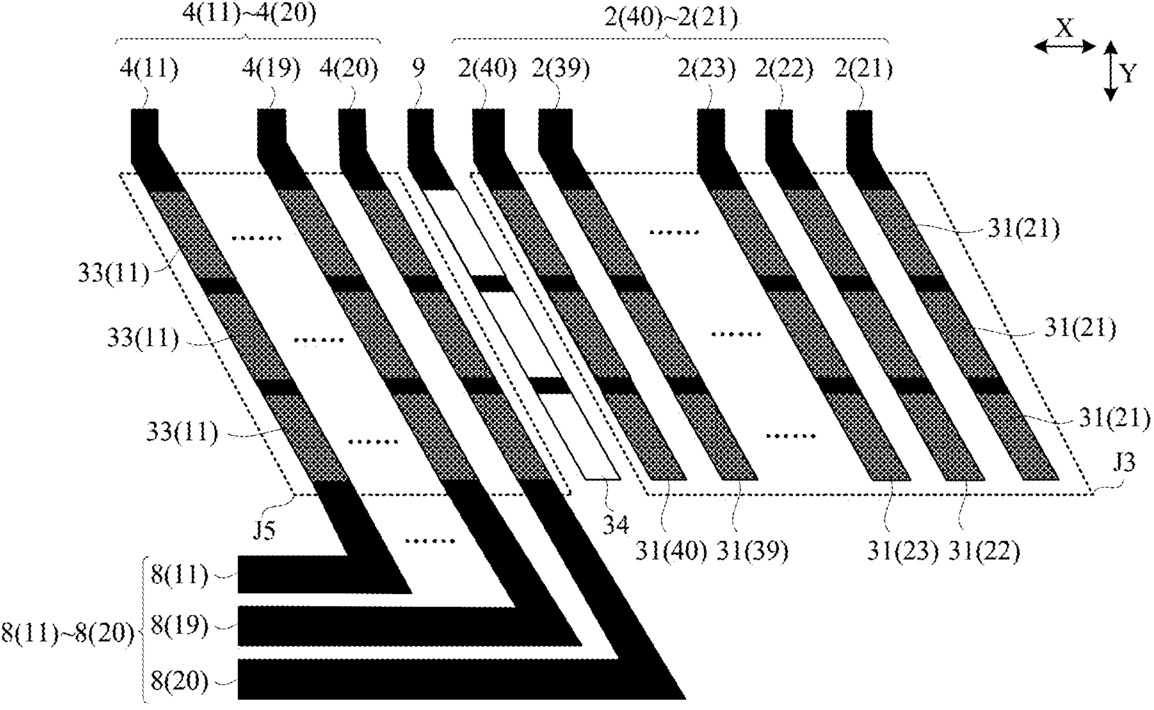
FIG. 42 is an enlarged view showing still yet another structure of the region N, in accordance with FIG. 4.

FIGS. 6, 7 and 40 are each a plan view showing a structure of a display device 100. In order to clearly describe the connection manner between touch leads CK in the display panel 100 and pins (e.g., first pins and second pins) within a first bonding region B1, the first bonding region B1 of the display panel 100 is depicted on the same side of a display region AA in these figures, and it will be noted that in the display panel 100 formed finally, the first bonding region B1 is bent to the other side thereof.

In order to clearly describe the details of a touch structure 1 of the display panel 100, only the touch structure 1 is shown in the enlarged view of FIG. 3 that illustrates the structure of a region E, and it can be understood that the region E of the display panel 100 may further include other structures in addition to the structure shown in this figure.

In order to clearly describe the arrangement of pins (e.g., first pins 3, second pins 6, etc.) in a first bonding region B1 of the display panel 100 that are used for connecting a driver chip, and the connection manner thereof to touch leads CK, only the touch leads CK and the pins connected to the driver chip are shown in FIGS. 8 to 19, 32 to 35, 41, and 42, and it can be understood that the first bonding region B1 of the display panel 100 may further include other structures in addition to the structure shown in these figures.

In order to clearly describe the arrangement of pins (e.g., second pins 6) in a first bonding region B2 of the display panel 100 that are used for connecting a driver chip, and the connection manner thereof to touch leads CK, only the touch leads CK and the pins connected to the driver chip are shown in FIGS. 36 to 39, and it can be understood that the second bonding region B2 of the display panel 100 may further include other structures in addition to the structure shown in these figures.

Figure 4:
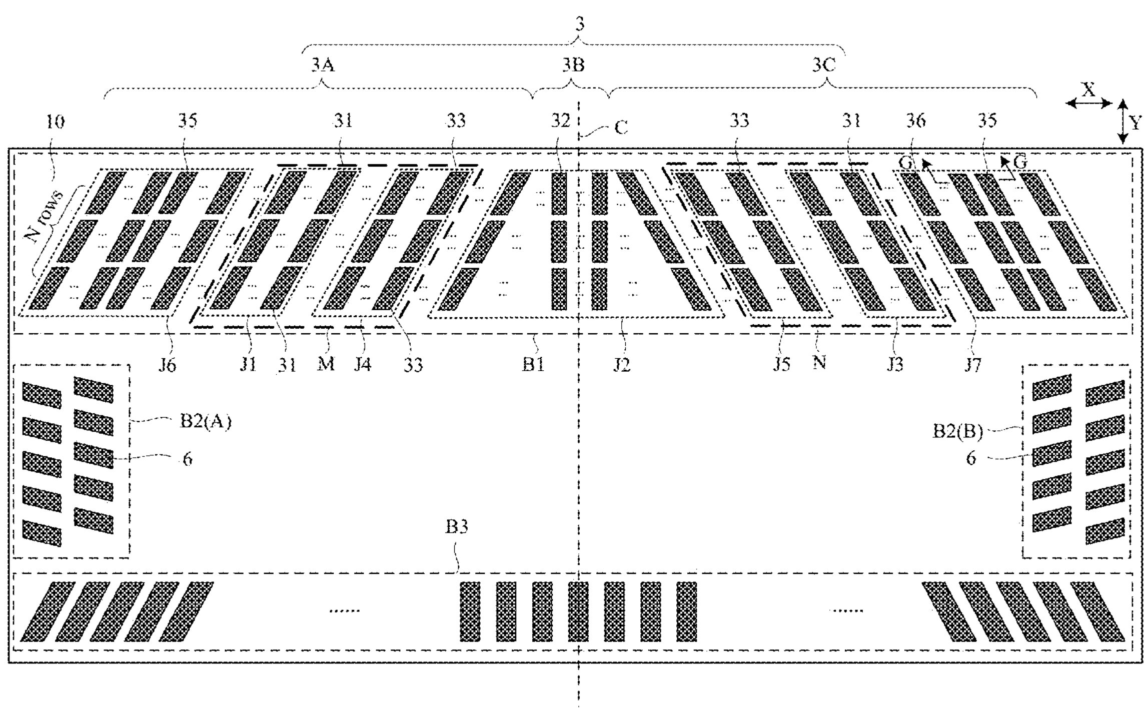
FIG. 4 is an enlarged view showing a structure of the first bonding region B1, in accordance with FIG. 2.

FIG. 4 is an enlarged view showing a structure of the first bonding region B1 of the display panel 100, which shows the extension direction and arrangement of some pins in the display panel 100 for connecting the driver chip. It can be understood that the number of pins in the display panel 100 for connecting the driver chip is not limited to that shown in this figure.

Figure 5:
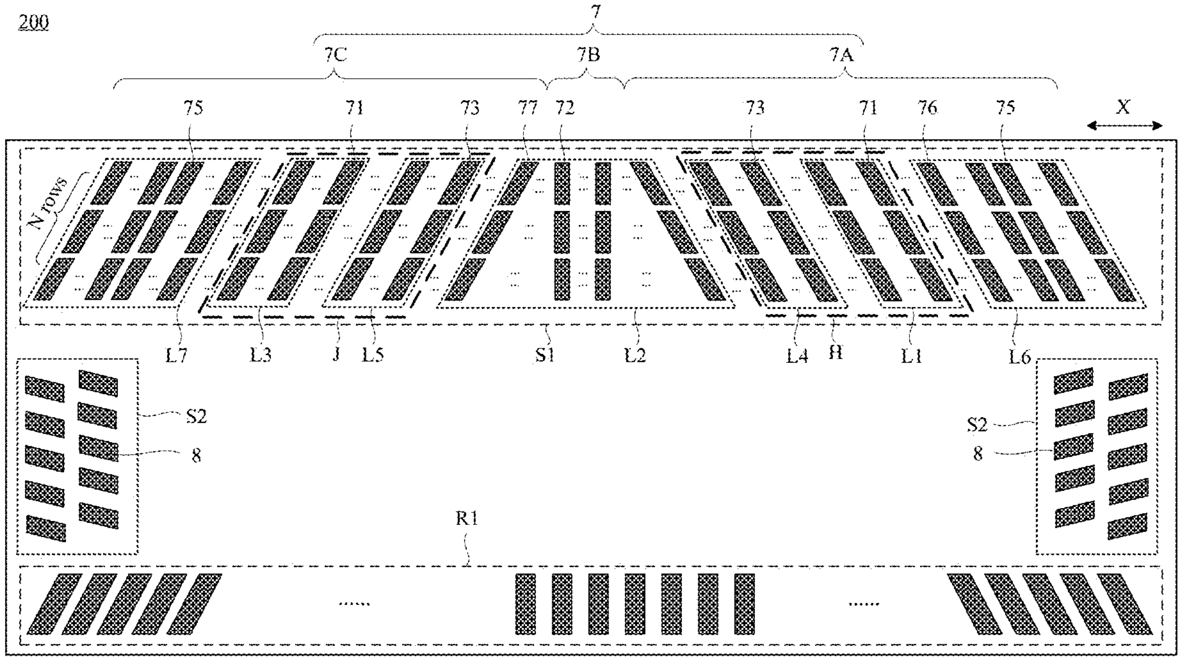
FIG. 5 is a plan view showing a structure of a touch and display driver integration chip, in accordance with some embodiments.

FIG. 5 is a plan view showing a structure of the touch and display driver integration chip 200, which shows the extension direction and arrangement of some connection blocks (e.g., first connection blocks 7 and second connection blocks 8) of the touch and display driver integration chip 200 that is used for connecting the display panel 100. It can be understood that in the touch and display driver integration chip 200, the number of connection blocks for connecting the display panel 100 is not limited to that shown in this figure.

In order to clearly describe the arrangement of the connection blocks in the touch and display driver integration chip 200 that are used for connecting the display panel 100, only first touch connection blocks 71, second touch connection blocks 73 and shielding connection blocks 74 are shown in FIGS. 20 to 31. It can be understood that the touch and display driver integration chip 200 may further include other structures in addition to the structures shown in these figures.

The present disclosure provides a display device 1000. In some embodiments, as shown in FIG. 1, the display device 1000 includes a display panel 100. The display panel 100 has a display region AA, and the display region AA of the display panel 100 is provided therein with a plurality of pixels.

For example, as shown in FIG. 1, each pixel includes sub-pixels P of at least three colors, and the sub-pixels P of at least three colors includes at least a sub-pixel of a first color, a sub-pixel of a second color, and a sub-pixel of a third color. Here, the first color, the second color and the third color are three-primary colors, such as R (Red), G (Green) and B (Blue).

For example, the display device 1000 may be a liquid crystal display (LCD) device, an electroluminescent display (ELD) device or a photoluminescent display (PLD) device.

In a case where the display device 1000 is an electroluminescent display device, the electroluminescent display device may be an organic electroluminescent display (e.g., organic light-emitting display, OLED for short) device or a quantum dot light-emitting display (QLED) display device.

In a case where the display panel 100 is a photoluminescent display screen, the photoluminescent display screen may be a quantum dot photoluminescent display screen.

The above-described display device 1000 may be any device that can display images whether in motion (e.g., videos) or stationary (e.g., static images), and whether textual or graphical. More specifically, it is expected that the embodiments may be implemented in or associated with a variety of electronic devices. The variety of electronic devices includes, but is not limited to, a mobile telephone, a wireless device, a personal data assistant (PDA), a handheld or portable computer, a GPS receiver/navigator, a camera, an MP4 video player, a video camera, a game console, a watch, a clock, a calculator, a TV monitor, a flat panel display, a computer monitor, a car display (e.g., an odometer display, etc.), a navigator, a cockpit controller and/or display, a camera view display (e.g., a rear view camera display in vehicles), an electronic photo, an electronic billboard or indicator, a projector, a building structure, a packaging and aesthetic structure (e.g., a display for an image of a piece of jewelry), etc.

The following embodiments of the present disclosure are described by taking an example that the display device 1000 is an electroluminescent display device, in which case the display panel 100 is an electroluminescent display panel.

In some embodiments, as shown in FIG. 2, the display device 1000 is, for example, a touch display device.

In some examples, the display device 1000 includes a display panel 100 and a touch structure 1. The display panel 100 includes a substrate 10. The touch structure 1 is disposed on the substrate 10 and is electrically connected to the display panel 100, and the touch structure 1 is disposed on a light exit side of the display panel 100.

The substrate 10 includes, but is not limited to, PI (Polyimide Film) or glass.

In this case, the display panel 100 can implement a display function, and a touch function of the display device 1000 is implemented by equipping the touch structure 1 on the display panel 100.

In some other examples, the display panel 100 includes a display substrate and a touch structure 1. The touch structure 1 is electrically connected to the display substrate, and the touch structure 1 is disposed on a light exit side of the display substrate. The display substrate is configured to implement a display function, and the touch structure 1 is configured to implement a touch function. In this case, the display panel 100 is a touch display panel, i.e., the display panel 100 itself can implement the display and touch control functions.

It is required for the display panel 100 to be connected to an external driving structure (e.g., a display driver chip, a touch driver chip, etc.), so as to obtain driving signals (e.g., display driving signal, touch driving signal, etc.), and thus implement the display and touch functions of the display panel 100.

In some embodiments, the display device 1000 further includes a display driver chip and a touch driver chip, in which the display driver chip is connected to data pins 32 of the display panel 100 and is configured to drive the display panel 100 to implement a display function, and the touch driver chip is connected to first touch pins 31 of the display panel 100 and is configured to drive the display panel 100 to implement a touch function. In this case, implementations of the display and touch functions of the display device 1000 are controlled by two chips respectively, causing the display device 1000 to have a low-level of integration.

In light of this, the embodiments of the present disclosure provide a touch and display driver integration chip 200. The touch and display driver integration chip 200 has a display driving function and a touch driving function. Upon connecting the touch and display driver integration chip 200 to the display panel 100 in correspondence, the touch and display driver integration chip 200 itself can drive the display panel 100 to implement the touch and display functions.

The following gives descriptions by taking an example that the display panel 100 is a touch display panel, to describe the display panel 100 and the touch and display driver integration chip 200, respectively.

In some embodiments, as shown in FIG. 2, the display device 1000 includes a display panel 100 and a touch and display driver integration chip 200, in which the display panel 100 is electrically connected to the touch and display driver integration chip 200.

For example, when a finger touches the display panel 100, the touch structure 1 will generate touch sensing signals (e.g., a first touch signal and a second touch signal) and transmit the signals to the touch and display driver integration chip 200.

For example, the touch and display driver integration chip 200 is configured to provide image display data (the image display data including a data voltage signal corresponding to each pixel in the display panel 100) to the display panel 100, enabling the display panel 100 to display an image. The touch and display driver integration chip 200 is further configured to: provide touch driving signals to the display panel 100 to perform touch driving on the touch structure 1, receive touch sensing signals fed back by the display panel 100, and determine a touch position (i.e., obtain a touch detection result) based on the received touch sensing signals, so as to implement touch detection.

The specific touch driving, touch detection, and display driving processes can be implemented based on the working processes of the existing touch driver chip and display driver chip, which will not be described in detail here.

In some embodiments, as shown in FIG. 2, the touch structure 1 includes a plurality of touch electrodes D disposed in the display region AA.

For example, the touch electrodes D are each configured to generate and transmit a touch sensing signal, and receive a touch driving signal.

For example, the touch electrode D generates a touch sensing signal when a finger touches the display panel 100, and transmits the touch sensing signal to the touch and display driver integration chip 200.

In some embodiments, the touch structure 1 may be a self-capacitive touch structure.

In some other embodiments, the touch structure 1 may be a mutual-capacitive touch structure.

For example, as shown in FIGS. 2 and 3, the plurality of touch electrodes D include a plurality of first touch electrodes **1*a* and a plurality of second touch electrodes 1*c*, in which the first touch electrodes 1*a* are electrically insulated from the second touch electrodes 1*c***.

In some examples, as shown in FIGS. 2 and 3, multiple first touch electrodes **1*a* are arranged at intervals along a first direction X, with any two adjacent first touch electrodes 1*a* being connected, for example, by one first connection portion 1*b*, and the multiple first touch electrodes 1*a* and multiple first connection portions 1*b* that are alternately arranged along the first direction X form one first touch channel 11. The touch structure 1 includes a plurality of first touch channels 11 arranged at intervals along a second direction Y, with each first touch channel 11** extending along the first direction X.

In some examples, as shown in FIGS. 2 and 3, multiple second touch electrodes **1*c* are arranged at intervals along the second direction Y, with any two adjacent second touch electrodes 1*c* being connected, for example, by one second connection portion 1*d*, and the multiple second touch electrodes 1*c* and multiple second connection portions 1*d* that are alternately arranged along the second direction Y form one second touch channel 12. The touch structure 1 includes a plurality of second touch channels 12 arranged at intervals along the first direction X, with each second touch channel 12** extending along the second direction Y.

For example, one of the first touch electrode **1*a* and the second touch electrode 1*c* is, for example, a touch driving electrode Tx, and the other is a touch sensing electrode Rx. When electrical signals are transmitted on the first touch electrodes 1***a* and the second touch electrodes 1*c*, mutual capacitance will be generated between a first touch electrode 1*a* and a second touch electrode 1*c* that are adjacent to each other. When a finger touches the display panel 100, the finger will take away charges on touch electrodes, enabling a value of mutual capacitance between the touch electrodes D at a touch position to change. Based on the change in the value of the mutual capacitance between the touch electrodes D, the touch position of the finger can be recognized, thereby implementing the touch function of the display panel 100.

In some examples, as shown in FIG. 2, the display panel 100 further includes a plurality of first-type touch leads. The first-type touch leads are, for example, first touch leads 2, and each first-type touch lead has one end connected to one first touch channel 11 and the other end connected to a touch driver chip (e.g., the touch and display driver integration chip 200).

In some examples, as shown in FIG. 2, the display panel 100 further includes a plurality of second-type touch leads. The second-type touch leads are, for example, at least one type of second touch leads 4, third touch leads 5, or fourth touch leads 8, and the third touch leads 5 and the fourth touch leads 8 do not exist at the same time in the display panel 100. Each second-type touch lead has one end connected to one second touch channel 12, and the other end connected to a touch driver chip (e.g., the touch and display driver integration chip 200).

In some embodiments, as shown in FIGS. 2 and 8 to 19, the display panel 100 includes at least a plurality of data pins 32 and a plurality of first touch pins 31. The first touch pins 31 are connected to the touch structure 1. Each first touch pin 31 is electrically connected to one first touch channel 11 through, for example, one first touch lead 2. The first touch lead 2 has one end connected to the first touch channel 11, and the other end connected to the first touch pin 31. The first touch pin 31 is configured to receive a first touch signal and transmit the first touch signal to the touch structure 1 through the first touch lead 2.

The plurality of pixels within the display region AA of the display panel 100 are arranged, for example, in multiple rows and multiple columns. Each data pin 32 may be electrically connected to one row of pixels or one column of pixels, and the data pin 32 is configured to receive a data signal required for displaying an image and transmit the data signal to the display panel 100 (e.g., to pixels corresponding to this data pin 32).

For example, the plurality of pixels are divided into multiple groups, with each group of pixels including several adjacent pixels. Each data pin 32 may be electrically connected to one row of pixels or one column of pixels. Each group of pixels may include two, three, four or more adjacent pixels.

Accordingly, the touch and display driver integration chip 200 includes at least a plurality of data connection blocks 72 and a plurality of first touch connection blocks 71. The plurality of data connection blocks 72 of the touch and display driver integration chip 200 are respectively connected to the plurality of data pins 32 of the display panel 100, with each data connection block 72 being electrically connected to one row, one column or one group of pixels through a data pin 32. The data connection block 72 is configured to transmit display data signals to pixels in the display panel 100. The plurality of first touch connection blocks 71 of the touch and display driver integration chip 200 are respectively connected to the plurality of first touch pins 31 of the display panel 100.

For example, as shown in FIG. 2, the display panel 100 further includes a plurality of second touch pins 33. The second touch pins 33 are connected to the touch structure 1 or not connected to the touch structure 1. In a case where the second touch pins 33 are connected to the touch structure 1, each second touch pin 33 is electrically connected to one second touch channel 12 through, for example, one second touch lead 4, and the second touch lead 4 has one end connected to the second touch channel 12, and the other end connected to the second touch pin 33.

Accordingly, the touch and display driver integration chip 200 further includes a plurality of second touch connection blocks 73, and the plurality of second touch pins 33 of the display panel 100 are respectively connected to the plurality of second touch connection blocks 73 of the touch and display driver integration chip 200.

In some embodiments, as shown in FIG. 4, the display panel 100 includes a display region AA and a first bonding region B1 located on a side of the display region AA for bonding a driver chip (e.g., the touch and display driver integration chip 200). A plurality of first pins 3 are arranged in the first bonding region B1, and the plurality of first pins 3 are arranged in N rows and multiple columns. The plurality of first pins 3 include a first portion 3A, a second portion 3B and a third portion 3C arranged in sequence along the first direction X. The first portion 3A extends along a first set direction, the first set direction intersecting the first direction X; the second portion 3B extends along a second set direction, the second set direction being perpendicular to the first direction X; and the third portion 3C extends along a third set direction, the third set direction intersecting the first direction X, where the first set direction and the third set direction are symmetrical about the second set direction.

For example, the second set direction may be perpendicular to the first direction X, and a symmetry axis of the second portion 3B along the column direction may be parallel to the second direction Y shown in FIG. 4. In this case, first pins 3 included in the second portion 3B all extend, for example, along the second direction Y, and the symmetry axis of the second portion 3B may be parallel to the second direction Y shown in FIG. 4.

In some examples, the second portion 3B is arranged symmetrically about a reference midline C of the display panel 100.

As another example, the second set direction may intersect but not be perpendicular to the first direction X. For example, the second set direction intersects the second direction Y shown in FIG. 4, forming an included angle being an acute angle, that is, the second set direction may be an inclined direction. In this case, the second set direction is not single in number, but two directions symmetrical along the second direction Y shown in FIG. 4.

The following gives descriptions by taking an example that the second set direction is parallel to the second direction Y shown in FIG. 4.

For example, boundaries of first pins 3 in each row (e.g., the upper boundaries or lower boundaries of the first pins 3 shown in FIG. 4) are aligned along the row direction, and boundaries of first pins 3 in each column (e.g., the left boundaries or right boundaries of the first pins 3 shown in FIG. 4) are aligned along the column direction.

As shown in FIG. 4, the first pins 3 included in the second portion 3B each have a shape, for example, of a rectangle;

and the first pins 3 included in the first portion 3A and the third portion 3C each have a shape, for example, of a parallelogram.

The shapes of the first portion 3A, the second portion 3B and the third portion 3C include, but are not limited to, the above examples, as long as the shapes can meet the requirements for effectively connecting the driver chip.

In some examples, as shown in FIG. 4, the first portion 3A extends obliquely, and the upper end of the first portion 3A is farther away from a first frame region K1 in the first direction X than the lower end thereof; the second portion 3B extends vertically, and the upper end and lower end of the second portion 3B are at the same or approximately the same distance from the first frame region K1 in the first direction X; and the third portion 3C extends obliquely, and the upper end of the third portion 3C is closer to the first frame region K1 in the first direction X than the lower end thereof. For the N rows of first pins 3 in the first bonding region B1, from the first row to the N-th row of first pins 3, i.e., from top to bottom, a distance along the first direction X between two first pins 3 farthest from each other in a same row gradually increases.

The upper end and the lower end mentioned here refer to the upper end and the lower end of the first pin 3 as shown in FIG. 4.

In some other examples, the first portion 3A extends, for example, obliquely, and the upper end of the first portion 3A is closer to a first frame region K1 in the first direction X than the lower end thereof; the second portion 3B extends, for example, vertically, and the upper end and lower end of the second portion 3B are at the same or approximately the same distance from the first frame region K1 in the first direction X; and the third portion 3C extends, for example, obliquely, and the upper end of the third portion 3C is farther away from the first frame region K1 in the first direction X than the lower end thereof. For the N rows of first pins 3 in the first bonding region B1, from the first row to the N-th row of first pins 3, i.e., from top to bottom, a distance along the first direction X between two first pins 3 farthest from each other in a same row gradually decreases.

In the process of manufacturing the display device 1000, in the process of connecting the touch and display driver integration chip 200 to the display panel 100 correspondingly, a bonding process, for example, is employed to correspondingly connect pins (e.g., first pins 3 and second pins 6) of the display panel 100 to connection blocks (e.g., first connection blocks 7 and second connection blocks 8) of the touch and display driver integration chip 200.

For example, an ACF (Anisotropic Conductive Film) is attached to the first bonding region B1 of the display panel 100, and then the touch and display driver integration chip 200 is pressed onto the ACF by a thermo-compression process, so that the touch and display driver integration chip 200 is connected to the display panel 100 correspondingly. During the thermo-compression process, a large amount of heat will be generated, and after the touch and display driver integration chip 200 and the display panel 100 are connected correspondingly, the temperature thereof gradually drops back to the room temperature.

The substrate 10 included in the display panel 100 is made of PI, and the plurality of first pins 3 are arranged, for example, in such a manner that they all extend in the vertical direction in FIG. 4. When the display panel 100 is bonded to the touch and display driver integration chip 200, a large temperature change will occur in the first bonding region B1, and during the temperature change, a portion of the substrate 10 in and surrounding the first bonding region B1 will deform by thermal expansion and contraction under the influence of temperature, causing the pins in the first bonding region B1 (e.g., first pins 3, second pins 6, etc.) to be offset in alignment with the connection blocks of the touch and display driver integration chip 200 (e.g., first connection blocks 7, second connection blocks 8, etc.). For example, after an alignment offset occurs between one of the first pins 3 and a first connection block 7, an overlapping area of portions connected correspondingly decreases by more than 80% compared with a set overlapping area. As a result, the connection stability of the first pin 3 and the first connection block 7 correspondingly connected thereto decreases, causing a risk of disconnection between the two, which affects the stability of signal transmission; in addition, since the overlapping area of the portions connected correspondingly is reduced, the resistance value of these portions increases, thereby increasing the power consumption of the display panel 100.

When the substrate 10 deforms by thermal expansion and contraction under the influence of temperature, first pins 3 closer to the middle position of the first bonding region B1 are less affected, and first pins 3 farther away from the middle position (first pins 3 closer to the first frame region K1 and first pins 3 closer to the second frame region K2) are more affected and more likely to have poor alignment.

By setting some (the second portion 3B) of the plurality of first pins 3 located near the reference midline C of the display panel 100 to extend in the vertical direction, and setting first pins 3 on both sides (the first portion 3A and the third portion 3C) to extend obliquely (with an extension direction intersecting an extension direction of the second portion 3B, and forming an included angle being an acute angle). In this way, even if the substrate 10 deforms by expansion and contraction under the influence of temperature, the first pins 3 extending obliquely on both sides are less affected by the expansion or contraction of the substrate 10 than the design in which these first pins extend in the vertical direction, and it is still possible to ensure a good alignment connection between the pins of the display panel 100 and the connection blocks of the touch and display driver integration chip 200, thereby ensuring the stability and reliability of signal transmission.

It will be noted that the first portion 3A, the second portion 3B, and the third portion 3C included in the plurality of first pins 3 described herein are grouped to facilitate a clear description of how the extension directions of the plurality of first pins 3 in the display panel 100 are set up, and do not imply that the plurality of first pins 3 are actually divided into three portions.

Accordingly, in some embodiments, as shown in FIG. 5, the touch and display driver integration chip 200 includes a first output region S1. A plurality of first connection blocks 7 are arranged in the first output region S1, and the plurality of first connection blocks 7 are arranged in N rows and multiple columns. The plurality of first connection blocks 7 include a first portion 7A, a second portion 7B and a third portion 7C that are arranged in sequence in a direction from the right end to the left end of the touch and display driver integration chip 200.

The first portion 7A of the plurality of first connection blocks 7 of the touch and display driver integration chip 200 is correspondingly connected to the first portion 3A of the plurality of first pins 3 of the display panel 100; the second portion 7B of the plurality of first connection blocks 7 is correspondingly connected to the second portion 3B of the plurality of first pins 3; and the third portion 7C of the plurality of first connection blocks 7 is correspondingly connected to the third portion 3C of the plurality of first pins 3.

The first portion 7A extends along a first set direction, the first set direction intersecting a length direction of the touch and display driver integration chip 200; the second portion 7B extends along a second set direction, the second set direction being perpendicular to the length direction of the touch and display driver integration chip 200; and the third portion 7C extends along a third set direction, the third set direction intersecting the length direction of the touch and display driver integration chip 200. Here, the first set direction and the third set direction are symmetrical about the second set direction.

It will be noted that the first portion 7A, the second portion 7B, and the third portion 7C included in the plurality of first connection blocks 7 described herein are grouped to facilitate a clear description of how the extension directions of the plurality of first connection blocks 7 in the touch and display driver integration chip 200 are set up, and do not imply that the plurality of first connection blocks 7 are actually divided into three portions. Furthermore, the first portion 7A, the second portion 7B and the third portion 7C described here (the first portion 7A, the second portion 7B and the third portion 7C that are included in the plurality of first connection blocks 7) are different from the first portion 3A, the second portion 3B and the third portion 3C described above (the first portion 3A, the second portion 3B and the third portion 3C that are included in the plurality of first pins 3 of the display panel 100).

The first set direction and the second set direction described here are for the purpose of clearly describing the extension directions of the plurality of first connection blocks 7 in the touch and display driver integration chip 200, and distinguishing different extension directions of the three portions of the first connection blocks 7, and the first set direction and the second set direction described here are also different from the first set direction and the second set direction in the foregoing description of the extension directions of the plurality of first pins 3 in the display panel 100.

For example, the second set direction may be perpendicular to the first direction X, that is, the second set direction may be parallel to the second direction Y shown in FIG. 5. In this case, first connection blocks 7 included in the second portion 7B all extend, for example, along the second direction Y, and a symmetry axis of the second portion 7B may be parallel to the second direction Y shown in FIG. 5.

As another example, the second set direction may intersect but not be perpendicular to the first direction X. For example, the second set direction intersects the second direction Y shown in FIG. 5, forming an included angle being an acute angle, that is, the second set direction may be an inclined direction. In this case, the second set direction is not single in number, but two directions symmetrical along the second direction Y shown in FIG. 5.

The following gives descriptions by taking an example that the second set direction is parallel to the second direction Y shown in FIG. 5.

For example, along the direction from the right side to the left side in FIG. 5, the plurality of first connection blocks 7 are divided into a first portion 7A, a second portion 7B and a third portion 7C in sequence.

The plurality of first connection blocks 7 in the first output region S1 are arranged in N rows and multiple columns. Boundaries of first connection blocks 7 in each row (e.g., the upper boundaries or lower boundaries of the first connection blocks 7 shown in FIG. 5) are aligned along the row direction, and boundaries of first connection blocks 7 in each column (e.g., the left boundaries or right boundaries of the first connection blocks 7 shown in FIG. 5) are aligned along the column direction.

As shown in FIG. 5, the first connection blocks 7 included in the second portion 7B each have a shape, for example, of a rectangle; and the first connection blocks 7 included in the first portion 7A and the third portion 7C each have a shape, for example, of a parallelogram.

In some examples, as shown in FIG. 5, the first portion 7A extends obliquely, and the upper end of the first portion 7A is farther away from the right end of the touch and display driver integration chip 200 in the first direction X than the lower end thereof; the second portion 7B extends vertically, and the upper end and lower end of the second portion 7B are, for example, at the same or approximately the same distance from the right end of the touch and display driver integration chip 200 in the first direction X; and the third portion 7C extends obliquely, and the upper end of the third portion 7C is closer to the right end of the touch and display driver integration chip 200 in the first direction X than the lower end thereof. For the N rows of first connection blocks 7 in the first output region S1, from the first row to the N-th row of first connection blocks 7, i.e., from top to bottom, a distance along the first direction X between two first connection blocks 7 farthest from each other in a same row gradually increases.

The upper end and the lower end mentioned here refer to the upper end and the lower end of the first connection block 7 as shown in FIG. 5.

In some other examples, the first portion 7A extends obliquely, and the upper end of the first portion 7A is closer to the right end of the touch and display driver integration chip 200 in the first direction X than the lower end thereof; the second portion 7B extends vertically, and the upper end and lower end of the second portion 7B are, for example, at the same or approximately the same distance from the right end of the touch and display driver integration chip 200 in the first direction X; and the third portion 7C extends obliquely, and the upper end of the third portion 7C is farther away from the right end of the touch and display driver integration chip 200 in the first direction X than the lower end thereof. For the N rows of first connection blocks 7 in the first output region S1, from the first row to the N-th row of first connection blocks 7, i.e., from top to bottom, a distance along the first direction X between two first connection blocks 7 farthest from each other in a same row gradually decreases.

As mentioned above, a large amount of heat will be generated during the process of bonding the touch and display driver integration chip 200 to the display panel 100. After the touch and display driver integration chip 200 is correspondingly connected to the display panel 100, the temperature thereof gradually drops back to the room temperature. During the temperature change, the connection blocks of the touch and display driver integration chip 200 and the pins of the display panel 100 may be offset from each other in alignment.

By setting some of the plurality of first connection blocks 7 (the second portion 7B) located in the middle position of the touch and display driver integration chip 200 to extend in the vertical direction, and setting first connection blocks 7 on both sides (the first portion 7A and the third portion 7C) to extend obliquely (with an extension direction intersecting an extension direction of the second portion 3B, and forming an included angle being an acute angle). In this way, even if the substrate 10 deforms by expansion and contraction under the influence of temperature, it is still possible to ensure a good alignment connection between the pins of the display panel 100 and the connection blocks of the touch and display driver integration chip 200, thereby ensuring the stability and reliability of signal transmission.

In some embodiments, in the display panel 100, as shown in FIG. 4, a plurality of second pins 6 include a first group and a second group respectively arranged in two second bonding regions B2. The first group extends along a fourth set direction, the fourth set direction intersecting the first direction X; and the second group extends along a fifth set direction, the fifth set direction intersecting the first direction X. Here, in a case where the second direction Y is perpendicular to the first direction X, the fourth set direction and the fifth set direction are symmetrical about the second direction Y.

For example, boundaries of second pins 6 in each row (e.g., the upper boundaries or lower boundaries of the second pins 6 shown in FIG. 4) are arranged parallel to each other, and boundaries of second pins 6 in each column (e.g., the left boundaries or right boundaries of the second pins 6 shown in FIG. 4) are aligned along the column direction.

For example, the second pins 6 each have a shape, for example, of a parallelogram.

As mentioned above, a large amount of heat will be generated during the process of bonding the touch and display driver integration chip 200 to the display panel 100. After the touch and display driver integration chip 200 is correspondingly connected to the display panel 100, the temperature thereof gradually drops back to the room temperature. During the temperature change, the deformation of expansion and contraction of the substrate 10 will also cause positions of the plurality of second pins 6 in the second bonding regions B2 to deviate from set positions, causing the connection blocks of the touch and display driver integration chip 200 and the pins of the display panel 100 to be offset from each other in alignment.

By setting the second pins 6 to extend obliquely (with an extension direction forming an included angle being an acute angle with the first direction X), even if the substrate 10 deforms by expansion and contraction under the influence of temperature, the inclined design makes the second pins 6 less affected by the deformation of expansion and contraction of the substrate 10, and it is still possible to ensure a good alignment connection between the second pins 6 and corresponding connection blocks of the touch and display driver integration chip 200, thereby ensuring the stability and reliability of signal transmission.

Accordingly, in some embodiments, in the touch and display driver integration chip 200, as shown in FIG. 5, the plurality of second connection blocks 8 include a first group and a second group respectively arranged in two second output regions S2. The first group extends along a fourth set direction, the fourth set direction intersecting the first direction X; and the second group extends along a fifth set direction, the fifth set direction intersecting the first direction X. Here, in a case where the second direction Y is perpendicular to the first direction X, the fourth set direction and the fifth set direction are symmetrical about the second direction Y.

For example, multiple second connection blocks 8 included in the first group are arranged in at least one column along the second direction Y, and each of the multiple second connection blocks 8 extends along the fourth set direction; and multiple second connection blocks 8 included in the second group are arranged in at least one column along the second direction Y, and each of the multiple second connection blocks 8 extends along the fifth set direction. As shown in FIG. 5, each second connection block 8 has a shape, for example, of a parallelogram.

As mentioned above, by setting the second connection blocks 8 to extend obliquely, the positional deviation of the pins of the display panel 100 caused by the deformation of expansion and contraction of the substrate 10 under the influence of temperature can be reduced, thereby reducing the influence on the bonding reliability of the touch and display driver integration chip 200, and ensuring the reliability of the alignment connection between the display panel 100 and the touch and display driver integration chip 200, which in turn ensures the stability and reliability of signal transmission.

In some embodiments, as shown in FIG. 2, the display panel 100 further includes a first frame region K1 and a second frame region K2 respectively located at two opposite sides of the display region AA in the first direction X, a third frame region K3 and a fourth frame region K4 respectively located at two opposite sides of the display region AA in the second direction Y, and a first bonding region B1 located at a non-display surface of the display panel 100 opposite to the display surface, the first bonding region B1 and the fourth frame region K4 being arranged on the same side of the display panel 100.

The first direction X is perpendicular to the second direction Y. The first bonding region B1 includes a first pin region J1, a second pin region J2 and a third pin region J3 arranged in sequence along the first direction X and in a direction from the first frame region K1 to the second frame region K2.

As shown in FIGS. 2 and 4, the display panel 100 further includes a touch structure 1 and a plurality of first touch leads 2. The touch structure 1 is arranged in the display region AA, and the plurality of first touch leads 2 are connected to the touch structure 1. The plurality of first touch leads 2 are divided into two groups respectively leading from the first frame region K1 and the second frame region K2, and extending to the first pin region J1 and the third pin region J3.

The plurality of first pins 3 are arranged in the first bonding region B1, and the plurality of first pins 3 are arranged in multiple columns, with a column direction intersecting the first direction X.

Here, the plurality of first pins 3 include a plurality of first touch pins 31 and a plurality of data pins 32. The first touch pins 31 are configured to receive first touch signals and transmit the first touch signals to the touch structure 1 through the first touch leads 2. The plurality of data pins 32 are arranged in the second pin region J2, and are configured to receive data signals required for displaying an image and transmit the data signals to the display panel 100. The plurality of first touch pins 31 are divided into two groups that are respectively arranged in the first pin region J1 and the third pin region J3, and are respectively connected to the two groups of first touch leads 2.

For example, an included angle formed by an arrangement direction of each column of first pins 3 and the first direction X is greater than or equal to 60° and less than or equal to 90°.

In some examples, the included angle formed by the arrangement direction of each column of first pins 3 and the first direction X is greater than or equal to 75° and less than or equal to 90°.

It will be noted that a range of the included angle formed by the arrangement direction of each column of first pins 3 and the first direction X can be adaptively adjusted according to a specific design, and the foregoing is intended as an exemplary illustration only and is not intended to be a limitation of the present disclosure. The first bonding region B1 and the fourth frame region K4 being arranged on the same side of the display panel 100 means that the first bonding region B1 and the fourth frame region K4 are both located on a side of the display panel 100 for bonding a driver chip (e.g., the touch and display driver integration chip 200).

For example, each first touch lead 2 has one end connected to one first touch channel 11, and the other end connected to one first touch pin 31. The specific connection manner of the first touch lead 2 and both the first touch channel 11 and the first touch pin 31 will be described later and will not be further described here.

It will be noted that when describing the plurality of first pins 3 being arranged in multiple columns, with a column direction intersecting the first direction X, the column direction refers to an arrangement direction of multiple first pins 3 arranged in a column. The multiple columns of first pins 3 may have the same or not completely the same arrangement direction. That is, the column direction is not necessarily unique, and there may be one, two or more column directions, which is determined based on the specific arrangement manner of the plurality of first pins 3. The arrangement manner of the plurality of first pins 3 is described in detail later and will not be further described here.

For example, the plurality of first touch pins 31 are divided into two groups that are respectively arranged in the first pin region J1 and the third pin region J3, in which the two groups may have the same or different numbers of first touch pins 31, depending on actual needs of the design.

The following gives descriptions by taking an example that the two groups have the same number of first touch pins 31. The grouping of the plurality of first touch pins 31 and the manner in which they are arranged in each group is described in detail later, and will not be described here.

For example, as shown in FIG. 2, the display panel 100 further includes a bending region DD. In the process of manufacturing the display device 1000, the fourth frame region K4, the bending region DD and the first bonding region B1 are all located on a side of the display surface of the display panel 100. The bending region DD is located on a side of the fourth frame region K4 away from the display region AA, and is located between the fourth frame region K4 and the first bonding region B1. The display panel 100 includes, for example, a plurality of signal lines (e.g., first touch leads 2, second touch leads 4, third touch leads 5, fourth touch leads 8, etc.), and some of the plurality of signal lines each have one end electrically connected to the touch structure 1, and the other end extending to the first bonding region B1 and electrically connected to one of the plurality of first pins 3.

A surface of the display panel 100 on which the touch structure 1 is provided serves as the display surface of the display panel 100. In the process of manufacturing the display device 1000, before the display panel 100 is connected to the touch and display driver integration chip 200, the bending region DD and the first bonding region B1 of the display panel 100 are both located on the display surface of the display panel 100; and after the touch and display driver integration chip 200 is bonded to the display panel 100 at the first bonding region B1, the display panel 100 is bent along a boundary line of the bending region DD proximate to the display region AA and a boundary line thereof away from the display region AA, so that the bending region DD and a portion of the display panel 100 on a side of the bending region DD away from the display region AA are bent to the non-display surface of the display panel 100 opposite to the display surface. In this way, the portion of the touch and display driver integration chip 200 is set to be placed on the non-display surface of the display panel 100 opposite to the display surface, thereby reducing an area ratio of a non-display region on the display surface of the display panel 100, and then increasing an area ratio of the display region AA of the display panel 100 on the display surface, thereby improving the visual experience of the display image of the display panel 100.

For example, in a case where the plurality of first touch leads 2 are divided into two groups respectively leading from the first frame region K1 and the second frame region K2, the two groups have the same or approximately the same number of first touch leads 2. In this way, the plurality of first touch leads 2 have the same or approximately the same wiring number in the first frame region K1 and the second frame region K2, which is conducive to ensuring that the non-display region of the display surface of the display panel 100 is symmetrically and evenly distributed on both sides of the display region AA, thereby ensuring the aesthetic appearance and image display effect of the display panel 100.

Accordingly, in some embodiments, as shown in FIG. 5, the first output region S1 of the touch and display driver integration chip 200 includes a first connection region L1, a second connection region L2 and a third connection region L3 arranged in sequence along the first direction X and in a direction from the right end to the left end of the touch and display driver integration chip 200, the first direction X being parallel to the length direction of the touch and display driver integration chip 200.

The plurality of first connection blocks 7 are arranged in multiple columns, with a column direction intersecting the first direction X.

The plurality of first connection blocks 7 include a plurality of first touch connection blocks 71 and a plurality of data connection blocks 72. The plurality of first touch connection blocks 71 are divided into two groups that are respectively arranged in the first connection region L1 and the third connection region L3, and the first touch connection blocks 71 are configured to output first touch signals. The plurality of data connection blocks 72 are arranged in the second connection region L2, and are configured to output data signals required for displaying an image.

The plurality of first connection blocks 7 are arranged in multiple columns, with a column direction intersecting the first direction X, which means that an arrangement direction of each column of first connection blocks 7 intersects the first direction X. The multiple columns of first connection blocks 7 may have the same or not completely the same arrangement direction. That is, the column direction is not necessarily unique, and there may be one, two or more column directions, which is determined based on the specific arrangement manner of the plurality of first connection blocks 7. The arrangement manner of the plurality of first connection blocks 7 is described in detail later and will not be further described here.

For example, an included angle formed by an arrangement direction of each column of first connection blocks 7 and the first direction X is greater than or equal to 60° and less than or equal to 90°.

In some examples, the included angle formed by the arrangement direction of each column of first connection blocks 7 and the first direction X is greater than or equal to 75° and less than or equal to 90°.

It will be noted that a range of the included angle formed by the arrangement direction of each column of first connection blocks 7 and the first direction X can be adaptively adjusted according to a specific design, and the foregoing is intended as an exemplary illustration only and is not intended to be a limitation of the present disclosure.

For example, when the touch and display driver integration chip 200 is correspondingly connected to the display panel 100, one side of the touch and display driver integration chip 200 on which the plurality of first connection blocks 7 are provided faces the display panel 100, and the plurality of first connection blocks 7 are correspondingly connected to the plurality of first pins 3 provided in the display panel 100.

The touch and display driver integration chip 200 provided in some embodiments of the present disclosure, compared with a conventional display driver chip, has touch driving units (including first touch connection blocks 71, second touch connection blocks 72, and other touch control units, and the control principle is the same as that of the touch driver chip, which will not be repeated here), and sends touch driving signals to the display panel 100 through the first touch connection blocks 71 and the second touch connection blocks 72, thereby driving the touch structure 1 in the display panel 100 to implement the touch function. In this way, the display driving function and the touch driving function are integrated on a single chip, which increases the integration of the display device 1000 and helps reduce the manufacturing cost of the display device 1000. Moreover, in a case where the display device 1000 adopts the touch and display driver integration chip 200, connecting the display panel 100 to the single touch and display driver integration chip 200 can implement the display driving function and the touch driving function of the display panel 100. Compared to a case in which the display panel 100 is separately connected to a display driver chip and a touch control driver chip, it is possible to reduce the number of signal lines in the display panel 100 for connecting the chip (e.g., signal lines connected to input connection blocks in the driver chip), thereby reducing the wiring area of the frame region of the display panel 100, and conducive to the realization of the narrow frame design of the display panel 100 and the display device 1000.

In some embodiments, in the touch and display driver integration chip 200, the touch and display driver integration chip 200 further includes an input region R1 arranged opposite to the first output region S1. Accordingly, as shown in FIG. 4, the display panel 100 further includes a region B3 arranged opposite to the first bonding region B1.

For example, the input region R1 is provided therein with a plurality of input connection blocks. The input connection blocks include connection blocks related to the basic functional units of the chip, such as a reset connection block (Rst), a first power connection block (Pwr1), a data transmission connection block (Inter-Integrated Circuit, IIC for short, i.e., Serial Communication Bus), a communication connection block (Serial Peripheral Interface, SPI for short, i.e., serial peripheral interface), and an interrupt request connection block INT (Interrupt, INT for short).

In some examples, the input connection blocks further include a processor connection block (Mobile Industry Processor Interface, MIPI for short).

For example, the input connection blocks further include connection blocks related to the touch driving units, such as a second power connection block (Pwr2), an interface connection block (Interface, I/F for short), and a voltage conversion connection block (Charge Pump, C/P for short).

The power connection block is configured to access a power supply to power the touch and display driver integration chip 200.

It will be noted that as shown in FIG. 5, the touch and display driver integration chip 200 further includes an input region R1, and the first output region S1 and the input region R1 are respectively arranged on two opposite sides of the touch and display driver integration chip 200. A side where the first output region S1 is located is called as the upper end of the touch and display driver integration chip 200, and correspondingly, a side where the input region R1 is located is called as the lower end of the touch and display driver integration chip 200. The right end and the left end when describing the direction from the right end to the left end of the touch and display driver integration chip 200 refer to the right end and the left end of the touch and display driver integration chip 200 when looking at the touch and display driver integration chip 200 from a surface of the touch and display driver integration chip 200 where the plurality of first connection blocks 7 are arranged as shown in FIG. 5. As shown in FIG. 2, after the touch and display driver integration chip 200 is correspondingly connected to the display panel 100, the right end and the left end of the touch and display driver integration chip 200 are opposite to those in FIG. 5.

For example, the plurality of first touch connection blocks 71 are divided into two groups that are respectively arranged in the first connection region L1 and the third connection region L3, in which the two groups may have the same or different numbers of first touch connection blocks 71, depending on actual needs of the design.

The following gives descriptions by taking an example that the two groups have the same number of first touch connection blocks 71. The grouping of the plurality of first touch connection blocks 71 and the manner in which they are arranged in each group is described in detail later, and will not be further described here.

In some embodiments, as shown in FIG. 4, the plurality of first pins 3 included in the display panel 100 are arranged in N rows along the second direction Y.

It will be noted that the plurality of first pins 3 included in the display panel 100 described here are arranged in N rows along the second direction Y, which means that the plurality of first pins 3 included in the display panel 100 are arranged in the N rows, with multiple first pins 3 in each row being arranged in sequence along the first direction X.

For example, $N \geq 3$.

In a case where N rows of first pins 3 are provided in the display panel 100, the specific value of N is related to a dimension of the display panel 100 along the first direction X, the number of first pins 3 capable of being arranged in each row of the display panel 100 along the first direction X, and the number of all first pins 3 required for the display panel 100.

For example, the dimension of the display panel 100 along the first direction X is a, b first pins 3 are capable of being arranged in each row of the display panel 100, and the number of all first pins 3 required for the display panel 100 is less than or equal to b, in this case, the plurality of first pins 3 included in the display panel 100 may be arranged in 1 row or more rows; the number of all first pins 3 required for the display panel 100 is $2b+k$, and $1 \leq k \leq b$, in this case, the plurality of first pins 3 included in the display panel 100 may be arranged in 3 rows or more rows; and the number of all first pins 3 required for the display panel 100 is equal to 3b, in this case, the plurality of first pins 3 included in the display panel 100 may be arranged in 3 rows or more rows.

It can be understood that in a case where the number of all first pins 3 required by the display panel 100 is greater than b and less than 2b, the plurality of first pins 3 included in the display panel 100 may be arranged in 2 rows or more rows along the second direction Y. The number of the first pins 3 provided in the display panel 100 is greater than or equal to the number of first pins 3 in the display panel 100 configured to transmit electrical signals (e.g., data signals, first touch signals, second touch signals, etc.).

Situations in which the plurality of first pins 3 included in the display panel 100 are arranged in the N rows along the second direction Y include, but are not limited to, the above situations. The corresponding design is made depending on actual needs, and the foregoing is only an illustration of possible implementations, which is not intended to be a limitation on the specific implementations of the present disclosure.

Accordingly, in some embodiments, as shown in FIG. 5, the plurality of first connection blocks 7 included in the touch and display driver integration chip 200 are arranged in N rows along the second direction Y.

For example, N≥3.

It will be noted that the plurality of first connection blocks 7 included in the touch and display driver integration chip 200 described here are arranged in N rows along the second direction Y, which means that the plurality of first connection blocks 7 included in the touch and display driver integration chip 200 are arranged in the N rows, with multiple first connection blocks 7 in each row being arranged in sequence along the first direction X.

In a case where N rows of first connection blocks 7 are provided in the touch and display driver integration chip 200, the specific value of N is related to a dimension of the touch and display driver integration chip 200 along the first direction X, the number of first connection blocks 7 capable of being arranged in each row of the touch and display driver integration chip 200 along the first direction X, and the number of all first connection blocks 7 required for the touch and display driver integration chip 200. Detailed description can be made with reference to the foregoing description of the correlation between the number of the first pins 3 in the display panel 100 and the specific value of N, which will not be repeated herein.

The specific arrangement and number of rows of the plurality of first connection blocks 7 included in the touch and display driver integration chip 200 are designed accordingly depending on actual needs, and are only described herein as examples of possible implementations, which are not to be taken as a limitation on the specific implementations of the present disclosure.

As shown in FIG. 2, in a case where the touch and display driver integration chip 200 is applied to the display device 1000, the display device 1000 includes the touch and display driver integration chip 200 and the display panel 100 connected thereto with a matching design. In order to clearly describe the connection manner between the display panel 100 and the touch and display driver integration chip 200, the following is described by taking an example that the touch and display driver integration chip 200 has a design matching the structures in the first bonding region B1 of the display panel 100 provided in some embodiments of the present disclosure.

It can be understood that the setting manner of the connection regions (e.g., the division of the first connection region L1, the second connection region L2 and the third connection region L3) of the touch and display driver integration chip 200, and the specific arrangement manner of the connection blocks (e.g., first connection block 7, second connection block 8, etc.) include, but are not limited to, the manners provided in the embodiments of the present disclosure.

In some embodiments, as shown in FIG. 4, the first bonding region B1 of the display panel 100 further includes a fourth pin region J4 and a fifth pin region J5. Along the first direction X, the fourth pin region J4 and the fifth pin region J5 are respectively located at both sides of the second pin region J2.

For example, as shown in FIG. 4, the first pin region J1 and the fourth pin region J4 are located at a same side of the second pin region J2, and the third pin region J3 and the fifth pin region J5 are located at another same side of the second pin region J2.

In some examples, as shown in FIG. 4, the fourth pin region J4 is located between the first pin region J1 and the second pin region J2, and the fifth pin region J5 is located between the second pin region J2 and the third pin region J3.

In some other examples, the fourth pin region J4 is located at a side of the first pin region J1 away from the second pin region J2, and the fifth pin region J5 is located at a side of the third pin region J3 away from the second pin region J2.

In yet some other examples, the fourth pin region J4 is located between the first pin region J1 and the second pin region J2, and the fifth pin region J5 is located at a side of the third pin region J3 away from the second pin region J2.

In still some other examples, the fourth pin region J4 is located at a side of the first pin region J1 away from the second pin region J2, and the fifth pin region J5 is located between the second pin region J2 and the third pin region J3.

It will be noted that the relative positions of various pin regions (e.g., the first pin region J1, the second pin region J2, the third pin region J3, the fourth pin region J4, and the fifth pin region J5) in the first output region S1 include, but are not limited to, the above situations. The corresponding design is made depending on actual needs, and the foregoing is only an illustration of possible implementations, which is not intended to be a limitation on the specific implementations of the present disclosure.

The following gives descriptions by taking an example that the fourth pin region J4 is located between the first pin region J1 and the second pin region J2, and the fifth pin region J5 is located between the second pin region J2 and the third pin region J3.

Accordingly, in some embodiments, as shown in FIG. 5, the first output region S1 of the touch and display driver integration chip 200 further includes a fourth connection region L4 and a fifth connection region L5. Along the first direction X, the fourth connection region L4 and the fifth connection region L5 are respectively located at both sides of the second connection region L2.

For example, the first connection region L1 and the fourth connection region L4 are located at a same side of the second connection region L2, and the third connection region L3 and the fifth connection region L5 are located at another same side of the second connection region L2.

In some examples, as shown in FIG. 5, the fourth connection region L4 is located between the first connection region L1 and the second connection region L2, and the fifth connection region L5 is located between the second connection region L2 and the third connection region L3.

In some other examples, the fourth connection region L4 is located at a side of the first connection region L1 away from the second connection region L2, and the fifth connection region L5 is located at a side of the third connection region L3 away from the second connection region L2.

In yet some other examples, the fourth connection region L4 is located between the first connection region L1 and the second connection region L2, and the fifth connection region L5 is located at a side of the third connection region L3 away from the second connection region L2.

In still some other examples, the fourth connection region L4 is located at a side of the first connection region L1 away from the second connection region L2, and the fifth connection region L5 is located between the second connection region L2 and the third connection region L3.

It will be noted that the relative positions of various connection regions (e.g., the first connection region L1, the second connection region L2, the third connection region L3, the fourth connection region L4, and the fifth connection region L5) in the first bonding region B1 include, but are not limited to, the above situations. The corresponding design is made depending on actual needs, and the foregoing is only an illustration of possible implementations, which is not intended to be a limitation on the specific implementations of the present disclosure.

It can be understood that when the touch and display driver integration chip 200 is applied to the display device 1000, the touch and display driver integration chip 200 and the display panel 100 included in the display device 1000 are required to have a compatible design. In order to clearly describe the connection manner between the display panel 100 and the touch and display driver integration chip 200, the following is described by taking an example that the fourth connection region L4 is located between the first connection region L1 and the second connection region L2, and the fifth connection region L5 is located between the second connection region L2 and the third connection region L3.

In some embodiments, as shown in FIGS. 2 and 4, the plurality of first pins 3 included in the display panel 100 further include a plurality of second touch pins 33. The plurality of second touch pins 33 are divided into two groups that are respectively arranged in the fourth pin region J4 and the fifth pin region J5. The second touch pins 33 are configured to receive second touch signals and transmit the second touch signals to the touch structure 1.

In some embodiments, as shown in FIGS. 2 and 4, the display panel 100 further includes a plurality of second touch leads 4 that are connected to the touch structure 1. The plurality of second touch leads 4 lead from the fourth frame region K4, and are divided into two groups respectively extending to the fourth pin region J4 and the fifth pin region J5. The two groups of second touch leads 4 are respectively connected to the two groups of second touch pins 33.

For example, each second touch lead 4 has one end connected to one second touch channel 12, and the other end connected to one second touch pin 33. The second touch pin 33 is configured to receive a second touch signal and transmit the second touch signal to the touch structure 1 through the second touch lead 4.

For example, the second touch pin 33 is configured to receive a second touch signal and transmit the second touch signal to the second touch channel 12 through the second touch lead 4.

The specific connection manner of the second touch lead 4 and both the second touch channel 12 and the second touch pin 33 will be described later and will not be further described in detail here.

For example, for the plurality of second touch leads 4 leading from the fourth frame region K4, the two groups may have the same or different numbers of second touch leads 4. The grouping of the plurality of second touch leads 4 is related to the specific arrangement manner of the second touch pins 33 in the first bonding region B1. The arrangement manner of the plurality of second touch pins 33 will be described in detail later and will not be further described here.

For the plurality of second touch leads 4 leading from the fourth frame region K4, the second touch leads 4 lead from the fourth frame region K4 to the fourth pin region J4 and the fifth pin region J5 in the first bonding region B1, and are connected to the corresponding second touch pins 33. In this way, the second touch leads 4 do not pass through frame regions (e.g., the first frame region K1, the second frame region K2 and the third frame region K3) other than the fourth frame region K4, thereby reducing the wiring area of the frame region, thereby reducing the frame width of the display panel 100, increasing the area ratio of the display region AA of the display panel 100 to the display surface, and then improving the viewing experience of an image displayed by the display panel 100.

Accordingly, in some embodiments, as shown in FIG. 5, the plurality of first connection blocks 7 included in the touch and display driver integration chip 200 further include a plurality of second touch connection blocks 73. The plurality of second touch connection blocks 73 are divided into two groups that are respectively arranged in the fourth connection region L4 and the fifth connection region L5. The plurality of second touch connection blocks 73 are configured to output second touch signals.

By providing the second touch connection blocks 73, in a case where the touch and display driver integration chip 200 is correspondingly connected to the display panel 100, a second touch signal is transmitted to a corresponding second touch pin 33 in the display panel 100 through a second touch connection block 73, and the second touch signal is transmitted to the touch structure 1 through the second touch pin 33 and the second touch lead 4, thereby implementing the touch driving of the touch and display driver integration chip 200 on the display panel 100.

In some embodiments, as shown in FIGS. 4 and 6, the display panel 100 further includes two second bonding regions B2 located at a side of the first bonding region B1 away from the display region AA and respectively corresponding to both ends of the first bonding region B1. The display panel 100 further includes a plurality of second pins 6. The plurality of second pins 6 are divided into two groups that are respectively arranged in the two second bonding regions B2. The second pins 6 are configured to receive second touch signals and transmit the second touch signals to the touch structure 1, or are configured to be connected to no touch signal line.

For example, in a case where the second pins 6 are configured to receive second touch signals and transmit the second touch signals to the touch structure 1, the display panel 100 further includes a plurality of third touch leads 5 connected to the touch structure 1. The plurality of third touch leads 5 lead from the third frame region K3, and are divided into two groups respectively passing through the first frame region K1 and the second frame region K2, and respectively extending to the two second bonding regions B2. The two groups of third touch leads 5 are respectively connected to the two groups of second pins 6.

For example, each third touch lead 5 has one end connected to one second touch channel 12, and the other end connected to one second pin 6. The second pin 6 is configured to receive a second touch signal and transmit the second touch signal to the touch structure 1 through the third touch lead 5.

For example, the second pin 6 is configured to receive a second touch signal, and transmit the second touch signal to the second touch channel 12 through the third touch lead 5.

The specific connection manner of the third touch lead 5 and both the second touch channel 12 and the second pin 6 will be described later and will not be further described in detail here.

For example, in a case where the display panel 100 further includes the plurality of second touch pins 33 and the plurality of second pins 6, at least one of a second touch pin 33 and a second pin 6 is configured to receive a second touch signal and transmit the second touch signal to the touch structure 1.

In some examples, as shown in FIGS. 4 and 6, the second touch pin 33 is configured to receive a second touch signal and transmit the second touch signal to the touch structure 1 through the second touch lead 4. The second pin 6 is configured to receive a second touch signal and transmit the second touch signal to the touch structure 1 through the third touch lead 5.

In this case, the two groups of second pins 6 are further respectively connected to the two groups of second touch pins 33. For example, in addition to being correspondingly connected to one second touch lead 4, each second touch pin 33 is further correspondingly connected to one second pin 6 through one first connection line 20. It can be understood that in this case, in addition to being correspondingly connected to one group of second touch leads 4, each group of second touch pins 33 is further correspondingly connected to one group of second pins 6 through one group of first connection lines 20; and for a group of second touch leads 4, a group of second touch pins 33, a group of third touch leads 5, and a group of second pins 6 that are connected correspondingly, each group has the same number of touch leads or touch pins or pins.

The specific corresponding connection manner of a group of second touch leads 4, a group of second touch pins 33, a group of third touch leads 5, and a group of second pins 6 that are connected correspondingly is described later and will not be further described here.

In a case where the display panel 100 includes the plurality of second touch leads 4 and the plurality of third touch leads 5, each second touch channel 12 has one end connected to a corresponding second touch pin 33 through one second touch lead 4, and the other end connected to a corresponding second pin 6 through one third touch lead 5. In this way, the second touch signal is transmitted from the second touch pin 33 and the second pin 6 to both ends of the second touch channel 12 respectively, which can reduce the signal path loss of the second touch signal on its transmission path (e.g., the signal distortion during transmission of the second touch signal due to the long transmission path), thereby ensuring the transmission reliability of the second touch signal.

In some other examples, as shown in FIGS. 2 and 4, the second touch pin 33 is configured to receive a second touch signal and transmit the second touch signal to the touch structure 1 through the second touch lead 4. The second pin 6 is configured to be connected to no touch signal line.

In a case where the second touch pin 33 is configured to receive a second touch signal and transmit the second touch signal to the touch structure 1, and the second pin 6 is configured to be connected to no touch signal line, the display panel 100 may further include a plurality of fourth touch leads 8 connected to the touch structure 1. The plurality of fourth touch leads 8 lead from the third frame region K3 and are divided into two groups respectively extending to the fourth pin region J4 and the fifth pin region J5. The two groups of fourth touch leads 8 are respectively connected to the two groups of second touch pins 33. Each fourth touch lead 8 has one end connected to one second touch channel 12, and the other end connected to one second touch pin 33.

In a case where the display panel 100 includes the plurality of second touch leads 4 and the plurality of fourth touch leads 8, a same second touch channel 12 is connected to a same second touch pin 33 through one second touch lead 4 and one fourth touch lead 8, respectively.

The second touch pin 33 or the second pin 6, which does not transmit touch signals, can serve as a dummy pin 37, which is not connected to any signal line, or can be connected to other signal lines as needed, increasing the design flexibility of the display panel 100. The specific accessed signals are designed depending on actual needs accordingly, and are only used herein as exemplary illustrations of possible implementations, which are not intended to be a limitation on the specific implementations of the present disclosure.

In some other examples, as shown in FIG. 7, the second touch pin 33 is configured to be connected to no touch signal line. The second pin 6 is configured to receive a second touch signal and transmit the second touch signal to the touch structure 1 through the third touch lead 5.

With such a design, some of the first pins 3 in the N rows in the first bonding region B1 may not be required to be reserved as second touch pins 33, and the number of the first pins 3 in the first bonding region B1 may be reduced, thereby increasing the spacing of adjacent first pins 3 along the row direction. In this way, in a case where a signal line (e.g., the first touch lead 2) in the display panel 100 passes through the spacing of adjacent first pins 3 and is connected to a first pin 3 (e.g., the first touch pin 31) corresponding thereto, a portion of the signal line located in the spacing of the adjacent first pins 3 can have a relatively large line width, so as to avoid the problem of the signal line being susceptible to breaking due to the line width of the signal line being too small, thereby increasing the signal transmission reliability of the signal line. Moreover, while enabling the portion of the signal line located in the spacing of the adjacent first pins 3 to have a relatively large line width, it is also possible to reduce the line resistance of the signal line, which is conducive to reducing the power consumption of the display panel 100.

Moreover, some of the first pins 3 in the N rows in the first bonding region B1 may also be reserved as second touch pins 33. These second touch pins 33 may not be connected to any signal line in the display panel 100, or may be connected to other signal lines except the touch signal lines as needed, thereby increasing the design flexibility of the display panel 100. The specific accessed signals are designed depending on actual needs accordingly, and are only used herein as exemplary illustrations of possible implementations, which are not intended to be a limitation on the specific implementations of the present disclosure.

For example, as shown in FIGS. 4 and 6, the display panel 100 includes a second bonding region B2 (A) located at an end of the first bonding region B1 proximate to the first frame region K1, and a second bonding region B2 (B) located at an end of the first bonding region B1 proximate to the second frame region K2.

For example, the plurality of third touch leads 5 are divided into two groups that respectively pass through the first frame region K1 and the second frame region K2, and respectively extend to the second bonding region B2 (A) and the second bonding region B2 (B), and the two groups have the same or approximately the same number of third touch leads 5. In this way, the plurality of third touch leads 5 have the same or approximately the same wiring number in the first frame region K1 and the second frame region K2, which is conducive to ensuring that the non-display region of the display surface of the display panel 100 is symmetrically and evenly distributed on both sides of the display region AA, thereby ensuring the aesthetic appearance and image display effect of the display panel 100.

For example, a dimension of the second lead 6 in an extension direction thereof is greater than or equal to 100 μm.

For example, a dimension of the second lead 6 in a direction perpendicular to an extension direction thereof is greater than or equal to 15 μm.

For example, a distance between two adjacent second pins 6 is greater than or equal to 15 μm.

It will be noted that the outer dimensions and spacing of the second pins 6 may be adaptively designed based on changes in the size of the display panel 100, the size of the first bonding region B1, the number of the second pins 6, etc. The foregoing is intended to be an exemplary illustration only and is not intended to be a limitation on specific embodiments of the present disclosure.

Accordingly, in some embodiments, the touch and display driver integration chip 200 further includes two second output regions S2 respectively located at the left end and the right end of the touch and display driver integration chip 200. The touch and display driver integration chip 200 further includes a plurality of second connection blocks 8. The plurality of second connection blocks 8 are divided into two groups that are respectively arranged in the two second output regions S2.

The second connection blocks 8 are configured to output second touch signals, or configured to output no touch signal.

In a case where the touch and display driver integration chip 200 further includes the plurality of second touch connection blocks 73 and the plurality of second connection blocks 8, at least one of a second touch connection block 73 and a second connection block 8 is configured to output a second touch signal.

In some examples, the second touch connection block 73 is configured to output a second touch signal, and the second connection block 8 is configured to output a second touch signal.

In this case, the two groups of second connection blocks 8 are respectively connected to the two groups of second touch connection blocks 73. For example, each second touch connection block 73 is correspondingly connected to one second connection block 8 through one second connection line. It can be understood that in this case, for a group of second touch connection blocks 73 and a group of second connection blocks 8 that are connected correspondingly, the number of the second touch connection blocks 73 in the group is the same as the number of the second connection blocks 8 in the group.

With such a design, the second touch signal is output through the second touch connection block 73 and the second connection block 8 at the same time, thereby increasing the output stability of the second touch signal. For example, when either of the second touch connection block 73 and the second connection block 8 cannot output the signal normally, the other one can still output the second touch signal, thereby ensuring the output stability of the second touch signal.

The specific corresponding connection manner of a group of second touch connection blocks 73 and a group of second connection blocks 8 that are connected correspondingly is described later and will not be further described here.

In some other examples, the second touch connection block 73 is configured to output a second touch signal, and the second connection block 8 is configured to output no touch signal.

In this case, the second connection block 8 may be configured to output other signal lines as needed. The design is made accordingly depending on actual needs, and is herein only as an exemplary illustration of possible embodiments, and not as a limitation on the specific embodiments of the present disclosure.

In yet some other examples, the second touch connection block 73 is configured to output no touch signal, and the second connection block 8 is configured to output a second touch signal.

In this case, the plurality of first connection blocks 7 in the first output region S1 may not include any second touch connection block 73, so compared to a case where the plurality of second touch connection blocks 73 are included, the number of the first connection blocks 7 in the first output region S1 is reduced, and the distance of adjacent first connection blocks 7 is larger, which is favorable for heat dissipation. Moreover, since the number of the first connection blocks 7 in the first output region S1 is reduced, the size of each first connection block 7 may be increased accordingly, thereby increasing the connection area of the first connection block 7 and the first pin 3 in the display panel 100, thereby improving the connection stability.

In some embodiments, in the display panel 100, as shown in FIGS. 4, 7, 8 and 9, the touch structure 1 includes P first touch channels 11 arranged in parallel and at intervals along the second direction Y, P≥3, with each first touch channel 11 extending along the first direction X. Along a direction from the third frame region K3 to the fourth frame region K4, the P first touch channels 11 are numbered in sequence as a first touch channel 11 (1), a first touch channel 11 (2), . . . , a first touch channel 11 (P).

In some embodiments, the display panel 100 includes a plurality of first touch leads 2. The number of the plurality of first touch leads 2 is P, and the plurality of first touch leads 2 are respectively connected to the P first touch channels 11.

For example, each first touch lead 2 has one end connected to one first touch channel 11, and the other end connected to one first touch pin 31 or one column of first touch pins 31.

According to the serial numbers of the first touch channels 11 correspondingly connected to the first touch leads 2, the P first touch leads 2 are numbered in sequence as a first touch lead 2 (1), a first touch lead 2 (2), . . . , a first touch lead 2 (P). According to the serial numbers of the first touch channels 11 correspondingly connected to the first touch pins 31, the P first touch pins 31 or the P columns of first touch pins 31 are numbered in sequence as a first touch pin 31 (1), a first touch pin 31 (2), . . . , a first touch pin 31 (P).

It will be noted that in a case where the P columns of first touch pins 31 are numbered in sequence as a first touch pin 31 (1), a first touch pin 31 (2), . . . , a first touch pin 31 (P), first touch pins 31 in the same column have the same serial number, and first touch pins 31 in different columns have different serial numbers.

The first touch channels 11, the first touch leads 2 and the first touch pins 31 are correspondingly connected according to their serial numbers. For example, a first touch channel 11 (T), a first touch lead 2 (T) and a first touch pin 31 (T) are connected in sequence, 1≤T≤P. Here, the first touch pin 31 (T) may be one first touch pin 31 (T) or one column of first touch pins 31 (T) with the same serial number.

For example, in a case where multiple first touch pins 31 (T) in the same column have the same serial number, the multiple first touch pins 31 (T) in the same column are electrically connected together, so when connected to any one of the multiple first touch pins 31 (T), a structure can be electrically connected to each of the multiple first touch pins 31 (T) with the same serial number in the column.

The following gives descriptions by taking an example that the touch structure 1 includes 40 first touch channels 11. Along the direction from the third frame region K3 to the fourth frame region K4, the 40 first touch channels 11 are numbered in sequence as a first touch channel 11 (1), a first touch channel 11 (2), . . . , a first touch channel 11 (40).

In a case where the touch structure 1 includes 40 first touch channels 11, and each first touch lead 2 has one end connected to one first touch channel 11, and the other end connected to one first touch pin 31, the display panel 100 includes 40 first touch leads 2 and 40 first touch pins 31. According to the serial numbers of the first touch channels 11 correspondingly connected to the first touch leads 2, the 40 first touch leads 2 are numbered in sequence as a first touch lead 2 (1), a first touch lead 2 (2), . . . , a first touch lead 2 (40). According to the serial numbers of the first touch channels 11 correspondingly connected to the first touch pins 31, the 40 first touch pins 31 are numbered in sequence as a first touch pin 31 (1), a first touch pin 31 (2), . . . , a first touch pin 31 (40).

In a case where the touch structure 1 includes 40 first touch channels 11, and each first touch lead 2 has one end connected to one first touch channel 11, and the other end connected to one column of first touch pins 31, the display panel 100 includes 40 first touch leads 2 and 120 first touch pins 31. According to the serial numbers of the first touch channels 11 correspondingly connected to the first touch pins 31, 40 columns of first touch pins 31 are numbered in sequence as a first touch pin 31 (1), a first touch pin 31 (2), . . . , a first touch pin 31 (40), where first touch pins 31 in each column have the same serial number, and a first touch lead 2 corresponding to a column of first touch pins 31 with the same serial number is connected to each first touch pin 31 in this column.

It will be noted that a situation in which a first touch lead 2 corresponding to a column of first touch pins 31 with the same serial number is connected to each first touch pin 31 in this column may be that these first touch pins 31 with the same serial number in the same column are electrically connected, and upon connecting any one of the first touch pins 31, the first touch lead 2 can be electrically connected to all the first touch pins 31 with the same serial number in this column; alternatively, it may be that the first touch lead 2 is electrically connected to each of the first touch pins 31 with the same serial number in this column. It can be understood that to ensure the normal transmission of the touch signal, it is sufficient that a touch pin (e.g., the first touch pin 31) is able to be connected to a touch lead CK (e.g., the first touch lead 2) corresponding thereto, so as to implement the signal transmission, and the foregoing is only an exemplary illustration and is not intended as a limitation of the present disclosure.

In some embodiments, in the display panel 100, as shown in FIGS. 4 and 7, the first touch lead 2 (1) to the first touch lead 2 (P−x) lead from the first frame region K1, 1≤x<x+1≤P; and in a region in proximity to a side of the first bonding region B1 proximate to the display region AA, serial numbers of these first touch leads 2 become larger in sequence along a direction from the first frame region K1 to the reference midline C.

The first touch lead 2 (P−x+1) to the first touch lead 2 (P) lead from the second frame region K2; and in the region in proximity to the side of the first bonding region B1 proximate to the display region AA, serial numbers of these first touch leads 2 become larger in sequence along a direction from the second frame region K2 to the reference midline C.

Figure 8:
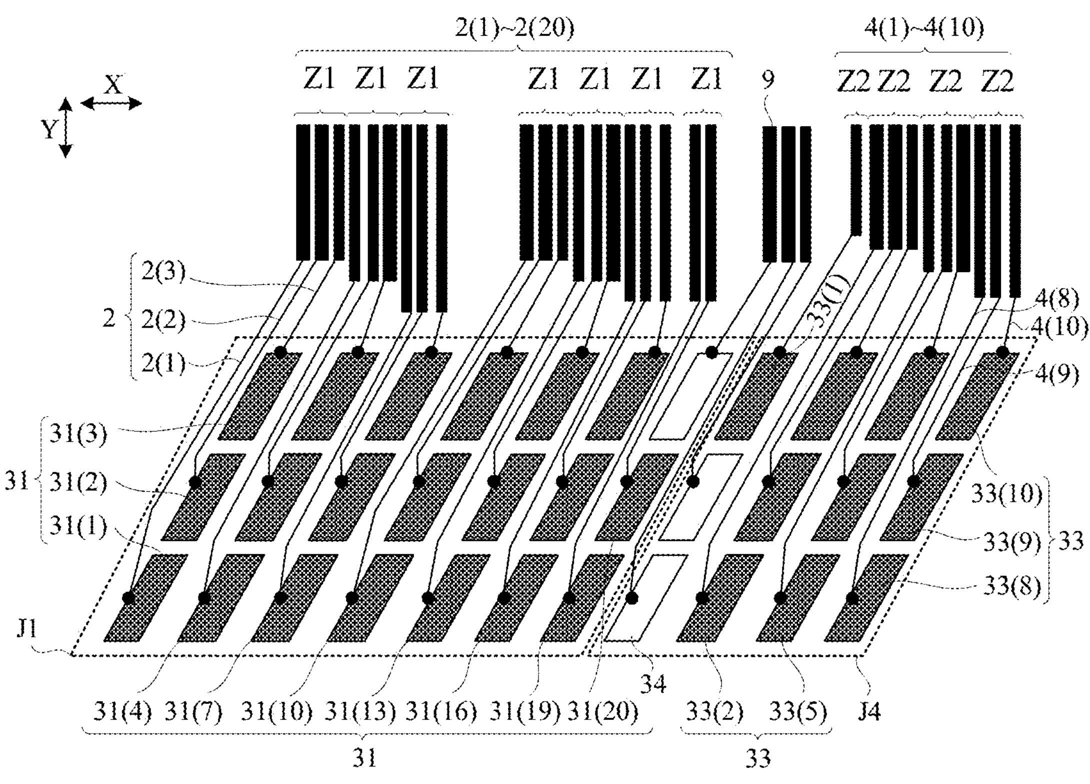
FIG. 8 is an enlarged view showing a structure of the region M, in accordance with FIG. 4.
Figure 9:
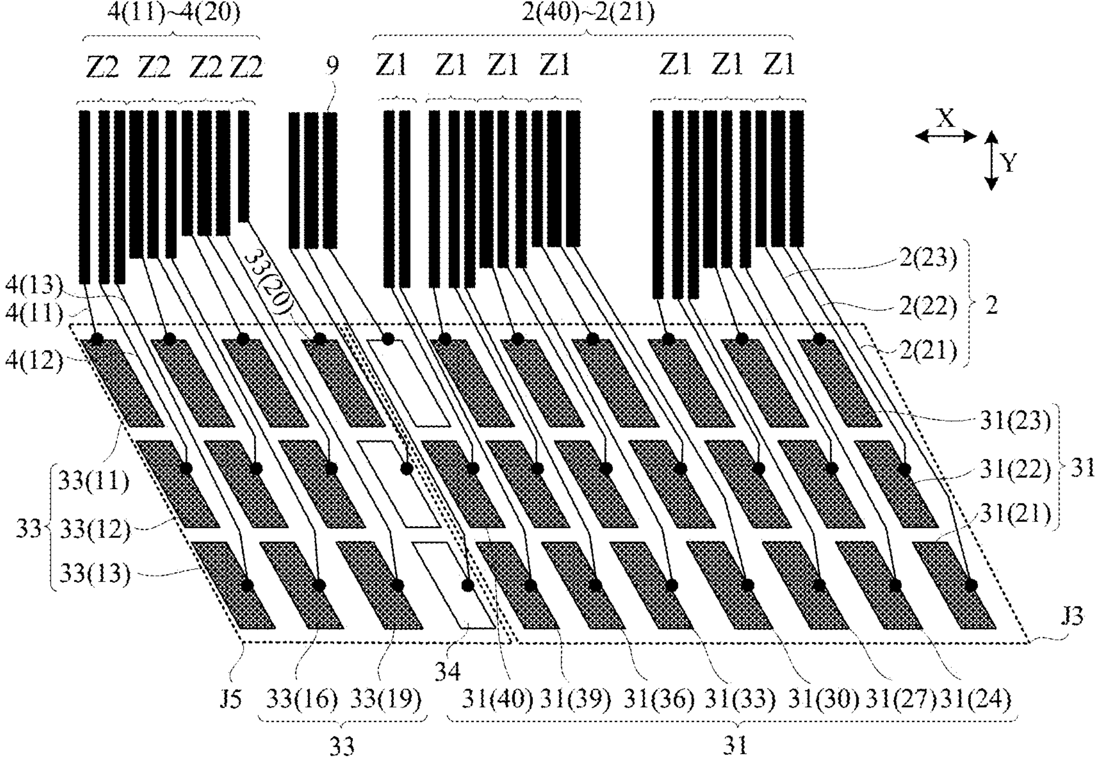
FIG. 9 is an enlarged view showing a structure of the region N, in accordance with FIG. 4.
Figure 10:
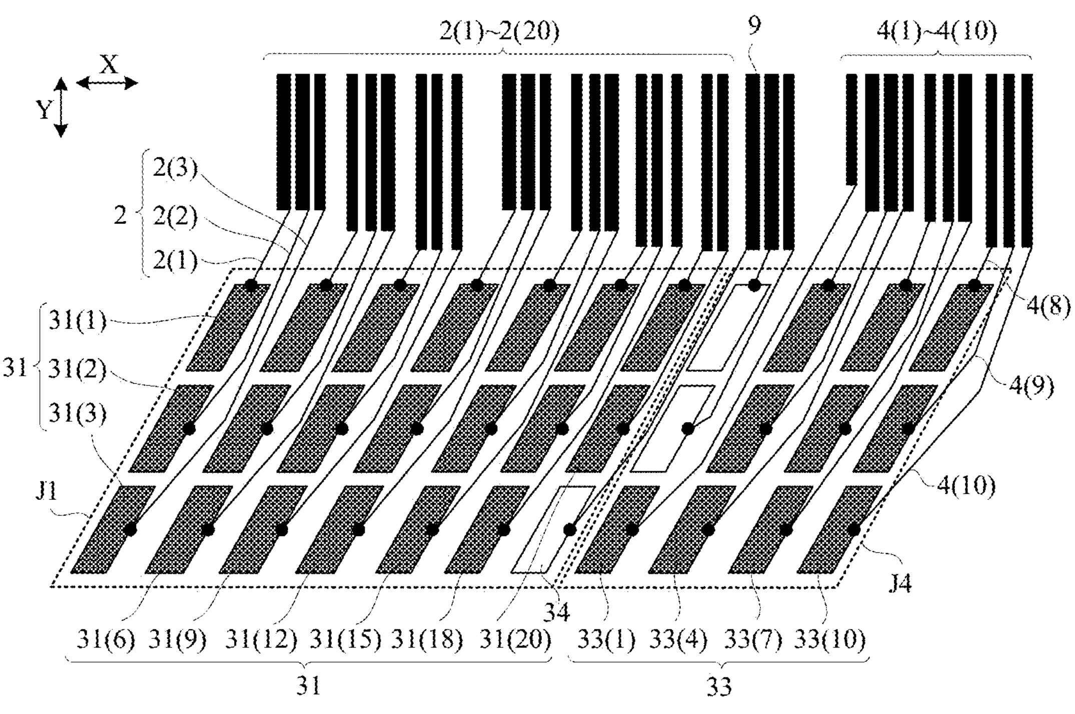
FIG. 10 is an enlarged view showing another structure of the region M, in accordance with FIG. 4.
Figure 11:
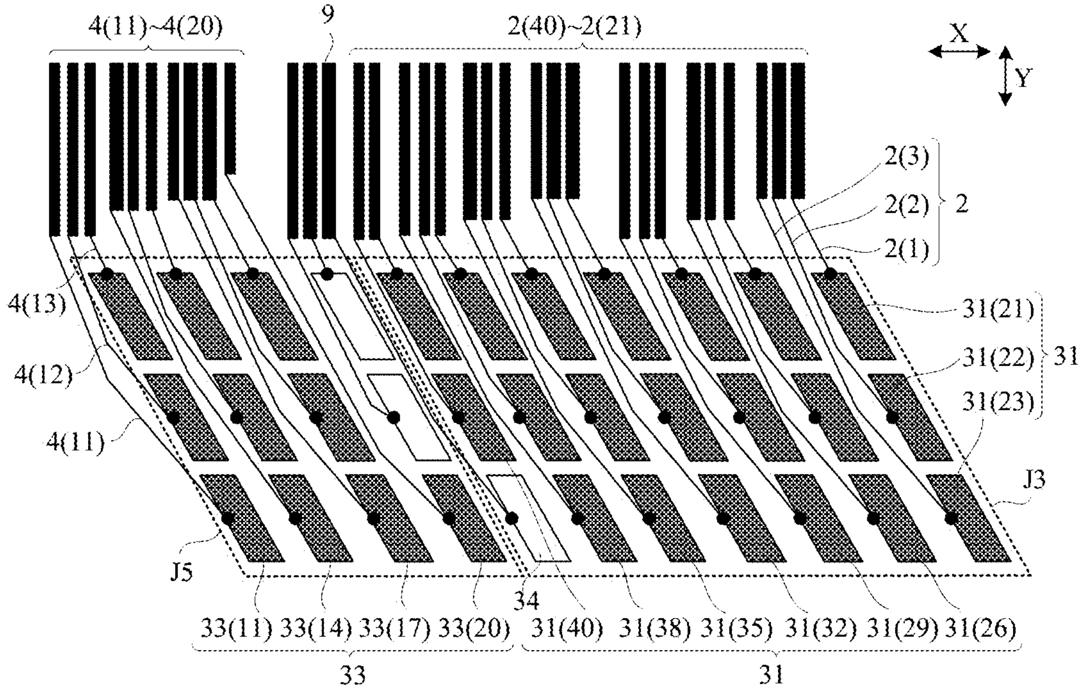
FIG. 11 is an enlarged view showing another structure of the region N, in accordance with FIG. 4.
Figure 12:
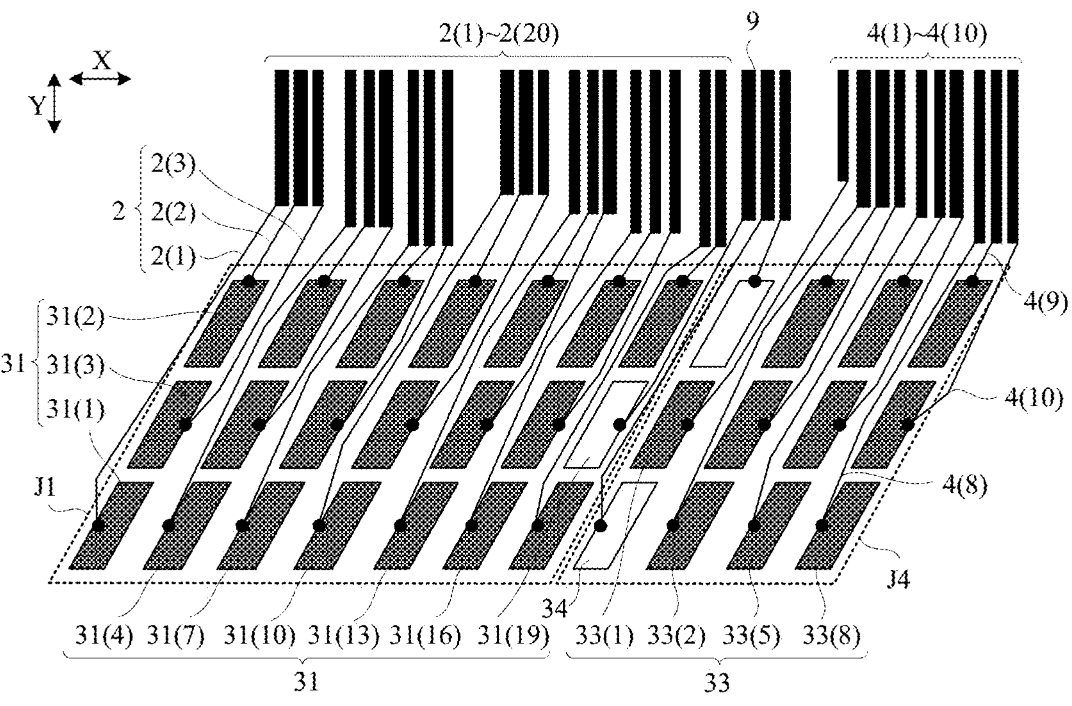
FIG. 12 is an enlarged view showing yet another structure of the region M, in accordance with FIG. 4.
Figure 13:
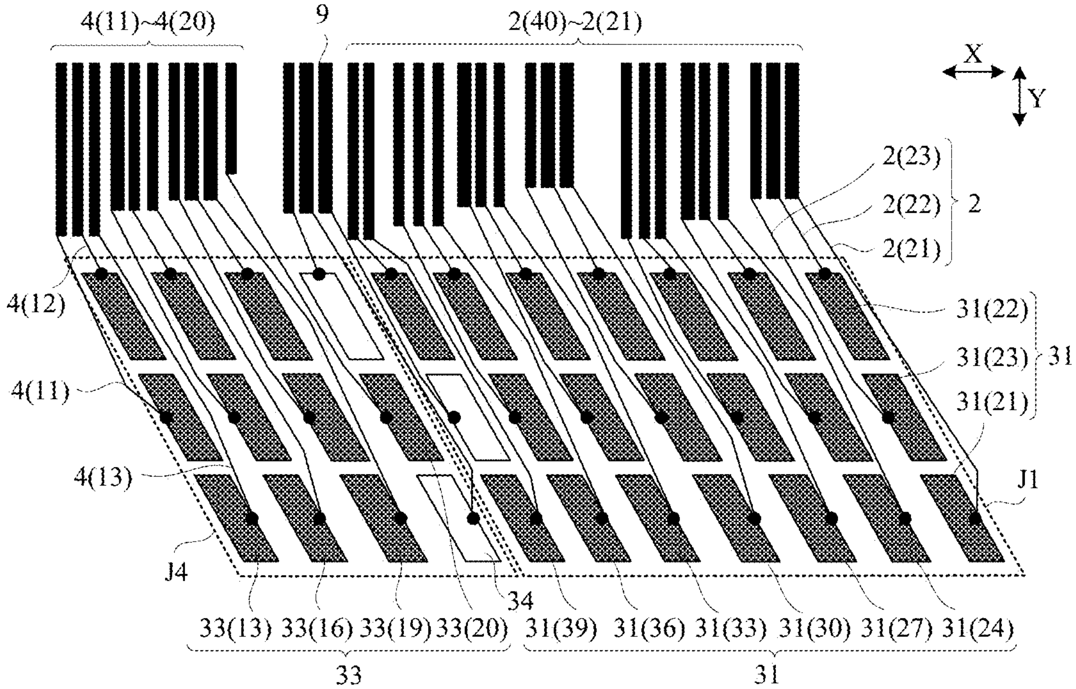
FIG. 13 is an enlarged view showing yet another structure of the region N, in accordance with FIG. 4.
Figure 14:
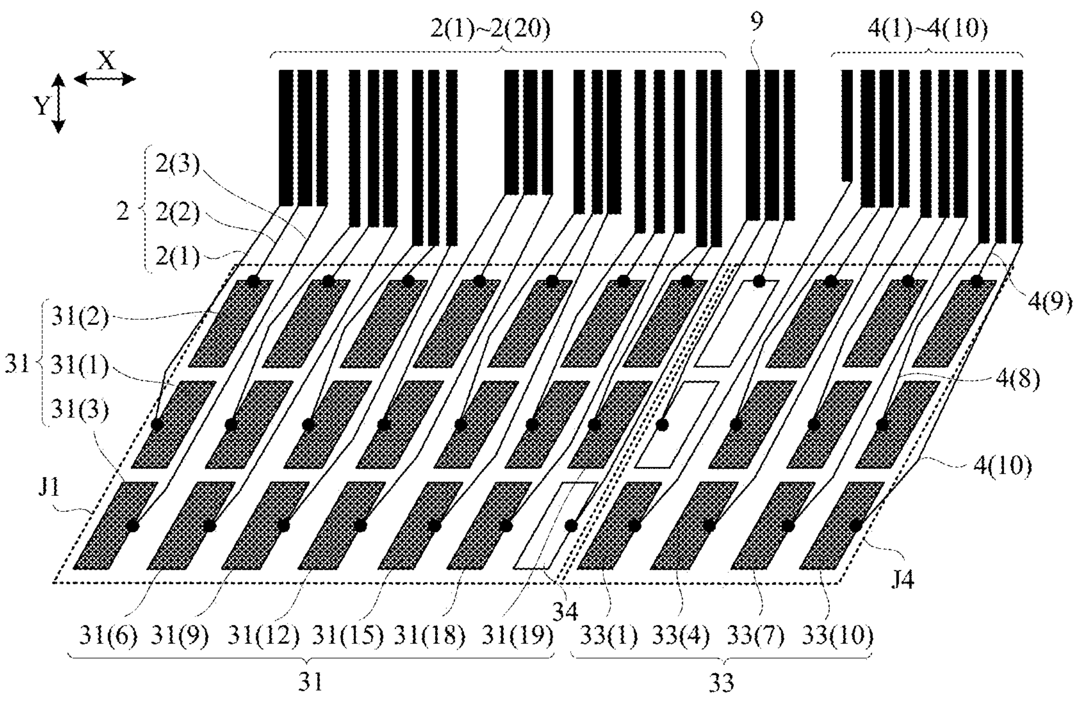
FIG. 14 is an enlarged view showing still another structure of the region M, in accordance with FIG. 4.
Figure 15:
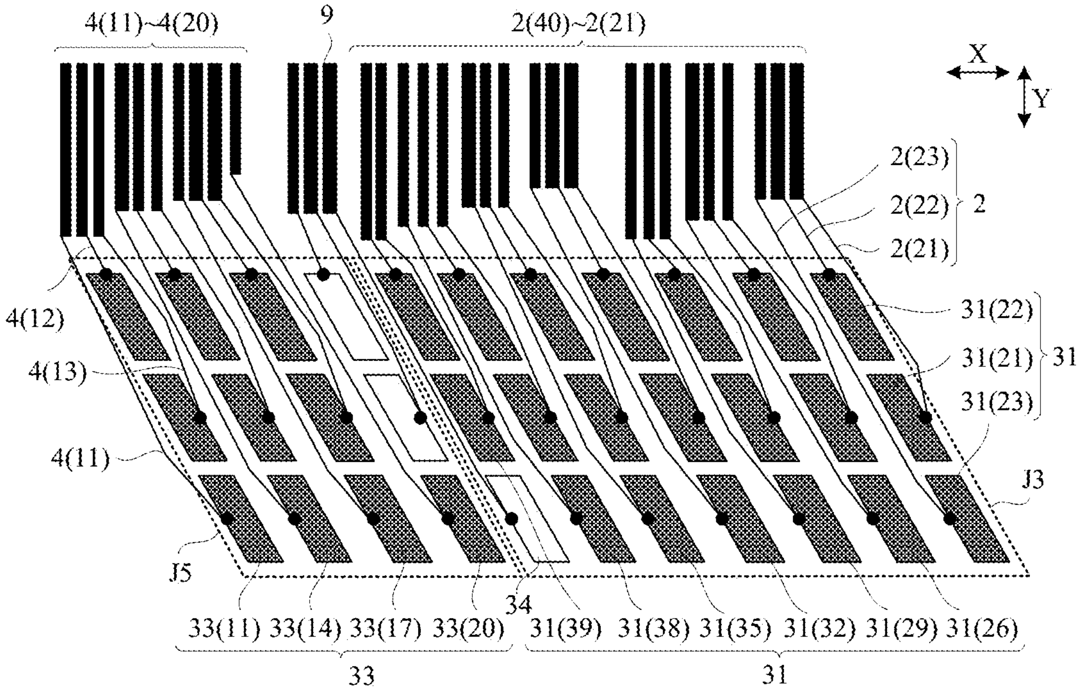
FIG. 15 is an enlarged view showing still another structure of the region N, in accordance with FIG. 4.

For example, as shown in FIGS. 7, 8 and 9, taking an example that the display panel 100 includes 40 first touch leads 2, in the 40 first touch leads 2, the first touch lead 2 (1) to the first touch lead 2 (20) are grouped into one group leading from the first frame region K1 and extending to the first pin region J1, and are correspondingly connected to the first touch pin 31 (1) to the first touch pin 31 (20). Along the direction from the left side to the right side in FIGS. 7 and 8, the first touch lead 2 (1) to the first touch lead 2 (20) are arranged in sequence, for example, in the order of their serial numbers.

The first touch lead 2 (21) to the first touch lead 2 (40) are grouped into one group leading from the second frame region K2 and extending to the third pin region J3, and are correspondingly connected to the first touch pin 31 (21) to the first touch pin 31 (40). Along the direction from the right side to the left side in FIGS. 7 and 9, the first touch lead 2 (21) to the first touch lead 2 (40) are arranged in sequence, for example, in the order of their serial numbers.

At the side of the first bonding region B1 proximate to the display region AA, in the direction from the left side to the right side in FIGS. 7 and 8, the first touch lead 2 (1), the first touch lead 2 (2), . . . , the first touch lead 2 (10) are arranged in sequence in the order of ascending serial numbers, and in the direction from the right side to the left side in FIGS. 7 and 9, the first touch lead 2 (11), the first touch lead 2 (12), . . . , the first touch lead 2 (20) are arranged in sequence in the order of ascending serial numbers.

In some other embodiments, in the display panel 100, as shown in FIGS. 4, 7 and 8, in the first touch lead 2 (1) to the first touch lead 2 (P), first touch leads 2 with odd serial numbers are grouped into one group leading from the first frame region K1; and in a region in proximity to a side of the first bonding region B1 proximate to the display region AA, serial numbers of these first touch leads 2 become larger in sequence along a direction from the first frame region K1 to the reference midline C.

In the first touch lead 2 (1) to the first touch lead 2 (P), first touch leads 2 with even serial numbers are grouped into one group leading from the second frame region K2; and in the region in proximity to the side of the first bonding region B1 proximate to the display region AA, serial numbers of these first touch leads 2 become larger in sequence along a direction from the second frame region K2 to the reference midline C.

For example, taking an example that the display panel 100 includes 40 first touch leads 2, the 40 first touch leads 2 are divided into an odd-numbered group and an even-numbered group according to their serial numbers. For example, the first touch lead 2 (1), the first touch lead 2 (3), . . . , the first touch lead 2 (39) are grouped into the odd-numbered group, leading from the first frame region K1 and extending to the first pin region J1, and are correspondingly connected to the first touch pin 31 (1), the first touch pin 31 (3), . . . , the first touch pin 31 (39).

The first touch lead 2 (2), the first touch lead 2 (4), . . . , the first touch lead 2 (40) are grouped into the even-numbered group, leading from the second frame region K2, and extending to the third pin region J3, and are correspondingly connected to the first touch pin 31 (2), the first touch pin 31 (4), . . . , the first touch pin 31 (40).

At the side of the first bonding region B1 proximate to the display region AA, in the direction from the left side to the right side in FIG. 7, the first touch lead 2 (1), the first touch lead 2 (3), . . . , the first touch lead 2 (39) are arranged in sequence in the order of ascending serial numbers, and in the direction from the right side to the left side in FIG. 7, the first touch lead 2 (2), the first touch lead 2 (4), . . . , the first touch lead 2 (40) are arranged in sequence in the order of ascending serial numbers.

It can be understood that in a case where the plurality of first touch leads 2 are divided into two groups respectively leading from the first frame region K1 and the second frame region K2, and respectively extending to the first pin region J1 and the third pin region J3, the grouping leading manner of the plurality of first touch leads 2 includes, but is not limited to, the above situations. For example, all of the plurality of first touch leads 2 may lead from the first frame region K1 and extend to the first pin region J1, or may lead from the second frame region K2 and extend to the third pin region J3. The corresponding design is made depending on actual needs, and the foregoing is only an illustration of possible implementations, which is not intended to be a limitation on the specific implementations of the present disclosure.

The following gives descriptions by taking an example that the display panel 100 includes 40 first touch leads 2, in which the first touch lead 2 (1) to the first touch lead 2 (20) are grouped into one group leading from the first frame region K1 and extending to the first pin region J1, and the first touch lead 2 (21) to the first touch lead 2 (40) are grouped into one group leading from the second frame region K2 and extending to the third pin region J3.

In some embodiments, in the display panel 100, as shown in FIGS. 4, 6 and 7, the number of the plurality of first touch pins 31 is P, and the plurality of first touch pins 31 are respectively connected to the P first touch channels 11. The P first touch pins 31 are numbered in sequence as a first touch pin 31 (1), a first touch pin 31 (2), . . . , a first touch pin 31 (P). Each column of first touch pins 31 includes N first touch pins 31 with consecutive serial numbers.

The first touch pin 31 (1) to the first touch pin 31 (P−x) are arranged in the first pin region J1, $1 \le x < x+1 \le P$; and along a direction from the first frame region K1 to the reference midline C, serial numbers of first touch pins 31 in each row become larger in sequence and are of an arithmetic progression with a difference of N.

The first touch pin 31 (P−x+1) to the first touch pin 31 (P) are arranged in the third pin region J3; and along a direction from the second frame region K2 to the reference midline C, serial numbers of first touch pins 31 in each row become larger in sequence and are of an arithmetic progression with a difference of N. Here, the reference midline C is a midline of the display panel 100 along the second direction Y.

The P first touch leads 2 are divided into multiple sub-groups Z1, with each sub-group Z1 including N first touch leads 2 positioned adjacent to each other. A column of first touch pins 31 includes N first touch pins 31, the N first touch leads 2 of each sub-group Z1 are respectively connected to N first touch pins 31 in one column, and serial numbers of N first touch pins 31 in each column are consecutive.

It will be noted that a column of first touch pins 31 includes at least one first touch pin 31. Serial numbers of N first touch pins 31 in each column are consecutive, which means that in a case where a column of first touch pins 31 includes multiple (two or more than two) first touch pins 31, serial numbers of the multiple first touch pins 31 in the same column are consecutive, moreover the multiple first touch pins 31 with consecutive serial numbers in the same column may be arranged in sequence along the column direction in the order of their serial numbers, or may be arranged in sequence along the column direction but not in the order of their serial numbers.

For example, as shown in FIGS. 8 to 15, the plurality of first touch pins 31 are arranged in 3 rows, in which multiple first touch pins 31 in each row are arranged in sequence along the first direction X, and each column of first touch pins 31 includes at least one first touch pin 31.

The following gives descriptions by taking an example that the number of the first touch pins 31 included in the display panel 100 is 40, according to the serial numbers of the first touch channels 11 correspondingly connected to the first touch pins 31, the 40 first touch pins 31 are numbered in sequence as a first touch pin 31 (1), a first touch pin 31 (2), . . . , a first touch pin 31 (40).

The first touch pin 31 (1) to the first touch pin 31 (20) are arranged in the first pin region J1; and serial numbers of first touch pins 31 in the same row become larger in sequence along the direction from the left side to the right side in FIGS. 8, 10, 12 and 14.

The first touch pin 31 (21) to the first touch pin 31 (40) are arranged in the third pin region J3; and serial numbers of first touch pins 31 in the same row become smaller in sequence along the direction from the left side to the right side in FIGS. 9, 11, 13 and 15.

In some examples, the plurality of first touch pins 31 are arranged in 3 rows. As shown in FIGS. 8, 10, 12 and 14, in 3 rows of first touch pins 31 in the first pin region J1, serial numbers of first touch pins 31 in the same column are consecutive; and along the first direction X and in the direction from the first pin region J1 pointing to the reference midline C, serial numbers of first touch pins 31 in the same row become larger in sequence and are of an arithmetic progression with a difference of 3. As shown in FIGS. 9, 11, 13 and 15, in 3 rows of first touch pins 31 in the third pin region J3, serial numbers of first touch pins 31 in the same column are consecutive; and along the first direction X and in the direction from the third pin region J3 pointing to the reference midline C, serial numbers of first touch pins 31 in the same row become larger in sequence and are of an arithmetic progression with a difference of 3.

The three first touch pins 31 in the first column of first touch pins 31 along the direction from the left side to the right side in FIGS. 8, 10, 12 and 14 are the first touch pin 31 (1), the first touch pin 31 (2) and the first touch pin 31 (3) in sequence. The first touch pin 31 (1), the first touch pin 31 (2) and the first touch pin 31 (3) may be arranged along the column direction in the order of ascending serial numbers, or in the order of descending serial numbers, or not in the order of serial numbers.

The three first touch pins 31 in the first column of first touch pins 31 along the direction from the right side to the left side in FIGS. 9, 11, 13 and 15 are the first touch pin 31 (21), the first touch pin 31 (22) and the first touch pin 31 (23) in sequence. The first touch pin 31 (21), the first touch pin 31 (22) and the first touch pin 31 (23) may be arranged along the column direction in the order of ascending serial numbers, or in the order of descending serial numbers, or not in the order of serial numbers.

First touch pins 31 in the same row as the first touch pin 31 (1) are, from left to right, the first touch pin 31 (1), the first touch pin 31 (4), . . . , the first touch pin 31 (19). First touch pins 31 in the same row as the first touch pin 31 (2) are, from left to right, the first touch pin 31 (2), the first touch pin 31 (5), . . . , the first touch pin 31 (20). First touch pins 31 in the same row as the first touch pin 31 (3) are, from left to right, the first touch pin 31 (3), the first touch pin 31 (6), . . . , the first touch pin 31 (18).

First touch pins 31 in the same row as the first touch pin 31 (21) are, from right to left, the first touch pin 31 (21), the first touch pin 31 (24), . . . , the first touch pin 31 (39). First touch pins 31 in the same row as the first touch pin 31 (22) are, from right to left, the first touch pin 31 (22), the first touch pin 31 (25), . . . , the first touch pin 31 (40). First touch pins 31 in the same row as the first touch pin 31 (23) are, from right to left, the first touch pin 31 (23), the first touch pin 31 (26), . . . , the first touch pin 31 (38).

The multiple first touch pins 31 in the first pin region J1 and the multiple first touch pins 31 in the third pin region J3 may be arranged symmetrically about the second direction Y. In this case, the first touch pin 31 (1) and the first touch pin 31 (21) are located in the same row, the first touch pin 31 (2) and the first touch pin 31 (22) are located in the same row, and the first touch pin 31 (3) and the first touch pin 31 (23) are located in the same row. The symmetrical arrangement described here means that an arrangement path of the multiple first touch pins 31 in the first pin region J1 from small to large according to their serial numbers and an arrangement path of the multiple first touch pins 31 in the third pin region J3 from small to large according to their serial numbers are symmetrical about the second direction Y.

The specific arrangement of the first touch pins 31 arranged in 3 rows in FIGS. 8 to 15 is for illustrative purposes only and is not intended to be a limitation on the specific implementations of the present disclosure.

Figure 16:
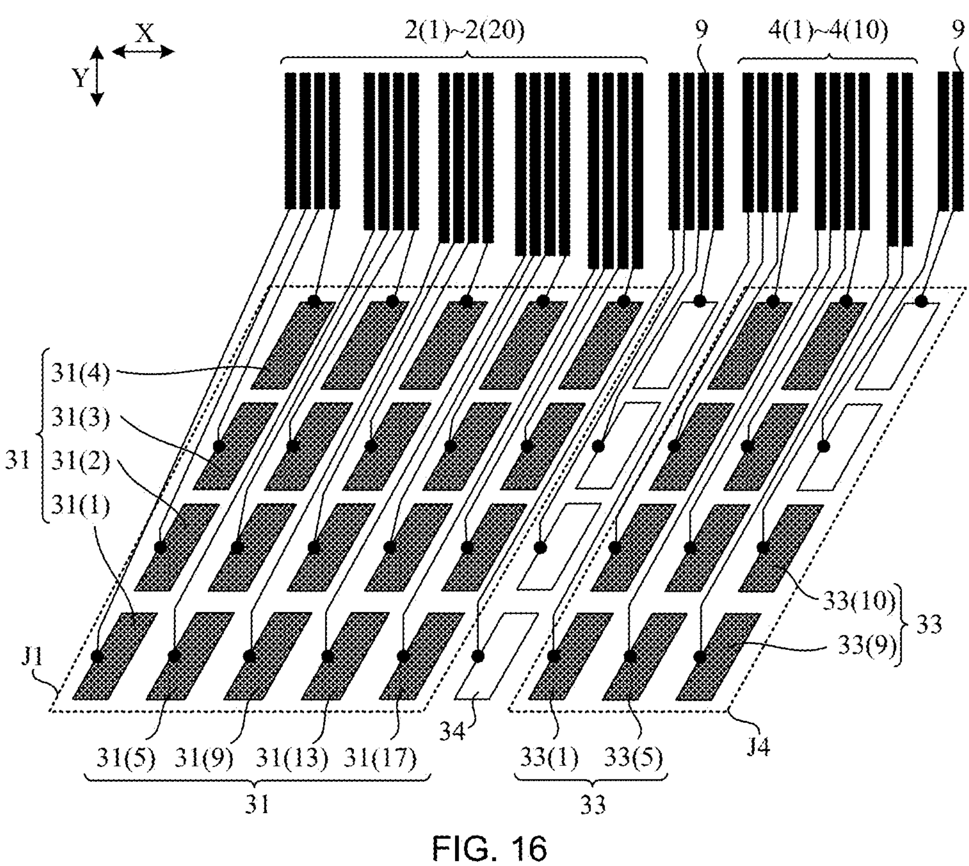
FIG. 16 is an enlarged view showing still yet another structure of the region M, in accordance with FIG. 4.
Figure 17:
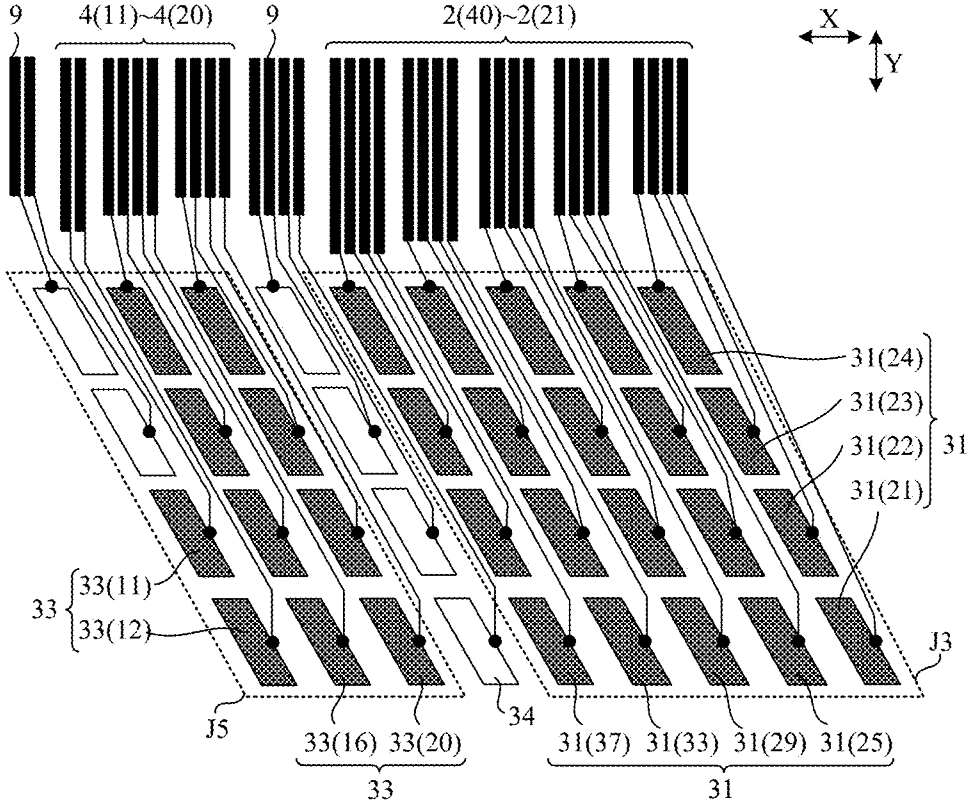
FIG. 17 is an enlarged view showing still yet another structure of the region N, in accordance with FIG. 4.

In some other examples, the plurality of first touch pins 31 are arranged in 4 rows. As shown in FIG. 16, in 4 rows of first touch pins 31 in the first pin region J1, serial numbers of first touch pins 31 in the same column are consecutive; and along the first direction X and in the direction from the first pin region J1 pointing to the reference midline C, serial numbers of first touch pins 31 in the same row become larger in sequence and are of an arithmetic progression with a difference of 4. As shown in FIG. 17, in 4 rows of first touch pins 31 in the third pin region J3, serial numbers of first touch pins 31 in the same column are consecutive; and along the first direction X and in the direction from the third pin region J3 pointing to the reference midline C, serial numbers of first touch pins 31 in the same row become larger in sequence and are of an arithmetic progression with a difference of 4.

The four first touch pins 31 in the first column of first touch pins 31 along the direction from the left side to the right side in FIG. 16 are the first touch pin 31 (1), the first touch pin 31 (2), the first touch pin 31 (3), and the first touch pin 31 (4) in sequence. The first touch pin 31 (1), the first touch pin 31 (2), the first touch pin 31 (3), and the first touch pin 31 (4) may be arranged along the column direction in the order of ascending serial numbers, or in the order of descending serial numbers, or not in the order of serial numbers.

The four first touch pins 31 in the first column of first touch pins 31 along the direction from the right side to the left side in FIG. 17 are the first touch pin 31 (21), the first touch pin 31 (22), the first touch pin 31 (23), and the first touch pin 31 (24) in sequence. The first touch pin 31 (21), the first touch pin 31 (22), the first touch pin 31 (23), and the first touch pin 31 (24) may be arranged along the column direction in the order of ascending serial numbers, or in the order of descending serial numbers, or not in the order of serial numbers.

First touch pins 31 in the same row as the first touch pin 31 (1) are, from left to right, the first touch pin 31 (1), the first touch pin 31 (5), . . . , the first touch pin 31 (17). First touch pins 31 in the same row as the first touch pin 31 (2) are, from left to right, the first touch pin 31 (2), the first touch pin 31 (6), . . . , the first touch pin 31 (18). First touch pins 31 in the same row as the first touch pin 31 (3) are, from left to right, the first touch pin 31 (3), the first touch pin 31 (7), . . . , the first touch pin 31 (19). First touch pins 31 in the same row as the first touch pin 31 (4) are, from left to right, the first touch pin 31 (4), the first touch pin 31 (8), . . . , the first touch pin 31 (20).

First touch pins 31 in the same row as the first touch pin 31 (21) are, from right to left, the first touch pin 31 (21), the first touch pin 31 (25), . . . , the first touch pin 31 (37). First touch pins 31 in the same row as the first touch pin 31 (22) are, from right to left, the first touch pin 31 (22), the first touch pin 31 (26), . . . , the first touch pin 31 (38). First touch pins 31 in the same row as the first touch pin 31 (23) are, from right to left, the first touch pin 31 (23), the first touch pin 31 (27), . . . , the first touch pin 31 (39). First touch pins 31 in the same row as the first touch pin 31 (24) are, from right to left, the first touch pin 31 (24), the first touch pin 31 (28), . . . , the first touch pin 31 (40).

The multiple first touch pins 31 in the first pin region J1 and the multiple first touch pins 31 in the third pin region J3 may be arranged symmetrically about the second direction Y. In this case, the first touch pin 31 (1) and the first touch pin 31 (21) are located in the same row, the first touch pin 31 (2) and the first touch pin 31 (22) are located in the same row, the first touch pin 31 (3) and the first touch pin 31 (23) are located in the same row, and the first touch pin 31 (4) and the first touch pin 31 (24) are located in the same row. The symmetrical arrangement described here means that an arrangement path of the multiple first touch pins 31 in the first pin region J1 from small to large according to their serial numbers and an arrangement path of the multiple first touch pins 31 in the third pin region J3 from small to large according to their serial numbers are symmetrical about the second direction Y.

For example, as shown in FIGS. 16 and 17, a portion of the plurality of second touch pins 33 are configured to be connected to the second touch leads 4, and another portion, serving as dummy pins 37, may be configured not to be connected to a touch signal line (e.g., the second touch lead 4 and the fourth touch lead 8), i.e., transmit no touch signal. At least some of these second touch pins 33 serving as dummy pins 37 (connected to no touch signal line and transmitting no touch signal) may also be accessed to other signals as needed. The specific accessed signals are designed depending on actual needs accordingly, and are only used herein as exemplary illustrations of possible implementations, which are not intended to be a limitation on the specific implementations of the present disclosure.

The specific arrangement of the first touch pins 31 arranged in 4 rows in FIGS. 16 and 17 is for illustrative purposes only and is not intended to be a limitation on the specific implementations of the present disclosure.

Figures 18, 19:
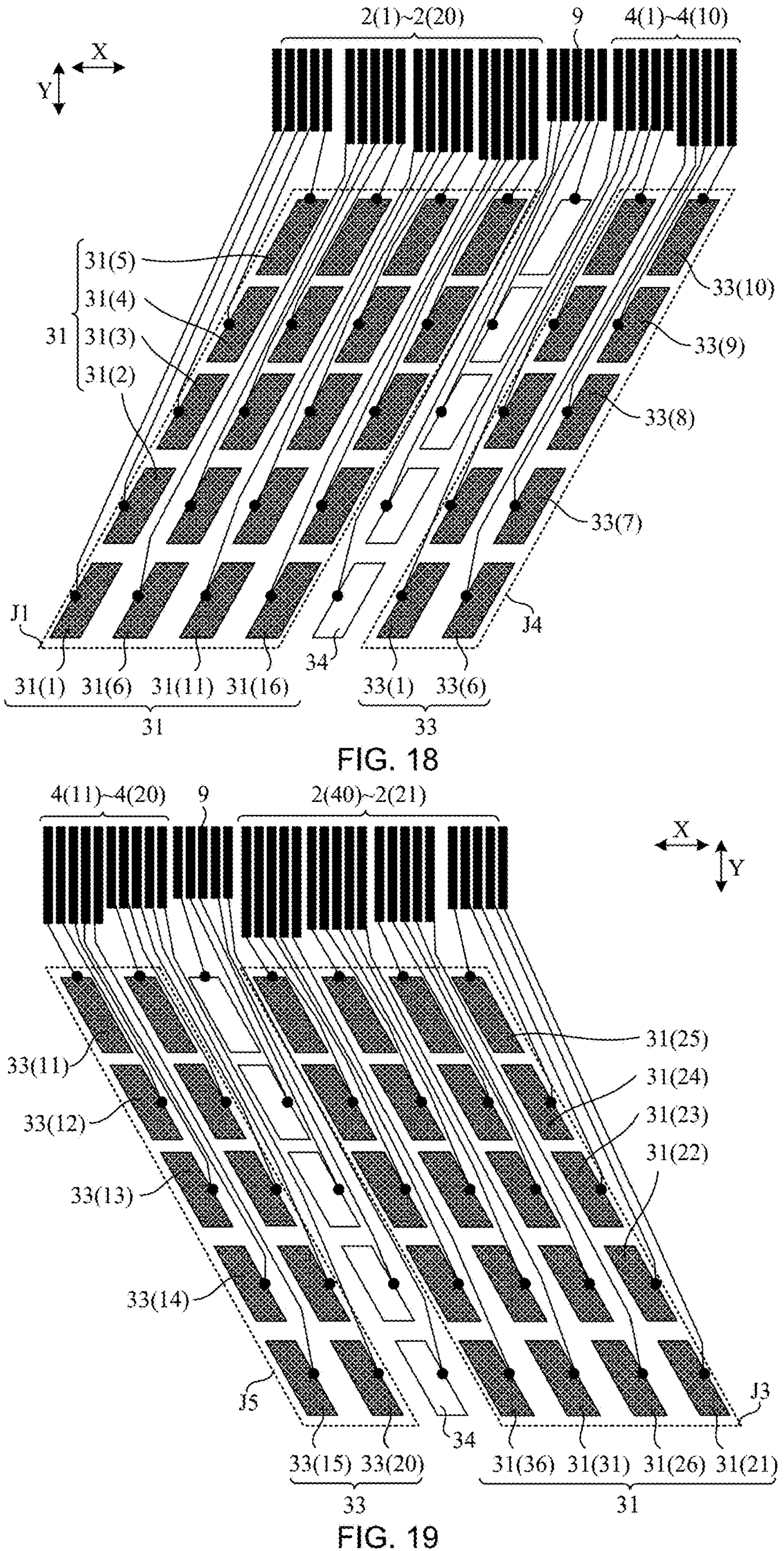
FIG. 18 is an enlarged view showing still yet another structure of the region M, in accordance with FIG. 4.
FIG. 19 is an enlarged view showing still yet another structure of the region N, in accordance with FIG. 4.
Figure 20:
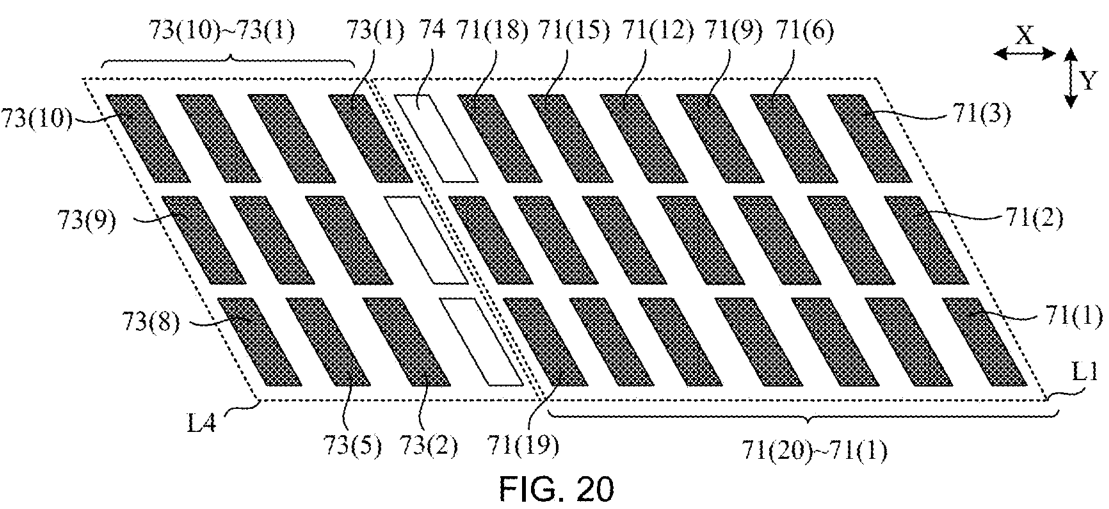
FIG. 20 is an enlarged view showing a structure of the region H, in accordance with FIG. 5.
Figure 21:
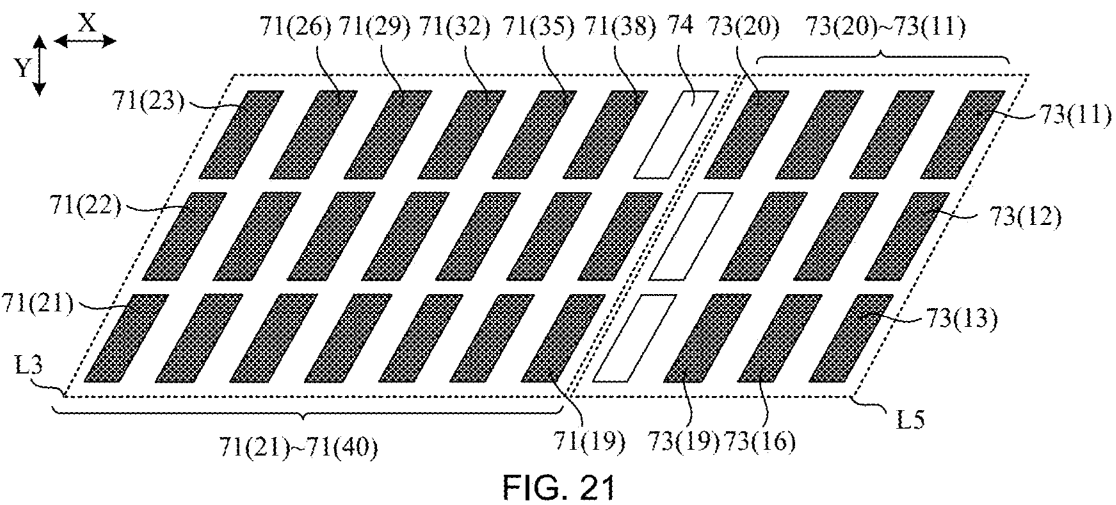
FIG. 21 is an enlarged view showing a structure of the region J, in accordance with FIG. 5.
Figure 22:
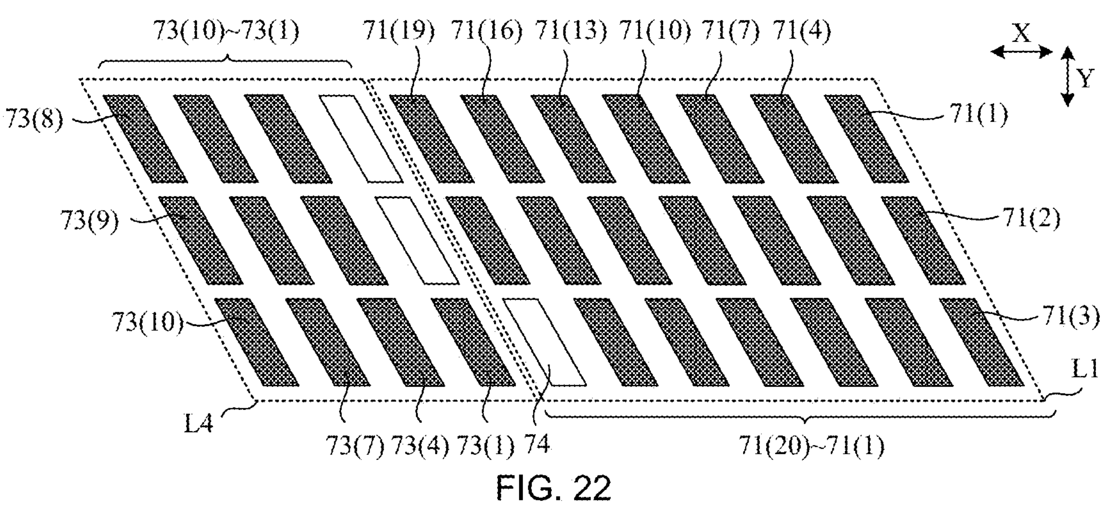
FIG. 22 is an enlarged view showing another structure of the region H, in accordance with FIG. 5.
Figure 23:
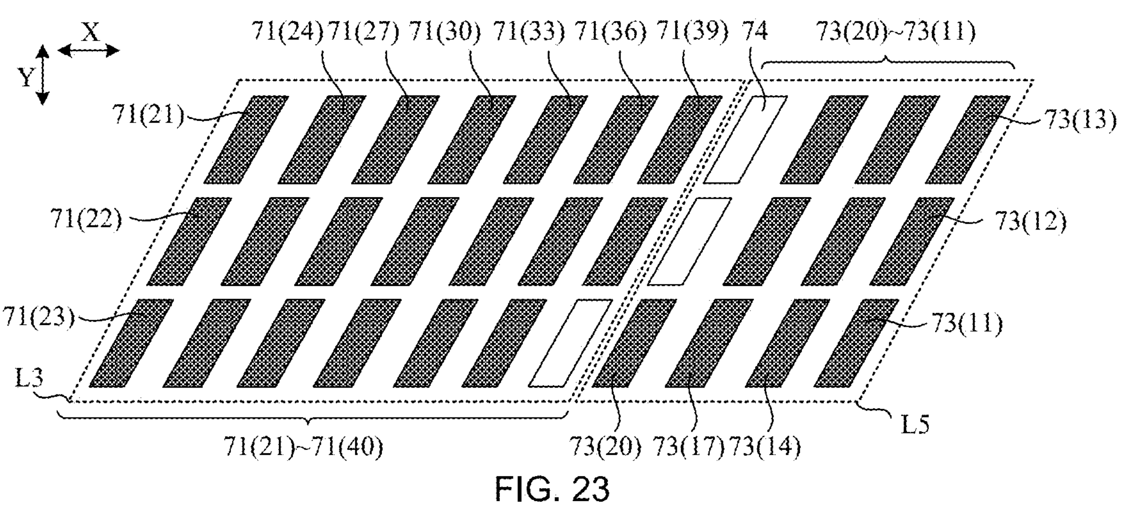
FIG. 23 is an enlarged view showing another structure of the region J, in accordance with FIG. 5.
Figure 24:
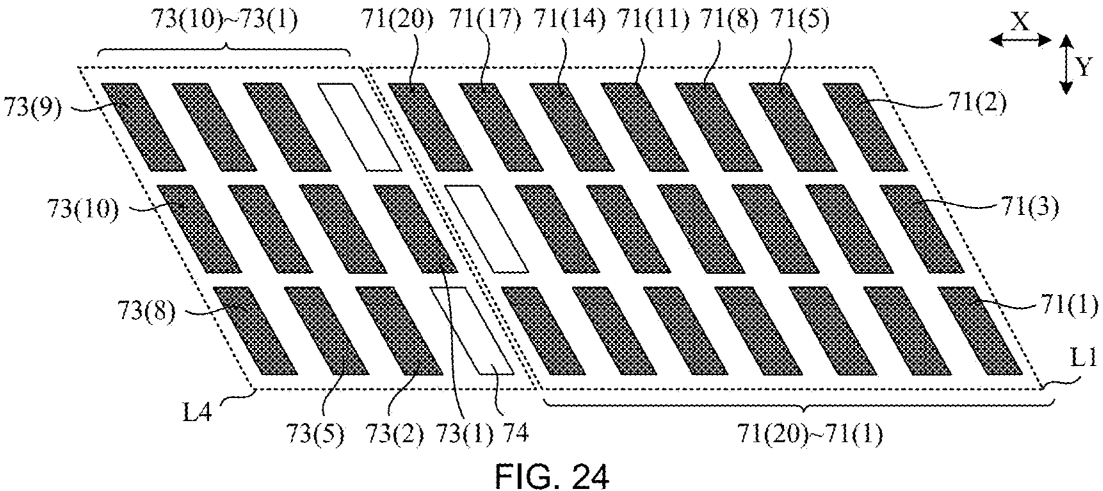
FIG. 24 is an enlarged view showing yet another structure of the region H, in accordance with FIG. 5.
Figure 25:
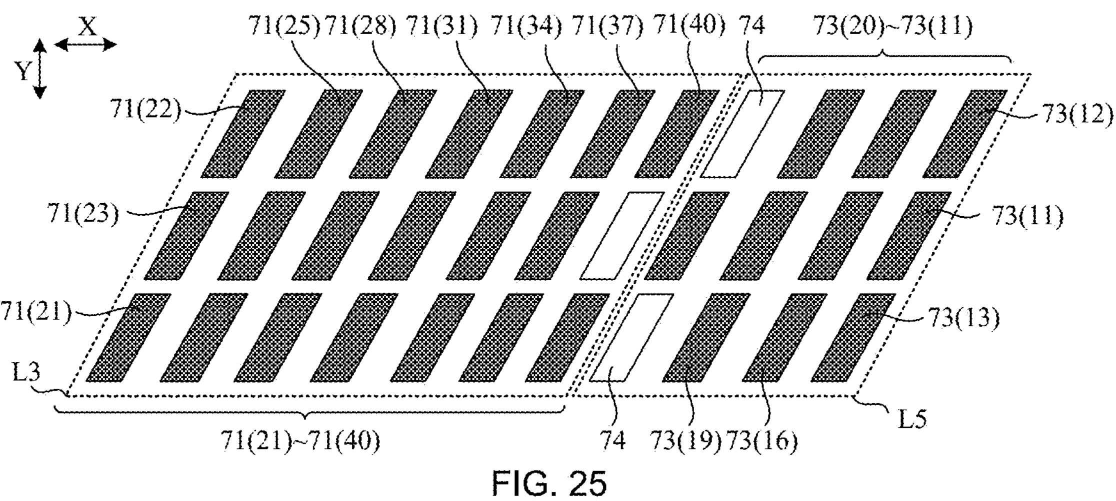
FIG. 25 is an enlarged view showing yet another structure of the region J, in accordance with FIG. 5.
Figure 26:
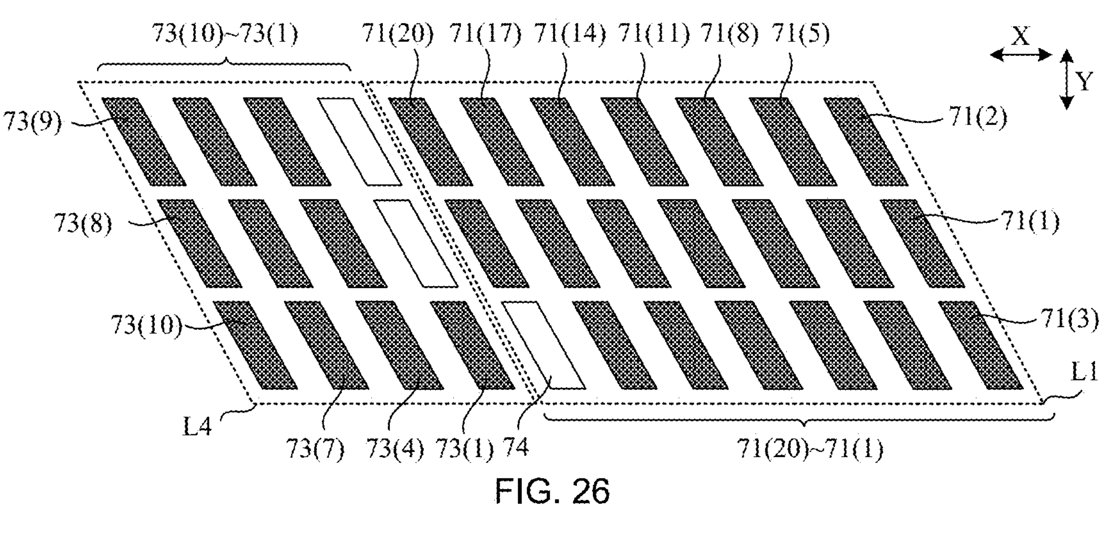
FIG. 26 is an enlarged view showing still another structure of the region H, in accordance with FIG. 5.
Figure 27:
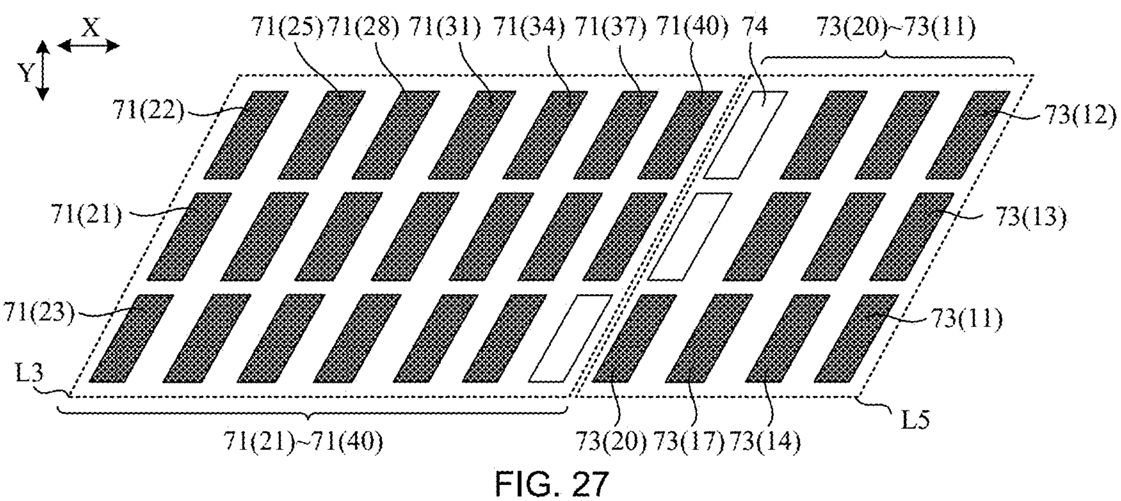
FIG. 27 is an enlarged view showing still another structure of the region J, in accordance with FIG. 5.

In yet some other examples, the plurality of first touch pins 31 are arranged in 5 rows. As shown in FIG. 18, in 5 rows of first touch pins 31 in the first pin region J1, serial numbers of first touch pins 31 in the same column are consecutive; and along the first direction X and in the direction from the first pin region J1 pointing to the reference midline C, serial numbers of first touch pins 31 in the same row become larger in sequence and are of an arithmetic progression with a difference of 5. As shown in FIG. 19, in 5 rows of first touch pins 31 in the third pin region J3, serial numbers of first touch pins 31 in the same column are consecutive; and along the first direction X and in the direction from the third pin region J3 pointing to the reference midline C, serial numbers of first touch pins 31 in the same row become larger in sequence and are of an arithmetic progression with a difference of 5.

The five first touch pins 31 in the first column of first touch pins 31 along the direction from the left side to the right side in FIG. 18 are the first touch pin 31 (1), the first touch pin 31 (2), the first touch pin 31 (3), the first touch pin 31 (4), and the first touch pin 31 (5) in sequence. The first touch pin 31 (1), the first touch pin 31 (2), the first touch pin 31 (3), the first touch pin 31 (4), and the first touch pin 31 (5) may be arranged along the column direction in the order of ascending serial numbers, or in the order of descending serial numbers, or not in the order of serial numbers.

The five first touch pins 31 in the first column of first touch pins 31 along the direction from the right side to the left side in FIG. 19 are the first touch pin 31 (21), the first touch pin 31 (22), the first touch pin 31 (23), the first touch pin 31 (24), and the first touch pin 31 (25) in sequence. The first touch pin 31 (21), the first touch pin 31 (22), the first touch pin 31 (23), the first touch pin 31 (24), and the first touch pin 31 (25) may be arranged along the column direction in the order of ascending serial numbers, or in the order of descending serial numbers, or not in the order of serial numbers.

First touch pins 31 in the same row as the first touch pin 31 (1) are, from left to right, the first touch pin 31 (1), the first touch pin 31 (6), the first touch pin 31 (11), and the first touch pin 31 (16). First touch pins 31 in the same row as the first touch pin 31 (2) are, from left to right, the first touch pin 31 (2), the first touch pin 31 (7), the first touch pin 31 (12), and the first touch pin 31 (17). First touch pins 31 in the same row as the first touch pin 31 (3) are, from left to right, the first touch pin 31 (3), the first touch pin 31 (8), the first touch pin 31 (13), and the first touch pin 31 (18). First touch pins 31 in the same row as the first touch pin 31 (4) are, from left to right, the first touch pin 31 (4), the first touch pin 31 (9), the first touch pin 31 (14), and the first touch pin 31 (19). First touch pins 31 in the same row as the first touch pin 31 (5) are, from left to right, the first touch pin 31 (5), the first touch pin 31 (10), the first touch pin 31 (15), and the first touch pin 31 (20).

First touch pins 31 in the same row as the first touch pin 31 (21) are, from right to left, the first touch pin 31 (21), the first touch pin 31 (26), the first touch pin 31 (31), and the first touch pin 31 (36). First touch pins 31 in the same row as the first touch pin 31 (22) are, from right to left, the first touch pin 31 (22), the first touch pin 31 (27), the first touch pin 31 (32), and the first touch pin 31 (37). First touch pins 31 in the same row as the first touch pin 31 (23) are, from right to left, the first touch pin 31 (23), the first touch pin 31 (28), the first touch pin 31 (33), and the first touch pin 31 (38). First touch pins 31 in the same row as the first touch pin 31 (24) are, from right to left, the first touch pin 31 (24), the first touch pin 31 (29), the first touch pin 31 (34), and the first touch pin 31 (39). First touch pins 31 in the same row as the first touch pin 31 (25) are, from right to left, the first touch pin 31 (25), the first touch pin 31 (30), the first touch pin 31 (35), and the first touch pin 31 (40).

The multiple first touch pins 31 in the first pin region J1 and the multiple first touch pins 31 in the third pin region J3 may be arranged symmetrically about the second direction Y. In this case, the first touch pin 31 (1) and the first touch pin 31 (21) are located in the same row, the first touch pin 31 (2) and the first touch pin 31 (22) are located in the same row, the first touch pin 31 (3) and the first touch pin 31 (23) are located in the same row, the first touch pin 31 (4) and the first touch pin 31 (24) are located in the same row, and the first touch pin 31 (5) and the first touch pin 31 (25) are located in the same row. The symmetrical arrangement described here means that an arrangement path of the multiple first touch pins 31 in the first pin region J1 from small to large according to their serial numbers and an arrangement path of the multiple first touch pins 31 in the third pin region J3 from small to large according to their serial numbers are symmetrical about the second direction Y.

The specific arrangement of the first touch pins 31 arranged in 5 rows in FIGS. 18 and 19 is for illustrative purposes only and is not intended to be a limitation on the specific implementations of the present disclosure.

It will be noted that in the display panel 100, the plurality of first touch pins 31 may, alternatively, be arranged in 2 rows, 6 rows, 7 rows or more rows. The specific number and arrangement of the first touch pins 31 are designed accordingly depending on actual needs. It can be understood that the arrangement of the plurality of first touch pins 31 includes, but is not limited to, the above examples, which are only used as illustrative descriptions here and not as a limitation on the specific implementations of the present disclosure.

In some embodiments, as shown in FIGS. 8 to 19, in the N rows of first touch pins 31 arranged in the first bonding region B1 of the display panel 100, in a case where multiple first touch pins 31 in the same column have different serial numbers, some of the plurality of first touch leads 2 are each connected to a corresponding first touch pin 31 through a gap between first pins 3 arranged adjacent to each other along the first direction X, and a line width of a portion of the first touch lead 2 located in the gap is less than a line width of a portion thereof located outside the first bonding region B1.

For example, as shown in FIGS. 6 to 19, in the 40 first touch leads 2 included in the display panel 100, the first touch lead 2 (1) to the first touch lead 2 (20) are grouped into one group leading from the first frame region K1 and extending to the first pin region J1, and are correspondingly connected to the first touch pin 31 (1) to the first touch pin 31 (20); and the first touch lead 2 (21) to the first touch lead 2 (40) are grouped into one group leading from the second frame region K2 and extending to the third pin region J3, and are correspondingly connected to the first touch pin 31 (21) to the first touch pin 31 (40).

The spacing between two adjacent first pins 3 (e.g., first touch pins 31) along the first direction X ranges from 10 μm to 15 μm. As shown in FIGS. 8 to 19, at least some of the plurality of first touch leads 2 are each connected to a corresponding first touch pin 31 passing through two adjacent first touch pins 31, and a line width of a portion of the first touch lead 2 located between the two adjacent first touch pins 31 ranges, for example, from 2 μm to 3 μm, and a line width of a portion of the first touch lead 2 located outside the first pin region J1 and the third pin region J3 is greater than or equal to 3 μm.

Accordingly, in some embodiments, in the touch and display driver integration chip 200, as shown in FIGS. 5 and 20 to 31, the number of the plurality of first touch connection blocks 71 is P, P≥3. The plurality of first touch connection blocks 71 are numbered in sequence as a first touch connection block 71 (1), a first touch connection block 71 (2), . . . , a first touch connection block 71 (P), and are configured to respectively output first touch signals to the P first touch channels 11 of the display panel 100. Each column of first touch connection blocks 71 includes N first touch connection blocks 71 with consecutive serial numbers.

The first touch connection block 71 (1) to the first touch connection block 71 (P−x) are arranged in the first connection region L1, 1≤x<x+1≤P; and along a direction from the right end of the touch and display driver integration chip 200 to the center of the touch and display driver integration chip 200, serial numbers of first touch connection blocks 71 in each row become larger in sequence and are of an arithmetic progression with a difference of N.

The first touch connection block 71 (P−x+1) to the first touch connection block 71 (P) are arranged in the third connection region L3; and along a direction from the left end of the touch and display driver integration chip 200 to the center of the touch and display driver integration chip 200, serial numbers of first touch connection blocks 71 in each row become larger in sequence and are of an arithmetic progression with a difference of N.

It will be noted that a column of first touch connection blocks 71 includes at least one first touch connection block 71. Serial numbers of N first touch connection blocks 71 in each column are consecutive, which means that in a case where a column of first touch connection blocks 71 includes multiple (two or more than two) first touch connection blocks 71, serial numbers of the multiple first touch connection blocks 71 in the same column are consecutive, moreover the multiple first touch connection blocks 71 with consecutive serial numbers in the same column may be arranged in sequence along the column direction in the order of their serial numbers, or may be arranged in sequence along the column direction but not in the order of their serial numbers.

The following gives descriptions by taking an example that the number of the plurality of first touch connection blocks 71 included in the touch and display driver integration chip 200 is 40, when the touch and display driver integration chip 200 is correspondingly connected to the display panel 100, the plurality of first touch pins 31 included in the display panel 100 are respectively connected to the plurality of first touch connection blocks 71 of the touch and display driver integration chip 200.

For example, as shown in FIGS. 20 to 27, the plurality of first touch connection blocks 71 are arranged in 3 rows, in which multiple first touch connection blocks 71 in each row are arranged in sequence along the first direction X, and each column of first touch connection blocks 71 includes at least one first touch connection block 71.

The following gives descriptions by taking an example that the number of the plurality of first touch connection blocks 71 included in the touch and display driver integration chip 200 is 40, when the touch and display driver integration chip 200 is correspondingly connected to the display panel 100, the plurality of first touch pins 31 included in the display panel 100 are respectively connected to the plurality of first touch connection blocks 71 of the touch and display driver integration chip 200. According to the serial numbers of the first touch pins 31 connected to the first touch connection blocks 71, the 40 first touch connection blocks 71 are numbered in sequence as a first touch connection block 71 (1), a first touch connection block 71 (2), . . . , a first touch connection block 71 (40).

The first touch connection block 71 (1) to the first touch connection block 71 (20) are arranged in the first connection region L1; and serial numbers of first touch connection blocks 71 in the same row become larger in sequence along the direction from the right side to the left side in FIGS. 20, 22, 24 and 26.

The first touch connection block 71 (21) to the first touch connection block 71 (40) are arranged in the third connection region L3; and serial numbers of first touch connection blocks 71 in the same row become smaller in sequence along the direction from the right side to the left side in FIGS. 21, 23, 25 and 27.

In some examples, the plurality of first touch connection blocks 71 are arranged in 3 rows. As shown in FIGS. 20, 22, 24 and 26, in 3 rows of first touch connection blocks 71 in the first connection region L1, serial numbers of the first touch connection blocks 71 in the same column are consecutive; and along the direction from the right end to the left end of the touch and display driver integration chip 200, serial numbers of the first touch connection blocks 71 in the same row become larger in sequence and are of an arithmetic progression with a difference of 3. As shown in FIGS. 21, 23, 25 and 27, in 3 rows of first touch connection blocks 71 in the third connection region L3, serial numbers of the first touch connection blocks 71 in the same column are consecutive; and along the direction from the left end to the right end of the touch and display driver integration chip 200, serial numbers of the first touch connection blocks 71 in the same row become larger in sequence and are of an arithmetic progression with a difference of 3.

The three first touch connection blocks 71 in the first column of first touch connection blocks 71 along the direction from the right side to the left side in FIGS. 20, 22, 24 and 26 are the first touch connection block 71 (1), the first touch connection block 71 (2) and the first touch connection block 71 (3) in sequence. The first touch connection block 71 (1), the first touch connection block 71 (2) and the first touch connection block 71 (3) may be arranged along the column direction in the order of ascending serial numbers, or in the order of descending serial numbers, or not in the order of serial numbers.

The three first touch connection blocks 71 in the first column of first touch connection blocks 71 along the direction from the left side to the right side in FIGS. 21, 23, 25 and 27 are the first touch connection block 71 (21), the first touch connection block 71 (22) and the first touch connection block 71 (23) in sequence. The first touch connection block 71 (21), the first touch connection block 71 (22) and the first touch connection block 71 (23) may be arranged along the column direction in the order of ascending serial numbers, or in the order of descending serial numbers, or not in the order of serial numbers.

First touch connection blocks 71 in the same row as the first touch connection block 71 (1) are, from right to left, the first touch connection block 71 (1), the first touch connection block 71 (4), . . . , the first touch connection block 71 (19). First touch connection blocks 71 in the same row as the first touch connection block 71 (2) are, from right to left, the first touch connection block 71 (2), the first touch connection block 71 (5), . . . , the first touch connection block 71 (20). First touch connection blocks 71 in the same row as the first touch connection block 71 (3) are, from right to left, the first touch connection block 71 (3), the first touch connection block 71 (6), . . . , the first touch connection block 71 (18).

First touch connection blocks 71 in the same row as the first touch connection block 71 (21) are, from left to right, the first touch connection block 71 (21), the first touch connection block 71 (24), . . . , the first touch connection block 71 (39). First touch connection blocks 71 in the same row as the first touch connection block 71 (22) are, from left to right, the first touch connection block 71 (22), the first touch connection block 71 (25), . . . , the first touch connection block 71 (40). First touch connection blocks 71 in the same row as the first touch connection block 71 (23) are, from left to right, the first touch connection block 71 (23), the first touch connection block 71 (26), . . . , the first touch connection block 71 (38).

The multiple first touch connection blocks 71 in the first connection region L1 and the multiple first touch connection blocks 71 in the third connection region L3 may be arranged symmetrically about the second direction Y. In this case, the first touch connection block 71 (1) and the first touch connection block 71 (21) are located in the same row, the first touch connection block 71 (2) and the first touch connection block 71 (22) are located in the same row, and the first touch connection block 71 (3) and the first touch connection block 71 (23) are located in the same row. The symmetrical arrangement described here means that an arrangement path of the multiple first touch connection blocks 71 in the first connection region L1 from small to large according to their serial numbers and an arrangement path of the multiple first touch connection blocks 71 in the third connection region L3 from small to large according to their serial numbers are symmetrical about the second direction Y.

The specific arrangement of the first touch connection blocks 71 arranged in 3 rows in FIGS. 20 to 27 is for illustrative purposes only and is not intended to be a limitation on the specific implementations of the present disclosure.

Figure 28:
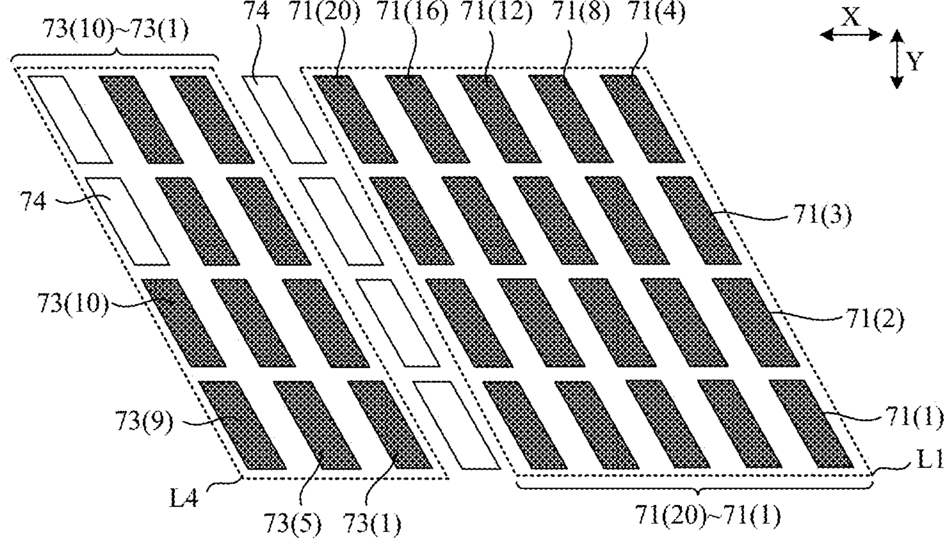
FIG. 28 is an enlarged view showing yet still another structure of the region H, in accordance with FIG. 5.
Figure 29:
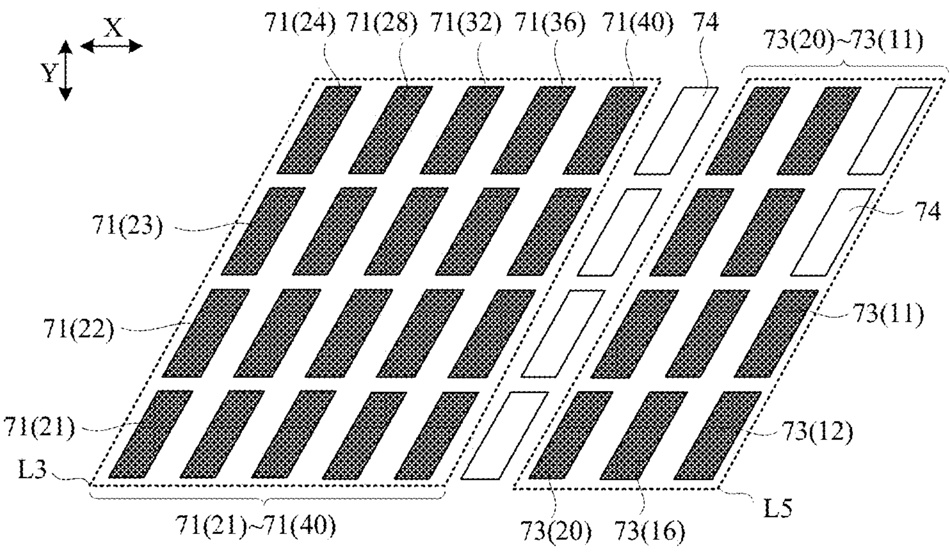
FIG. 29 is an enlarged view showing yet still another structure of the region J, in accordance with FIG. 5.

In some other examples, the plurality of first touch connection blocks 71 are arranged in 4 rows. As shown in FIG. 28, in 4 rows of first touch connection blocks 71 in the first connection region L1, serial numbers of the first touch connection blocks 71 in the same column are consecutive; and along the direction from the left end to the right end of the touch and display driver integration chip 200, serial numbers of the first touch connection blocks 71 in the same row become smaller in sequence and are of an arithmetic progression with a difference of 4. As shown in FIG. 29, in 4 rows of first touch connection blocks 71 in the third connection region L3, serial numbers of the first touch connection blocks 71 in the same column are consecutive; and along the direction from the left end to the right end of the touch and display driver integration chip 200, serial numbers of the first touch connection blocks 71 in the same row become larger in sequence and are of an arithmetic progression with a difference of 4.

The four first touch connection blocks 71 in the first column of first touch connection blocks 71 along the direction from the right side to the left side in FIG. 28 are the first touch connection block 71 (1), the first touch connection block 71 (2), the first touch connection block 71 (3), and the first touch connection block 71 (4) in sequence. The first touch connection block 71 (1), the first touch connection block 71 (2), the first touch connection block 71 (3), and the first touch connection block 71 (4) may be arranged along the column direction in the order of ascending serial numbers, or in the order of descending serial numbers, or not in the order of serial numbers.

The four first touch connection blocks 71 in the first column of first touch connection blocks 71 along the direction from the left side to the right side in FIG. 29 are the first touch connection block 71 (21), the first touch connection block 71 (22), the first touch connection block 71 (23), and the first touch connection block 71 (24) in sequence. The first touch connection block 71 (21), the first touch connection block 71 (22), the first touch connection block 71 (23), and the first touch connection block 71 (24) may be arranged along the column direction in the order of ascending serial numbers, or in the order of descending serial numbers, or not in the order of serial numbers.

First touch connection blocks 71 in the same row as the first touch connection block 71 (1) are, from right to left, the first touch connection block 71 (1), the first touch connection block 71 (5), . . . , the first touch connection block 71 (17). First touch connection blocks 71 in the same row as the first touch connection block 71 (2) are, from right to left, the first touch connection block 71 (2), the first touch connection block 71 (6), . . . , the first touch connection block 71 (18). First touch connection blocks 71 in the same row as the first touch connection block 71 (3) are, from right to left, the first touch connection block 71 (3), the first touch connection block 71 (7), . . . , the first touch connection block 71 (19). First touch connection blocks 71 in the same row as the first touch connection block 71 (4) are, from right to left, the first touch connection block 71 (4), the first touch connection block 71 (8), . . . , the first touch connection block 71 (20).

First touch connection blocks 71 in the same row as the first touch connection block 71 (21) are, from left to right, the first touch connection block 71 (21), the first touch connection block 71 (25), . . . , the first touch connection block 71 (37). First touch connection blocks 71 in the same row as the first touch connection block 71 (22) are, from left to right, the first touch connection block 71 (22), the first touch connection block 71 (26), . . . , the first touch connection block 71 (38). First touch connection blocks 71 in the same row as the first touch connection block 71 (23) are, from left to right, the first touch connection block 71 (23), the first touch connection block 71 (27), . . . , the first touch connection block 71 (39). First touch connection blocks 71 in the same row as the first touch connection block 71 (24) are, from left to right, the first touch connection block 71 (24), the first touch connection block 71 (28), . . . , the first touch connection block 71 (40).

The multiple first touch connection blocks 71 in the first connection region L1 and the multiple first touch connection blocks 71 in the third connection region L3 may be arranged symmetrically about the second direction Y. In this case, the first touch connection block 71 (1) and the first touch connection block 71 (21) are located in the same row, the first touch connection block 71 (2) and the first touch connection block 71 (22) are located in the same row, the first touch connection block 71 (3) and the first touch connection block 71 (23) are located in the same row, and the first touch connection block 71 (4) and the first touch connection block 71 (24) are located in the same row. The symmetrical arrangement described here means that an arrangement path of the multiple first touch connection blocks 71 in the first connection region L1 from small to large according to their serial numbers and an arrangement path of the multiple first touch connection blocks 71 in the third connection region L3 from small to large according to their serial numbers are symmetrical about the second direction Y.

The specific arrangement of the first touch connection blocks 71 arranged in 4 rows in FIGS. 28 and 29 is for illustrative purposes only and is not intended to be a limitation on the specific implementations of the present disclosure.

Figure 30:
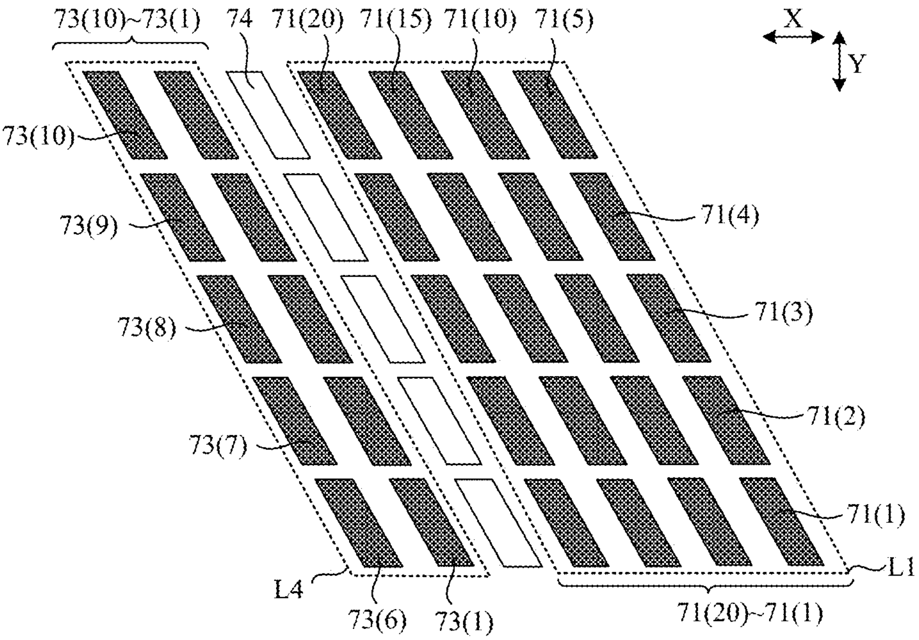
FIG. 30 is an enlarged view showing yet still another structure of the region H, in accordance with FIG. 5.
Figure 31:
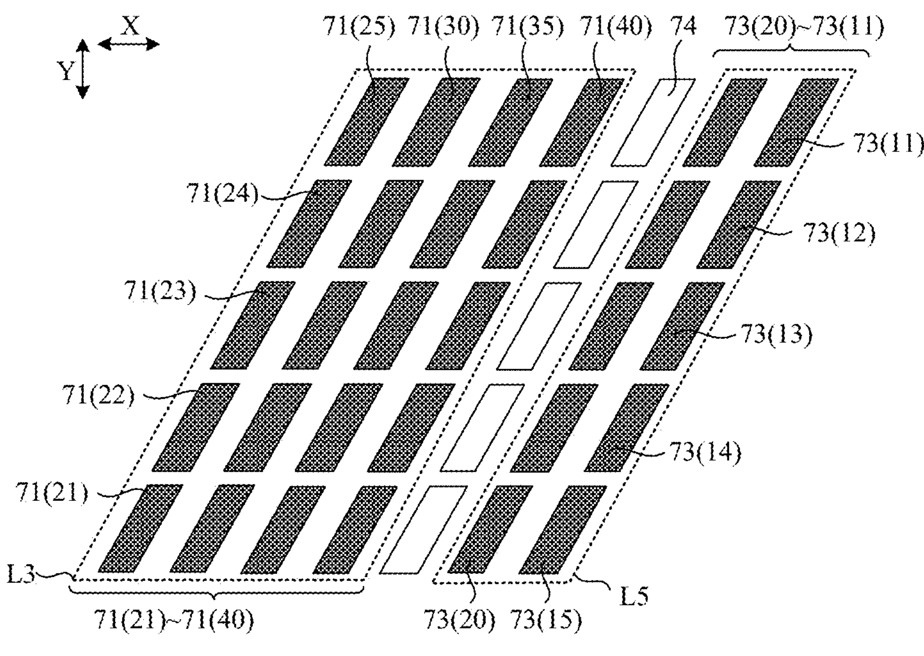
FIG. 31 is an enlarged view showing yet still another structure of the region J, in accordance with FIG. 5.

In yet some other examples, the plurality of first touch connection blocks 71 are arranged in 5 rows. As shown in FIG. 30, in 5 rows of first touch connection blocks 71 in the first connection region L1, serial numbers of the first touch connection blocks 71 in the same column are consecutive; and along the direction from the right end to the left end of the touch and display driver integration chip 200, serial numbers of the first touch connection blocks 71 in the same row become larger in sequence and are of an arithmetic progression with a difference of 5. As shown in FIG. 31, in 5 rows of first touch connection blocks 71 in the third connection region L3, serial numbers of the first touch connection blocks 71 in the same column are consecutive; and along the direction from the left end to the right end of the touch and display driver integration chip 200, serial numbers of the first touch connection blocks 71 in the same row become larger in sequence and are of an arithmetic progression with a difference of 5.

The five first touch connection blocks 71 in the first column of first touch connection blocks 71 along the direction from the right side to the left side in FIG. 30 are the first touch connection block 71 (1), the first touch connection block 71 (2), the first touch connection block 71 (3), the first touch connection block 71 (4), and the first touch connection block 71 (5) in sequence. The first touch connection block 71 (1), the first touch connection block 71 (2), the first touch connection block 71 (3), the first touch connection block 71 (4), and the first touch connection block 71 (5) may be arranged along the column direction in the order of ascending serial numbers, or in the order of descending serial numbers, or not in the order of serial numbers.

The five first touch connection blocks 71 in the first column of first touch connection blocks 71 along the direction from the left side to the right side in FIG. 31 are the first touch connection block 71 (21), the first touch connection block 71 (22), the first touch connection block 71 (23), the first touch connection block 71 (24), and the first touch connection block 71 (25) in sequence. The first touch connection block 71 (21), the first touch connection block 71 (22), the first touch connection block 71 (23), the first touch connection block 71 (24), and the first touch connection block 71 (25) may be arranged along the column direction in the order of ascending serial numbers, or in the order of descending serial numbers, or not in the order of serial numbers.

First touch connection blocks 71 in the same row as the first touch connection block 71 (1) are, from right to left, the first touch connection block 71 (1), the first touch connection block 71 (6), the first touch connection block 71 (11), and the first touch connection block 71 (16). First touch connection blocks 71 in the same row as the first touch connection block 71 (2) are, from right to left, the first touch connection block 71 (2), the first touch connection block 71 (7), the first touch connection block 71 (12), and the first touch connection block 71 (17). First touch connection blocks 71 in the same row as the first touch connection block 71 (3) are, from right to left, the first touch connection block 71 (3), the first touch connection block 71 (8), the first touch connection block 71 (13), and the first touch connection block 71 (18). First touch connection blocks 71 in the same row as the first touch connection block 71 (4) are, from right to left, the first touch connection block 71 (4), the first touch connection block 71 (9), the first touch connection block 71 (14), and the first touch connection block 71 (19). First touch connection blocks 71 in the same row as the first touch connection block 71 (5) are, from right to left, the first touch connection block 71 (5), the first touch connection block 71 (10), the first touch connection block 71 (15), and the first touch connection block 71 (20).

First touch connection blocks 71 in the same row as the first touch connection block 71 (21) are, from left to right, the first touch connection block 71 (21), the first touch connection block 71 (26), the first touch connection block 71 (31), and the first touch connection block 71 (36). First touch connection blocks 71 in the same row as the first touch connection block 71 (22) are, from left to right, the first touch connection block 71 (22), the first touch connection block 71 (27), the first touch connection block 71 (32), and the first touch connection block 71 (37). First touch connection blocks 71 in the same row as the first touch connection block 71 (23) are, from left to right, the first touch connection block 71 (23), the first touch connection block 71 (28), the first touch connection block 71 (33), and the first touch connection block 71 (38). First touch connection blocks 71 in the same row as the first touch connection block 71 (24) are, from left to right, the first touch connection block 71 (24), the first touch connection block 71 (29), the first touch connection block 71 (34), and the first touch connection block 71 (39). First touch connection blocks 71 in the same row as the first touch connection block 71 (25) are, from left to right, the first touch connection block 71 (25), the first touch connection block 71 (30), the first touch connection block 71 (35), and the first touch connection block 71 (40).

The multiple first touch connection blocks 71 in the first connection region L1 and the multiple first touch connection blocks 71 in the third connection region L3 may be arranged symmetrically about the second direction Y. In this case, the first touch connection block 71 (1) and the first touch connection block 71 (21) are located in the same row, the first touch connection block 71 (2) and the first touch connection block 71 (22) are located in the same row, the first touch connection block 71 (3) and the first touch connection block 71 (23) are located in the same row, the first touch connection block 71 (4) and the first touch connection block 71 (24) are located in the same row, and the first touch connection block 71 (5) and the first touch connection block 71 (25) are located in the same row. The symmetrical arrangement described here means that an arrangement path of the multiple first touch connection blocks 71 in the first connection region L1 from small to large according to their serial numbers and an arrangement path of the multiple first touch connection blocks 71 in the third connection region L3 from small to large according to their serial numbers are symmetrical about the second direction Y.

The specific arrangement of the first touch connection blocks 71 arranged in 5 rows in FIGS. 30 and 31 is for illustrative purposes only and is not intended to be a limitation on the specific implementations of the present disclosure.

It will be noted that in the touch and display driver integration chip 200, the plurality of first touch connection blocks 71 may, alternatively, be arranged in 2 rows, 6 rows, 7 rows or more rows. The specific number and arrangement of the first touch connection blocks 71 are designed accordingly depending on actual needs. It can be understood that the arrangement of the plurality of first touch connection blocks 71 includes, but is not limited to, the above examples, which are only used as illustrative descriptions here and not as a limitation on the specific implementations of the present disclosure.

Figure 32:
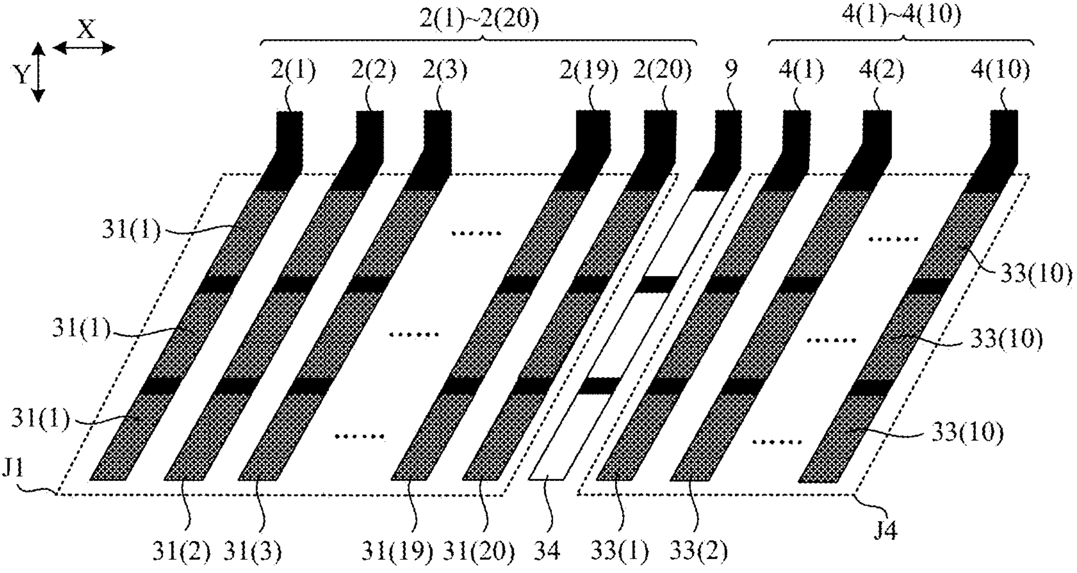
FIG. 32 is an enlarged view showing still yet another structure of the region M, in accordance with FIG. 4.
Figure 33:
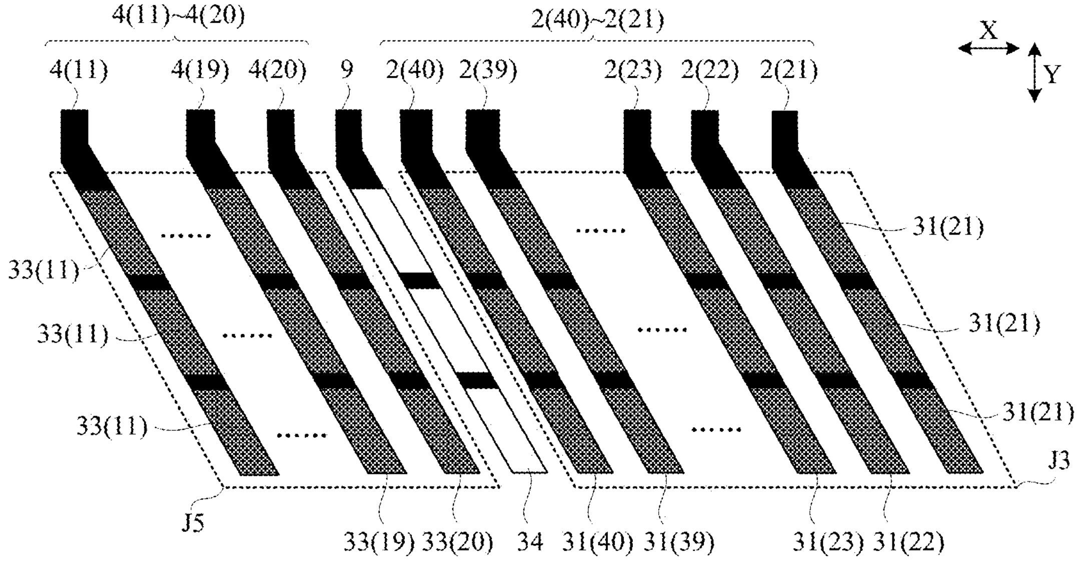
FIG. 33 is an enlarged view showing still yet another structure of the region N, in accordance with FIG. 4.

In some embodiments, in the display panel 100, as shown in FIGS. 4, 32, and 33, the number of the plurality of first touch pins 31 is N×P, P≥3, and the plurality of first touch pins 31 are arranged in N rows and P columns. P first touch pins 31 in each row are numbered in sequence as a first touch pin 31 (1), a first touch pin 31 (2), . . . , a first touch pin 31 (P); and N first touch pins 31 in each column have the same serial number. The P columns of first touch pins 31 are respectively connected to the P first touch leads 2.

The first touch pin 31 (1) to the first touch pin 31 (P−x) are arranged in the first pin region J1, 1≤x<x+1≤P; and along a direction from the first frame region K1 to the reference midline C, serial numbers of the first touch pins 31 become larger in sequence and are consecutive.

The first touch pin 31 (P−x+1) to the first touch pin 31 (P) are arranged in the third pin region J3; and along a direction from the second frame region K2 to the reference midline C, serial numbers of the first touch pins 31 become larger in sequence and are consecutive.

For example, as shown in FIGS. 32 and 33, in the N rows of first touch pins 31 arranged in the first bonding region B1 of the display panel 100, in a case where multiple first touch pins 31 in the same column have the same serial number, each first touch lead 2 overlaps with all first touch pins 31 in a corresponding column, and a line width of a portion of the first touch lead 2 located in the first bonding region B1 is equal to a line width of a portion thereof located outside the first bonding region B1.

For example, as shown in FIGS. 32 and 33, a line width of the first touch lead 2 is greater than or equal to 10 μm, and a distance between two adjacent first touch leads 2 is greater than or equal to 10 μm.

With such a design, when each touch lead CK (e.g., the first touch lead 2) is connected to a first touch pin 31 corresponding thereto, the first touch lead 2 is not required to pass through the gap region between adjacent first touch pins 31. Therefore, a portion of the first touch lead 2 connected to the corresponding first touch pin 31 may have a larger line width. Accordingly, the line resistance of the first touch lead 2 is smaller, which is beneficial to reducing the power consumption of the display panel 100. Moreover, as the line width of the first touch lead 2 increases, it also allows the reliability of the first touch lead 2 to be increased, avoiding the problem of the first touch lead 2 being easily broken due to the line width of the first touch lead 2 being too small.

Figure 34:
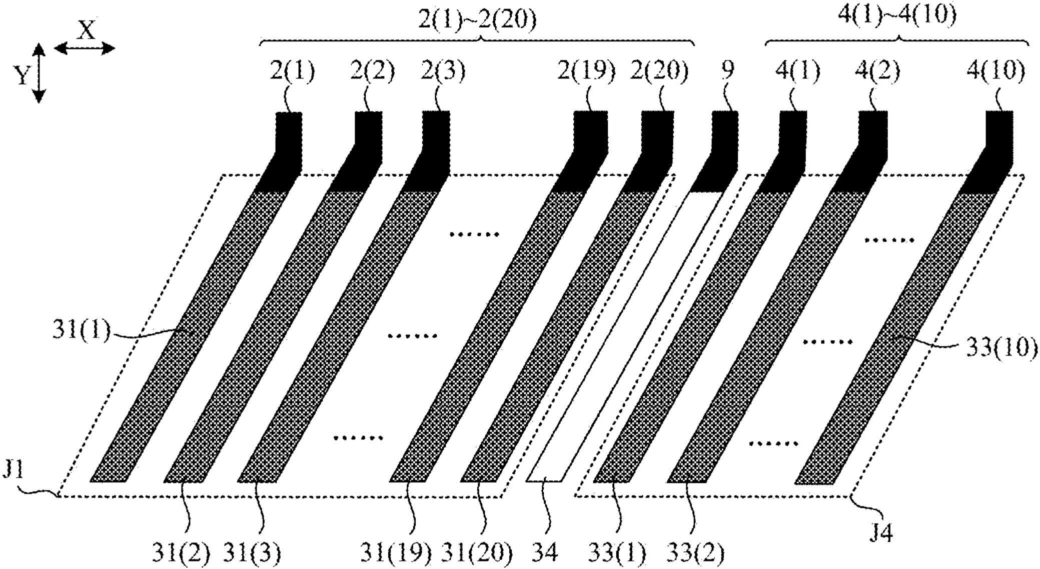
FIG. 34 is an enlarged view showing still yet another structure of the region M, in accordance with FIG. 4.
Figure 35:
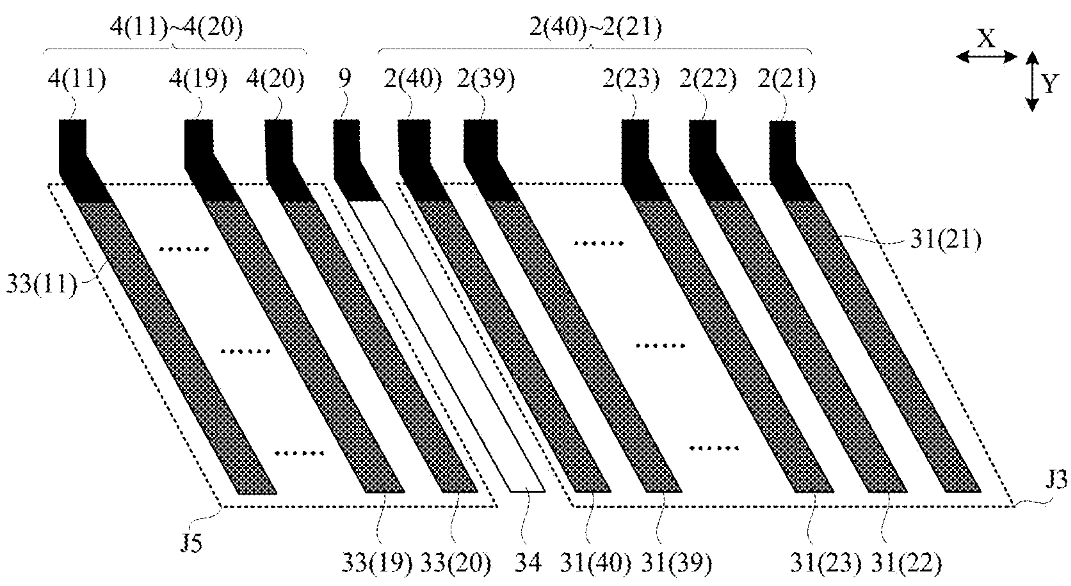
FIG. 35 is an enlarged view showing still yet another structure of the region N, in accordance with FIG. 4.

It will be noted that in a case where the first touch pins 31 in the same column have the same serial number, as shown in FIGS. 32 and 33, it may be that the same column includes multiple separate first touch pins 31 with the same serial number; alternatively, as shown in FIGS. 34 and 35, it may be that the same column includes a single first touch pin 31 extending along the column direction.

For example, as shown in FIGS. 32 and 33, the display panel 100 includes 40 first touch leads 2 and 120 first touch pins 31, and the 120 first touch pins 31 are arranged in 3 rows and 40 columns, with each column of first touch pins 31 including 3 first touch pins 31 with the same serial number. In 3 rows of first touch pins 31 in the first pin region J1, serial numbers of multiple first touch pins 31 in each row become larger in sequence along the direction from the left side to the right side in FIG. 32; and in 3 rows of first touch pins 31 in the third pin region J3, serial numbers of multiple first touch pins 31 in each row become larger in sequence along the direction from the right side to the left side in FIG. 33.

In this case, in the 3 rows of first touch pins 31 in the first pin region J1, serial numbers of first touch pins 31 in the same row are consecutive; and in the 3 rows of first touch pins 31 in the third pin region J3, serial numbers of first touch pins 31 in the same row are consecutive.

It will be noted that in a case where the plurality of first touch leads 2 are divided into an odd-numbered group and an even-numbered group respectively leading out to the first pin region J1 and the third pin region J3, in the 3 rows of first touch pins 31 in the first pin region J1, the first touch pins 31 in each row are numbered as an arithmetic progression with a difference of 2; and in the 3 rows of first touch pins 31 in the third pin region J3, the first touch pins 31 in each row are numbered as an arithmetic progression with a difference of 2.

Accordingly, in some embodiments, in the touch and display driver integration chip 200, the number of the plurality of first touch connection blocks 71 is N×P, P≥3, and the plurality of first touch connection blocks 71 are arranged in N rows and P columns. P first touch connection blocks 71 in each row are numbered in sequence as a first touch connection block 71 (1), a first touch connection block 71 (2), . . . , a first touch connection block 71 (P). N first touch connection blocks 71 in each column have the same serial number, and the P columns of first touch connection blocks 71 are configured to respectively output first touch signals to the P first touch channels 11 of the display panel 100.

The first touch connection block 71 (1) to the first touch connection block 71 (P−x) are arranged in the first connection region L1, 1≤x<x+1≤P; and along a direction from the right end of the touch and display driver integration chip 200 to the center of the touch and display driver integration chip 200, serial numbers of the first touch connection blocks 71 become larger in sequence and are consecutive.

The first touch connection block 71 (P−x+1) to the first touch connection block 71 (P) are arranged in the third connection region L3; and along a direction from the left end of the touch and display driver integration chip 200 to the center of the touch and display driver integration chip 200, serial numbers of the first touch connection blocks 71 become larger in sequence and are consecutive.

For example, the touch and display driver integration chip 200 includes 120 first touch connection blocks 71, and the 120 first touch connection blocks 71 are arranged in 3 rows and 40 columns, with each column of first touch connection blocks 71 including 3 first touch connection blocks 71 with the same serial number. In 3 rows of first touch connection blocks 71 in the first connection region L1, serial numbers of multiple first touch connection blocks 71 in the same row become larger in sequence along the direction from the right end to the left end of the touch and display driver integration chip 200; and in 3 rows of first touch connection blocks 71 in the third connection region L3, serial numbers of multiple first touch connection blocks 71 in the same row become larger in sequence along the direction from the left end to the right end of the touch and display driver integration chip 200.

In this case, in the 3 rows of first touch connection blocks 71 in the first connection region L1, serial numbers of first touch connection blocks 71 in the same row are consecutive; and in the 3 rows of first touch connection blocks 71 in the third connection region L3, serial numbers of first touch connection blocks 71 in the same row are consecutive.

Multiple first touch connection blocks 71 with the same serial number in the same column are electrically insulated from each other. The multiple first touch connection blocks 71 with the same serial number in the same column being electrically insulated from each other means that when connected only to any one of first touch connection blocks 71 with the same serial number in one column, a structure will not be electrically connected to the remaining first touch connection blocks 71 with the same serial number in this column.

It will be noted that in a case where the plurality of first touch leads 2 included in the display panel 100 correspondingly connected to the touch and display driver integration chip 200 are divided into an odd-numbered group and an even-numbered group respectively leading out to the first pin region J1 and the third pin region J3, in the 3 rows of first touch connection blocks 71 in the first connection region L1, the first touch connection blocks 71 in the same row are numbered as an arithmetic progression with a difference of 2; and in the 3 rows of first touch connection blocks 71 in the third connection region L3, the first touch connection blocks 71 in the same row are numbered as an arithmetic progression with a difference of 2.

In some embodiments, in the display panel 100, as shown in FIGS. 2, 6 and 7, the touch structure 1 includes Q second touch channels 12 arranged in parallel and at intervals along the first direction X, Q≥3, with each second touch channel 12 extending along the second direction Y. Along a direction from the first frame region K1 to the second frame region K2, the Q second touch channels 12 are numbered in sequence as a second touch channel 12 (1), a second touch channel 12 (2), . . . , a second touch channel 12 (Q).

In some embodiments, the display panel 100 includes a plurality of second touch leads 4, the number of the plurality of second touch leads 4 is Q, and the plurality of second touch leads 4 are respectively connected to the Q second touch channels 12. According to the serial numbers of the second touch channels 12 correspondingly connected to the second touch leads 4, the Q second touch leads 4 are numbered in sequence as a second touch lead 4 (1), a second touch lead 4 (2), . . . , a second touch lead 4 (Q).

For example, each second touch lead 4 has one end connected to one second touch channel 12, and the other end connected to one second touch pin 33 or one column of second touch pins 33. According to the serial numbers of the second touch channels 12 correspondingly connected the second touch pins 33, the Q second touch pins 33 or the Q columns of second touch pins 33 are numbered in sequence as a second touch pin 33 (1), a second touch pin 33 (2), . . . , a second touch pin 33 (Q).

It will be noted that in a case where the Q columns of second touch pins 33 are numbered in sequence as the second touch pin 33 (1), the second touch pin 33 (2), . . . , the second touch pin 33 (Q), second touch pins 33 in the same column have the same serial number, and second touch pins 33 in different columns have different serial numbers.

The second touch channels 12, the second touch leads 4 and the second touch pins 33 are correspondingly connected according to their serial numbers. For example, a second touch channel 12 (R), a second touch lead 4 (R) and a second touch pin 33 (R) are connected in sequence, 1≤R≤Q. Here, the second touch pin 33 (R) may be one second touch pin 33 (R) or one column of second touch pins 33 (R) with the same serial number.

For example, in a case where multiple second touch pins 33 (R) in the same column have the same serial number, the multiple second touch pins 33 (R) in the same column are electrically connected together, so when connected to any one of the multiple second touch pins 33 (R), a structure can be electrically connected to each of the multiple second touch pins 33 (R) with the same serial number in the column.

The following gives descriptions by taking an example that the touch structure 1 includes 20 second touch channels 12. Along the direction from the first frame region K1 to the second frame region K2, the 20 second touch channels 12 are numbered in sequence as a second touch channel 12 (1), a second touch channel 12 (2), . . . , a second touch channel 12 (20). According to the serial numbers of the second touch channels 12 correspondingly connected to the second touch leads 4, the 20 second touch leads 4 are numbered in sequence as a second touch lead 4 (1), a second touch lead 4 (2), . . . , a second touch lead 4 (20).

In a case where the touch structure 1 includes 20 second touch channels 12, and each second touch lead 4 has one end connected to one second touch channel 12, and the other end connected to one second touch pin 33, the display panel 100 includes 20 second touch leads 4 and 20 second touch pins 33. According to the serial numbers of the second touch channels 12 correspondingly connected to the second touch leads 4, the 20 second touch leads 4 are numbered in sequence as a second touch lead 4 (1), a second touch lead 4 (2), . . . , a second touch lead 4 (20). According to the serial numbers of the second touch channels 12 correspondingly connected to the second touch pins 33, the 20 second touch pins 33 are numbered in sequence as a second touch pin 33 (1), a second touch pin 33 (2), . . . , a second touch pin 33 (20).

In a case where the touch structure 1 includes 20 second touch channels 12, and each second touch lead 4 has one end connected to one second touch channel 12, and the other end connected to one column of second touch pins 33, the display panel 100 includes 20 second touch leads 4 and 60 second touch pins 33. According to the serial numbers of the second touch channels 12 correspondingly connected to the second touch pins 33, 20 columns of second touch pins 33 are numbered in sequence as a second touch pin 33 (1), a second touch pin 33 (2), . . . , a second touch pin 33 (20), where second touch pins 33 in each column have the same serial number, and a second touch lead 4 corresponding to a column of second touch pins 33 with the same serial number is connected to each second touch pin 33 in this column.

It will be noted that a situation in which a second touch lead 4 corresponding to a column of second touch pins 33 with the same serial number is connected to each second touch pin 33 in this column may be that these second touch pins 33 with the same serial number in the same column are electrically connected, and upon connecting any one of the second touch pins 33, the second touch lead 4 can be electrically connected to all the second touch pins 33 with the same serial number in this column; alternatively, it may be that the second touch lead 4 is electrically connected to each of the second touch pins 33 with the same serial number in this column. It can be understood that to ensure the normal transmission of the touch signal, it is sufficient that a touch pin (e.g., the second touch pin 33) is able to be connected to a touch lead CK (e.g., the second touch lead 4) corresponding thereto, so as to implement the signal transmission, and the foregoing is only an exemplary illustration and is not intended as a limitation of the present disclosure.

In some embodiments, in the display panel 100, as shown in FIGS. 2, 4, 6, and 7, the second touch lead 4 (1) to the second touch lead 4 (Q−y) lead from the fourth frame region K4, 1≤y<y+1≤Q; and in a region in proximity to a side of the first bonding region B1 proximate to the display region AA, serial numbers of the second touch leads 4 become larger in sequence along the direction from the first frame region K1 to the reference midline C.

The second touch lead 4 (Q−y+1) to the second touch lead 4 (Q) lead from the fourth frame region K4; and in the region in proximity to the side of the first bonding region B1 proximate to the display region AA, serial numbers of the second touch leads 4 become smaller in sequence along the direction from the second frame region K2 to the reference midline C.

For example, as shown in FIGS. 7, 8 and 9, taking an example that the display panel 100 includes 20 second touch leads 4, in the 20 second touch leads 4, the second touch lead 4 (1) to the second touch lead 4 (10) are grouped into one group leading from the fourth frame region K4 and extending to the fourth pin region J4, and are correspondingly connected to the second touch pin 33 (1) to the second touch pin 33 (10). Along the direction from the left side to the right side in FIGS. 7 and 8, the second touch lead 4 (1) to the second touch lead 4 (10) are arranged in sequence, for example, in the order of their serial numbers.

The second touch lead 4 (11) to the second touch lead 4 (20) are grouped into one group leading from the fourth frame region K4 and extending to the fifth pin region J5, and are correspondingly connected to the second touch pin 33 (11) to the second touch pin 33 (20). Along the direction from the left side to the right side in FIGS. 7 and 9, the second touch lead 4 (11) to the second touch lead 4 (20) are arranged in sequence, for example, in the order of their serial numbers.

At the side of the first bonding region B1 proximate to the display region AA, in the direction from the left side to the right side in FIGS. 7 and 8, the second touch lead 4 (1), the second touch lead 4 (2), . . . , the second touch lead 4 (10) are arranged in sequence in the order of ascending serial numbers, and in the direction from the right side to the left side in FIGS. 7 and 9, the second touch lead 4 (11), the second touch lead 4 (12), . . . , the second touch lead 4 (20) are arranged in sequence in the order of ascending serial numbers.

In some other embodiments, in the display panel 100, as shown in FIGS. 2, 4, and 6, in the second touch lead 4 (1) to the second touch lead 4 (Q), second touch leads 4 with odd serial numbers are grouped into one group leading from the fourth frame region K4, and in a region in proximity to a side of the first bonding region B1 proximate to the display region AA, serial numbers of these second touch leads 4 become larger in sequence along a direction from the first frame region K1 to the reference midline C; and second touch leads 4 with even serial numbers are grouped into one group leading from the fourth frame region K4, and in a region in proximity to a side of the first bonding region B1 proximate to the display region AA, serial numbers of these second touch leads 4 become larger in sequence along a direction from the first frame region K1 to the reference midline C.

For example, taking an example that the display panel 100 includes 20 second touch leads 4, the 20 second touch leads 4 are divided into an odd-numbered group and an even-numbered group according to their serial numbers. For example, the second touch lead 4 (1), the second touch lead 4 (3), . . . , the second touch lead 4 (19) are grouped into the odd-numbered group, leading from the fourth frame region K4 and extending to the fourth pin region J4, and are correspondingly connected to the second touch pin 33 (1), the second touch pin 33 (3), . . . , the second touch pin 33 (19).

The second touch lead 4 (2), the second touch lead 4 (4), . . . , the second touch lead 4 (20) are grouped into the even-numbered group, leading from the fourth frame region K4, and extending to the fifth pin region J5, and are correspondingly connected to the second touch pin 33 (2), the second touch pin 33 (4), . . . , the second touch pin 33 (20).

At the side of the first bonding region B1 proximate to the display region AA, in the direction from the left side to the right side in FIG. 7, the second touch lead 4 (1), the second touch lead 4 (3), . . . , the second touch lead 4 (19) are arranged in sequence in the order of ascending serial numbers.

At the side of the first bonding region B1 proximate to the display region AA, in the direction from the left side to the right side in FIG. 7, the second touch lead 4 (2), the second touch lead 4 (4), . . . , the second touch lead 4 (20) are arranged in sequence in the order of ascending serial numbers.

It can be understood that in a case where the plurality of second touch leads 4 are divided into two groups leading from the fourth frame region K4, and respectively extending to the fourth pin region J4 and the fifth pin region J5, the grouping leading manner of the plurality of second touch leads 4 includes, but is not limited to, the above situations. The corresponding design is made depending on actual needs, and the foregoing is only an illustration of possible implementations, which is not intended to be a limitation on the specific implementations of the present disclosure.

The following gives descriptions by taking an example that the display panel 100 includes 20 second touch leads 4, in which the second touch lead 4 (1) to the second touch lead 4 (10) are grouped into one group leading from the fourth frame region K4 and extending to the fourth pin region J4, and the second touch lead 4 (11) to the second touch lead 4 (20) are grouped into one group leading from the fourth frame region K4 and extending to the fifth pin region J5.

In some embodiments, in the display panel 100, as shown in FIGS. 4, 6 and 7, the number of the plurality of second touch pins 33 is Q, and the plurality of second touch pins 33 are respectively connected to the Q second touch channels 12. The Q second touch pins 33 are numbered in sequence as a second touch pin 33 (1), a second touch pin 33 (2), . . . , a second touch pin 33 (Q). Each column of second touch pins 33 includes N second touch pins 33 with consecutive serial numbers.

The second touch pin 33 (1) to the second touch pin 33 (Q−y) are arranged in the fourth pin region J4, 1≤y<y+1≤Q; and along a direction from the first frame region K1 to the reference midline C, serial numbers of second touch pins 33 in each row become larger in sequence and are of an arithmetic progression with a difference of N.

The second touch pin 33 (Q−y+1) to the second touch pin 33 (Q) are arranged in the fifth pin region J5; and along a direction from the second frame region K2 to the reference midline C, serial numbers of second touch pins 33 in each row become smaller in sequence and are of an arithmetic progression with a difference of N.

The Q second touch leads 4 are divided into multiple sub-groups Z2, with each sub-group Z2 including N second touch leads 4 positioned adjacent to each other. A column of second touch pins 33 includes N second touch pins 33, the N second touch leads 4 of each sub-group Z2 are respectively connected to N second touch pins 33 in one column, and serial numbers of N second touch pins 33 in each column are consecutive.

It will be noted that a column of second touch pins 33 includes at least one second touch pin 33. Serial numbers of N second touch pins 33 in each column are consecutive, which means that in a case where a column of second touch pins 33 includes multiple (two or more than two) second touch pins 33, serial numbers of the multiple second touch pins 33 in the same column are consecutive, moreover the multiple second touch pins 33 with consecutive serial numbers in the same column may be arranged in sequence along the column direction in the order of their serial numbers, or may be arranged in sequence along the column direction but not in the order of their serial numbers.

For example, as shown in FIGS. 8 to 15, the plurality of second touch pins 33 are arranged in 3 rows, in which multiple second touch pins 33 in each row are arranged in sequence along the first direction X, and each column of second touch pins 33 includes at least one second touch pin 33.

The following gives descriptions by taking an example that the number of the second touch pins 33 included in the display panel 100 is 20, according to the serial numbers of the second touch channels 12 correspondingly connected to the second touch pins 33, the 20 second touch pins 33 are numbered in sequence as a second touch pin 33 (1), a second touch pin 33 (2), . . . , a second touch pin 33 (20).

The second touch pin 33 (1) to the second touch pin 33 (10) are arranged in the fourth pin region J4; and serial numbers of second touch pins 33 in the same row become larger in sequence along the direction from the left side to the right side in FIGS. 8, 10, 12 and 14.

The second touch pin 33 (11) to the second touch pin 33 (20) are arranged in the fifth pin region J5; and serial numbers of second touch pins 33 in the same row become larger in sequence along the direction from the left side to the right side in FIGS. 9, 11, 13 and 15.

In some examples, the plurality of second touch pins 33 are arranged in 3 rows. As shown in FIGS. 8, 10, 12 and 14, in 3 rows of second touch pins 33 in the fourth pin region J4, serial numbers of second touch pins 33 in the same column are consecutive; and along the first direction X and in the direction from the fourth pin region J4 pointing to the reference midline C, serial numbers of second touch pins 33 in the same row become larger in sequence and are of an arithmetic progression with a difference of 3. As shown in FIGS. 9, 11, 13 and 15, in 3 rows of second touch pins 33 in the fifth pin region J5, serial numbers of second touch pins 33 in the same column are consecutive; and along the first direction X and in the direction from the fifth pin region J5 pointing to the reference midline C, serial numbers of second touch pins 33 in the same row become smaller in sequence and are of an arithmetic progression with a difference of 3.

The second touch pin 33 in the first column of second touch pins 33 along the direction from the left side to the right side in FIGS. 8, 10, 12 and 14 is the second touch pin 33 (1), and the three second touch pins 33 in the second column of second touch pins 33 along the direction from the left side to the right side in FIGS. 8, 10, 12 and 14 are the second touch pin 33 (2), the second touch pin 33 (3) and the second touch pin 33 (4) in sequence. The second touch pin 33 (2), the second touch pin 33 (3) and the second touch pin 33 (4) may be arranged along the column direction in the order of ascending serial numbers, or in the order of descending serial numbers, or not in the order of serial numbers.

The second touch pin 33 in the first column of second touch pins 33 along the direction from the right side to the left side in FIGS. 9, 11, 13 and 15 is the second touch pin 33 (20), and the three second touch pins 33 in the second column of second touch pins 33 along the direction from the right side to the left side in FIGS. 9, 11, 13 and 15 are the second touch pin 33 (17), the second touch pin 33 (18) and the second touch pin 33 (19) in sequence. The second touch pin 33 (17), the second touch pin 33 (18) and the second touch pin 33 (19) may be arranged along the column direction in the order of ascending serial numbers, or in the order of descending serial numbers, or not in the order of serial numbers.

Second touch pins 33 in the same row as the second touch pin 33 (1) are, from left to right, the second touch pin 33 (1), the second touch pin 33 (4), the second touch pin 33 (7), and the second touch pin 33 (10). Second touch pins 33 in the same row as the second touch pin 33 (2) are, from left to right, the second touch pin 33 (2), the second touch pin 33 (5), and the second touch pin 33 (8). Second touch pins 33 in the same row as the second touch pin 33 (3) are, from left to right, the second touch pin 33 (3), the second touch pin 33 (6), and the second touch pin 33 (9).

Second touch pins 33 in the same row as the second touch pin 33 (11) are, from left to right, the second touch pin 33 (11), the second touch pin 33 (14), the second touch pin 33 (17), and the second touch pin 33 (20). Second touch pins 33 in the same row as the second touch pin 33 (12) are, from left to right, the second touch pin 33 (12), the second touch pin 33 (15), and the second touch pin 33 (18). Second touch pins 33 in the same row as the second touch pin 33 (13) are, from left to right, the second touch pin 33 (13), the second touch pin 33 (16), and the second touch pin 33 (19).

The multiple second touch pins 33 in the fourth pin region J4 and the multiple second touch pins 33 in the fifth pin region J5 may be arranged symmetrically about the second direction Y. In this case, the second touch pin 33 (1) and the second touch pin 33 (20) are located in the same row, the second touch pin 33 (2) and the second touch pin 33 (19) are located in the same row, and the second touch pin 33 (3) and the second touch pin 33 (18) are located in the same row. The symmetrical arrangement described here means that an arrangement path of the multiple second touch pins 33 in the fourth pin region J4 from small to large according to their serial numbers and an arrangement path of the multiple second touch pins 33 in the fifth pin region J5 from large to small according to their serial numbers are symmetrical about the second direction Y.

The specific arrangement of the second touch pins 33 arranged in 3 rows in FIGS. 8 to 15 is for illustrative purposes only and is not intended to be a limitation on the specific implementations of the present disclosure.

In some other examples, the plurality of second touch pins 33 are arranged in 4 rows. As shown in FIG. 16, in 4 rows of second touch pins 33 in the fourth pin region J4, serial numbers of second touch pins 33 in the same column are consecutive; and along the first direction X and in the direction from the fourth pin region J4 pointing to the reference midline C, serial numbers of second touch pins 33 in the same row become larger in sequence and are of an arithmetic progression with a difference of 4. As shown in FIG. 17, in 4 rows of second touch pins 33 in the fifth pin region J5, serial numbers of second touch pins 33 in the same column are consecutive; and along the first direction X and in the direction from the fifth pin region J5 pointing to the reference midline C, serial numbers of second touch pins 33 in the same row become smaller in sequence and are of an arithmetic progression with a difference of 4.

The four second touch pins 33 in the first column of second touch pins 33 along the direction from the left side to the right side in FIG. 16 are the second touch pin 33 (1), the second touch pin 33 (2), the second touch pin 33 (3), and the second touch pin 33 (4) in sequence. The second touch pin 33 (1), the second touch pin 33 (2), the second touch pin 33 (3), and the second touch pin 33 (4) may be arranged along the column direction in the order of ascending serial numbers, or in the order of descending serial numbers, or not in the order of serial numbers.

The four second touch pins 33 in the first column of second touch pins 33 along the direction from the right side to the left side in FIG. 17 are the second touch pin 33 (17), the second touch pin 33 (18), the second touch pin 33 (19), and the second touch pin 33 (20) in sequence. The second touch pin 33 (17), the second touch pin 33 (18), the second touch pin 33 (19), and the second touch pin 33 (20) may be arranged along the column direction in the order of ascending serial numbers, or in the order of descending serial numbers, or not in the order of serial numbers.

Second touch pins 33 in the same row as the second touch pin 33 (1) are, from left to right, the second touch pin 33 (1), the second touch pin 33 (5), and the second touch pin 33 (9). Second touch pins 33 in the same row as the second touch pin 33 (2) are, from left to right, the second touch pin 33 (2), the second touch pin 33 (6), and the second touch pin 33 (10). Second touch pins 33 in the same row as the second touch pin 33 (3) are, from left to right, the second touch pin 33 (3) and the second touch pin 33 (7). Second touch pins 33 in the same row as the second touch pin 33 (4) are, from left to right, the second touch pin 33 (4) and the second touch pin 33 (8).

Second touch pins 33 in the same row as the second touch pin 33 (11) are, from left to right, the second touch pin 33 (11), the second touch pin 33 (15), and the second touch pin 33 (19). Second touch pins 33 in the same row as the second touch pin 33 (12) are, from left to right, the second touch pin 33 (12), the second touch pin 33 (16), and the second touch pin 33 (20). Second touch pins 33 in the same row as the second touch pin 33 (13) are, from left to right, the second touch pin 33 (13) and the second touch pin 33 (17). Second touch pins 33 in the same row as the second touch pin 33 (14) are, from left to right, the second touch pin 33 (14) and the second touch pin 33 (18).

The multiple second touch pins 33 in the fourth pin region J4 and the multiple second touch pins 33 in the fifth pin region J5 may be arranged symmetrically about the second direction Y. In this case, the second touch pin 33 (1) and the second touch pin 33 (20) are located in the same row, the second touch pin 33 (2) and the second touch pin 33 (19) are located in the same row, the second touch pin 33 (3) and the second touch pin 33 (18) are located in the same row, and the second touch pin 33 (4) and the second touch pin 33 (17) are located in the same row. The symmetrical arrangement described here means that an arrangement path of the multiple second touch pins 33 in the fourth pin region J4 from small to large according to their serial numbers and an arrangement path of the multiple second touch pins 33 in the fifth pin region J5 from large to small according to their serial numbers are symmetrical about the second direction Y.

The specific arrangement of the second touch pins 33 arranged in 4 rows in FIGS. 16 and 17 is for illustrative purposes only and is not intended to be a limitation on the specific implementations of the present disclosure.

In yet some other examples, the plurality of second touch pins 33 are arranged in 5 rows. As shown in FIG. 18, in 5 rows of second touch pins 33 in the fourth pin region J4, serial numbers of second touch pins 33 in the same column are consecutive; and along the first direction X and in the direction from the fourth pin region J4 pointing to the reference midline C, serial numbers of second touch pins 33 in the same row become larger in sequence and are of an arithmetic progression with a difference of 5. As shown in FIG. 19, in 5 rows of second touch pins 33 in the fifth pin region J5, serial numbers of second touch pins 33 in the same column are consecutive; and along the first direction X and in the direction from the fifth pin region J5 pointing to the reference midline C, serial numbers of second touch pins 33 in the same row become smaller in sequence and are of an arithmetic progression with a difference of 5.

The five second touch pins 33 in the first column of second touch pins 33 along the direction from the left side to the right side in FIG. 18 are the second touch pin 33 (1), the second touch pin 33 (2), the second touch pin 33 (3), the second touch pin 33 (4), and the second touch pin 33 (5) in sequence. The second touch pin 33 (1), the second touch pin 33 (2), the second touch pin 33 (3), the second touch pin 33 (4), and the second touch pin 33 (5) may be arranged along the column direction in the order of ascending serial numbers, or in the order of descending serial numbers, or not in the order of serial numbers.

The five second touch pins 33 in the first column of second touch pins 33 along the direction from the right side to the left side in FIG. 19 are the second touch pin 33 (16), the second touch pin 33 (17), the second touch pin 33 (18), the second touch pin 33 (19), and the second touch pin 33 (20) in sequence. The second touch pin 33 (16), the second touch pin 33 (17), the second touch pin 33 (18), the second touch pin 33 (19), and the second touch pin 33 (20) may be arranged along the column direction in the order of ascending serial numbers, or in the order of descending serial numbers, or not in the order of serial numbers.

Second touch pins 33 in the same row as the second touch pin 33 (1) are, from left to right, the second touch pin 33 (1) and the second touch pin 33 (6). Second touch pins 33 in the same row as the second touch pin 33 (2) are, from left to right, the second touch pin 33 (2) and the second touch pin 33 (7). Second touch pins 33 in the same row as the second touch pin 33 (3) are, from left to right, the second touch pin 33 (3) and the second touch pin 33 (8). Second touch pins 33 in the same row as the second touch pin 33 (4) are, from left to right, the second touch pin 33 (4) and the second touch pin 33 (9). Second touch pins 33 in the same row as the second touch pin 33 (5) are, from left to right, the second touch pin 33 (5) and the second touch pin 33 (10).

Second touch pins 33 in the same row as the second touch pin 33 (11) are, from left to right, the second touch pin 33 (11) and the second touch pin 33 (16). Second touch pins 33 in the same row as the second touch pin 33 (12) are, from left to right, the second touch pin 33 (12) and the second touch pin 33 (17). Second touch pins 33 in the same row as the second touch pin 33 (13) are, from left to right, the second touch pin 33 (13) and the second touch pin 33 (18). Second touch pins 33 in the same row as the second touch pin 33 (14) are, from left to right, the second touch pin 33 (14) and the second touch pin 33 (19). Second touch pins 33 in the same row as the second touch pin 33 (15) are, from left to right, the second touch pin 33 (15) and the second touch pin 33 (20).

The multiple second touch pins 33 in the fourth pin region J4 and the multiple second touch pins 33 in the fifth pin region J5 may be arranged symmetrically about the second direction Y. In this case, the second touch pin 33 (1) and the second touch pin 33 (20) are located in the same row, the second touch pin 33 (2) and the second touch pin 33 (19) are located in the same row, the second touch pin 33 (3) and the second touch pin 33 (18) are located in the same row, the second touch pin 33 (4) and the second touch pin 33 (17) are located in the same row, and the second touch pin 33 (5) and the second touch pin 33 (16) are located in the same row. The symmetrical arrangement described here means that an arrangement path of the multiple second touch pins 33 in the fourth pin region J4 from small to large according to their serial numbers and an arrangement path of the multiple second touch pins 33 in the fifth pin region J5 from large to small according to their serial numbers are symmetrical about the second direction Y.

The specific arrangement of the second touch pins 33 arranged in 5 rows in FIGS. 18 and 19 is for illustrative purposes only and is not intended to be a limitation on the specific implementations of the present disclosure.

It will be noted that in the display panel 100, the plurality of second touch pins 33 may, alternatively, be arranged in 2 rows, 6 rows, 7 rows or more rows. The specific number and arrangement of the second touch pins 33 are designed accordingly depending on actual needs. It can be understood that the arrangement of the plurality of second touch pins 33 includes, but is not limited to, the above examples, which are only used as illustrative descriptions here and not as a limitation on the specific implementations of the present disclosure.

In some embodiments, as shown in FIGS. 8 to 19, in the N rows of second touch pins 33 arranged in the first bonding region B1 of the display panel 100, in a case where multiple second touch pins 33 in the same column have different serial numbers, some of the plurality of second touch leads 4 are each connected to a corresponding second touch pin 33 through a gap between first pins 3 arranged adjacent to each other along the first direction X, and a line width of a portion of the second touch lead 4 located in the gap is less than a line width of a portion thereof located outside the first bonding region B1.

For example, as shown in FIGS. 6 to 19, in the 20 second touch leads 4 included in the display panel 100, the second touch lead 4 (1) to the second touch lead 4 (10) are grouped into one group leading from the fourth frame region K4 and extending to the fourth pin region J4, and are correspondingly connected to the second touch pin 33 (1) to the second touch pin 33 (10); and the second touch lead 4 (11) to the second touch lead 4 (20) are grouped into one group leading from the fourth frame region K4 and extending to the fifth pin region J5, and are correspondingly connected to the second touch pin 33 (11) to the second touch pin 33 (20).

The spacing between two adjacent first pins 3 (e.g., second touch pins 33) along the first direction X ranges from 10 μm to 15 μm. As shown in FIGS. 8 to 19, at least some of the plurality of second touch leads 4 are each connected to a corresponding second touch pin 33 passing through two adjacent second touch pins 33, and a line width of a portion of the second touch lead 4 located between the two adjacent second touch pins 33 ranges, for example, from 2 μm to 3 μm, and a line width of a portion of the second touch lead 4 located outside the fourth pin region J4 and the fifth pin region J5 is greater than or equal to 3 μm.

Accordingly, in some embodiments, in the touch and display driver integration chip 200, as shown in FIGS. 5 and 20 to 31, the number of the plurality of second touch connection blocks 73 is Q, Q≥3. The plurality of second touch connection blocks 73 are numbered in sequence as a second touch connection block 73 (1), a second touch connection block 73 (2), . . . , a second touch connection block 73 (Q), and are configured to respectively output second touch signals to the Q second touch channels 12 of the display panel 100. Each column of second touch connection blocks 73 includes N second touch connection blocks 73 with consecutive serial numbers.

The second touch connection block 73 (1) to the second touch connection block 73 (Q−y) are arranged in the fourth connection region L4, 1≤y<y+1≤Q; and along a direction from the right end of the touch and display driver integration chip 200 to the center of the touch and display driver integration chip 200, serial numbers of second touch connection blocks 73 in each row become larger in sequence and are of an arithmetic progression with a difference of N.

The second touch connection block 73 (Q−y+1) to the second touch connection block 73 (Q) are arranged in the fifth connection region L5; and along a direction from the left end of the touch and display driver integration chip 200 to the center of the touch and display driver integration chip 200, serial numbers of second touch connection blocks 73 in each row become smaller in sequence and are of an arithmetic progression with a difference of N.

It will be noted that a column of second touch connection blocks 73 includes at least one second touch connection block 73. Serial numbers of N second touch connection blocks 73 in each column are consecutive, which means that in a case where a column of second touch connection blocks 73 includes multiple (two or more than two) second touch connection blocks 73, serial numbers of the multiple second touch connection blocks 73 in the same column are consecutive, moreover the multiple second touch connection blocks 73 with consecutive serial numbers in the same column may be arranged in sequence along the column direction in the order of their serial numbers, or may be arranged in sequence along the column direction but not in the order of their serial numbers.

The following gives descriptions by taking an example that the number of the plurality of second touch connection blocks 73 included in the touch and display driver integration chip 200 is 20, when the touch and display driver integration chip 200 is correspondingly connected to the display panel 100, the plurality of second touch pins 33 included in the display panel 100 are respectively connected to the plurality of second touch connection blocks 73 of the touch and display driver integration chip 200.

For example, as shown in FIGS. 20 to 27, the plurality of second touch connection blocks 73 are arranged in 3 rows, in which multiple second touch connection blocks 73 in each row are arranged in sequence along the first direction X, and each column of second touch connection blocks 73 includes at least one second touch connection block 73.

The following gives descriptions by taking an example that the number of the plurality of second touch connection blocks 73 included in the touch and display driver integration chip 200 is 20, when the touch and display driver integration chip 200 is correspondingly connected to the display panel 100, the plurality of second touch pins 33 included in the display panel 100 are respectively connected to the plurality of second touch connection blocks 73 of the touch and display driver integration chip 200. According to the serial numbers of the second touch pins 33 connected to the second touch connection blocks 73, the 20 second touch connection blocks 73 are numbered in sequence as a second touch connection block 73 (1), a second touch connection block 73 (2), . . . , a second touch connection block 73 (20).

The second touch connection block 73 (1) to the second touch connection block 73 (10) are arranged in the fourth connection region L4; and serial numbers of second touch connection blocks 73 in the same row become smaller in sequence along the direction from the left side to the right side in FIGS. 20, 22, 24 and 26.

The second touch connection block 73 (11) to the second touch connection block 73 (20) are arranged in the fifth connection region L5; and serial numbers of second touch connection blocks 73 in the same row become larger in sequence along the direction from the right side to the left side in FIGS. 21, 23, 25 and 27.

In some examples, the plurality of second touch connection blocks 73 are arranged in 3 rows. As shown in FIGS. 20, 22, 24 and 26, in 3 rows of second touch connection blocks 73 in the fourth connection region L4, serial numbers of the second touch connection blocks 73 in the same column are consecutive; and along the direction from the left end to the right end of the touch and display driver integration chip 200, serial numbers of the second touch connection blocks 73 in the same row become smaller in sequence and are of an arithmetic progression with a difference of 3. As shown in FIGS. 21, 23, 25 and 27, in 3 rows of second touch connection blocks 73 in the fifth connection region L5, serial numbers of the second touch connection blocks 73 in the same column are consecutive; and along the direction from the left end to the right end of the touch and display driver integration chip 200, serial numbers of the second touch connection blocks 73 in the same row become smaller in sequence and are of an arithmetic progression with a difference of 3.

The three second touch connection blocks 73 in the first column of second touch connection blocks 73 along the direction from the left side to the right side in FIGS. 20, 22, 24 and 26 are the second touch connection block 73 (8), the second touch connection block 73 (9) and the second touch connection block 73 (10) in sequence. The second touch connection block 73 (8), the second touch connection block 73 (9) and the second touch connection block 73 (10) may be arranged along the column direction in the order of ascending serial numbers, or in the order of descending serial numbers, or not in the order of serial numbers.

The three second touch connection blocks 73 in the first column of second touch connection blocks 73 along the direction from the right side to the left side in FIGS. 21, 23, 25 and 27 are the second touch connection block 73 (11), the second touch connection block 73 (12) and the second touch connection block 73 (13) in sequence. The second touch connection block 73 (11), the second touch connection block 73 (12) and the second touch connection block 73 (13) may be arranged along the column direction in the order of ascending serial numbers, or in the order of descending serial numbers, or not in the order of serial numbers.

Second touch connection blocks 73 in the same row as the second touch connection block 73 (1) are, from right to left, the second touch connection block 73 (1), the second touch connection block 73 (4), the second touch connection block 73 (7), and the second touch connection block 73 (10). Second touch connection blocks 73 in the same row as the second touch connection block 73 (2) are, from right to left, the second touch connection block 73 (2), the second touch connection block 73 (5), and the second touch connection block 73 (8). Second touch connection blocks 73 in the same row as the second touch connection block 73 (3) are, from right to left, the second touch connection block 73 (3), the second touch connection block 73 (6), and the second touch connection block 73 (9).

Second touch connection blocks 73 in the same row as the second touch connection block 73 (20) are, from left to right, the second touch connection block 73 (20), the second touch connection block 73 (17), the second touch connection block 73 (14), and the second touch connection block 73 (11). Second touch connection blocks 73 in the same row as the second touch connection block 73 (19) are, from left to right, the second touch connection block 73 (19), the second touch connection block 73 (16), and the second touch connection block 73 (13). Second touch connection blocks 73 in the same row as the second touch connection block 73 (18) are, from left to right, the second touch connection block 73 (18), the second touch connection block 73 (15), and the second touch connection block 73 (12).

The multiple second touch connection blocks 73 in the fourth connection region L4 and the multiple second touch connection blocks 73 in the fifth connection region L5 may be arranged symmetrically about the second direction Y. In this case, the second touch connection block 73 (1) and the second touch connection block 73 (20) are located in the same row, the second touch connection block 73 (2) and the second touch connection block 73 (19) are located in the same row, and the second touch connection block 73 (3) and the second touch connection block 73 (18) are located in the same row. The symmetrical arrangement described here means that an arrangement path of the multiple second touch connection blocks 73 in the fourth connection region L4 from small to large according to their serial numbers and an arrangement path of the multiple second touch connection blocks 73 in the fifth connection region L5 from large to small according to their serial numbers are symmetrical about the second direction Y.

The specific arrangement of the second touch connection blocks 73 arranged in 3 rows in FIGS. 20 to 27 is for illustrative purposes only and is not intended to be a limitation on the specific implementations of the present disclosure.

In some other examples, the plurality of second touch connection blocks 73 are arranged in 4 rows. As shown in FIG. 28, in 4 rows of second touch connection blocks 73 in the fourth connection region L4, serial numbers of the second touch connection blocks 73 in the same column are consecutive; and along the direction from the left end to the right end of the touch and display driver integration chip 200, serial numbers of the second touch connection blocks 73 in the same row become smaller in sequence and are of an arithmetic progression with a difference of 4. As shown in FIG. 29, in 4 rows of second touch connection blocks 73 in the fifth connection region L5, serial numbers of the second touch connection blocks 73 in the same column are consecutive; and along the direction from the left end to the right end of the touch and display driver integration chip 200, serial numbers of the second touch connection blocks 73 in the same row become smaller in sequence and are of an arithmetic progression with a difference of 4.

The four second touch connection blocks 73 in the first column of second touch connection blocks 73 along the direction from the right side to the left side in FIG. 28 are the second touch connection block 73 (1), the second touch connection block 73 (2), the second touch connection block 73 (3), and the second touch connection block 73 (4) in sequence. The second touch connection block 73 (1), the second touch connection block 73 (2), the second touch connection block 73 (3), and the second touch connection block 73 (4) may be arranged along the column direction in the order of ascending serial numbers, or in the order of descending serial numbers, or not in the order of serial numbers.

The four second touch connection blocks 73 in the first column of second touch connection blocks 73 along the direction from the left side to the right side in FIG. 29 are the second touch connection block 73 (17), the second touch connection block 73 (18), the second touch connection block 73 (19), and the second touch connection block 73 (20) in sequence. The second touch connection block 73 (17), the second touch connection block 73 (18), the second touch connection block 73 (19), and the second touch connection block 73 (20) may be arranged along the column direction in the order of ascending serial numbers, or in the order of descending serial numbers, or not in the order of serial numbers.

Second touch connection blocks 73 in the same row as the second touch connection block 73 (1) are, from right to left, the second touch connection block 73 (1), the second touch connection block 73 (5) and the second touch connection block 73 (9). Second touch connection blocks 73 in the same row as the second touch connection block 73 (2) are, from right to left, the second touch connection block 73 (2), the second touch connection block 73 (6) and the second touch connection block 73 (10). Second touch connection blocks 73 in the same row as the second touch connection block 73 (3) are, from right to left, the second touch connection block 73 (3) and the second touch connection block 73 (7). Second touch connection blocks 73 in the same row as the second touch connection block 73 (4) are, from right to left, the second touch connection block 73 (4) and the second touch connection block 73 (8).

Second touch connection blocks 73 in the same row as the second touch connection block 73 (20) are, from left to right, the second touch connection block 73 (20), the second touch connection block 73 (16) and the second touch connection block 73 (12). Second touch connection blocks 73 in the same row as the second touch connection block 73 (19) are, from left to right, the second touch connection block 73 (19), the second touch connection block 73 (15), and the second touch connection block 73 (11). Second touch connection blocks 73 in the same row as the second touch connection block 73 (18) are, from left to right, the second touch connection block 73 (18) and the second touch connection block 73 (14). Second touch connection blocks 73 in the same row as the second touch connection block 73 (17) are, from left to right, the second touch connection block 73 (17) and the second touch connection block 73 (13).

The multiple second touch connection blocks 73 in the fourth connection region L4 and the multiple second touch connection blocks 73 in the fifth connection region L5 may be arranged symmetrically about the second direction Y. In this case, the second touch connection block 73 (1) and the second touch connection block 73 (20) are located in the same row, the second touch connection block 73 (2) and the second touch connection block 73 (19) are located in the same row, the second touch connection block 73 (3) and the second touch connection block 73 (18), and the second touch connection block 73 (4) and the second touch connection block 73 (17) are located in the same row. The symmetrical arrangement described here means that an arrangement path of the multiple second touch connection blocks 73 in the fourth connection region L4 from small to large according to their serial numbers and an arrangement path of the multiple second touch connection blocks 73 in the fifth connection region L5 from large to small according to their serial numbers are symmetrical about the second direction Y.

The specific arrangement of the second touch connection blocks 73 arranged in 4 rows in FIGS. 28 and 29 is for illustrative purposes only and is not intended to be a limitation on the specific implementations of the present disclosure.

In yet some other examples, the plurality of second touch connection blocks 73 are arranged in 5 rows. As shown in FIG. 30, in 5 rows of second touch connection blocks 73 in the fourth connection region L4, serial numbers of the second touch connection blocks 73 in the same column are consecutive; and along the direction from the left end to the right end of the touch and display driver integration chip 200, serial numbers of the second touch connection blocks 73 in the same row become smaller in sequence and are of an arithmetic progression with a difference of 5. As shown in FIG. 31, in 5 rows of second touch connection blocks 73 in the fifth connection region L5, serial numbers of the second touch connection blocks 73 in the same column are consecutive; and along the direction from the left end to the right end of the touch and display driver integration chip 200, serial numbers of the second touch connection blocks 73 in the same row become smaller in sequence and are of an arithmetic progression with a difference of 5.

The five second touch connection blocks 73 in the first column of second touch connection blocks 73 along the direction from the right side to the left side in FIG. 30 are the second touch connection block 73 (1), the second touch connection block 73 (2), the second touch connection block 73 (3), the second touch connection block 73 (4), and the second touch connection block 73 (5) in sequence. The second touch connection block 73 (1), the second touch connection block 73 (2), the second touch connection block 73 (3), the second touch connection block 73 (4), and the second touch connection block 73 (5) may be arranged along the column direction in the order of ascending serial numbers, or in the order of descending serial numbers, or not in the order of serial numbers.

The five second touch connection blocks 73 in the first column of second touch connection blocks 73 along the direction from the left side to the right side in FIG. 31 are the second touch connection block 73 (16), the second touch connection block 73 (17), the second touch connection block 73 (18), the second touch connection block 73 (19), and the second touch connection block 73 (20) in sequence. The second touch connection block 73 (16), the second touch connection block 73 (17), the second touch connection block 73 (18), the second touch connection block 73 (19), and the second touch connection block 73 (20) may be arranged along the column direction in the order of ascending serial numbers, or in the order of descending serial numbers, or not in the order of serial numbers.

Second touch connection blocks 73 in the same row as the second touch connection block 73 (1) are, from right to left, the second touch connection block 73 (1) and the second touch connection block 73 (6). Second touch connection blocks 73 in the same row as the second touch connection block 73 (2) are, from right to left, the second touch connection block 73 (2) and the second touch connection block 73 (7). Second touch connection blocks 73 in the same row as the second touch connection block 73 (3) are, from right to left, the second touch connection block 73 (3) and the second touch connection block 73 (8). Second touch connection blocks 73 in the same row as the second touch connection block 73 (4) are, from right to left, the second touch connection block 73 (4) and the second touch connection block 73 (9). Second touch connection blocks 73 in the same row as the second touch connection block 73 (5) are, from left to right, the second touch connection block 73 (5) and the second touch connection block 73 (10).

Second touch connection blocks 73 in the same row as the second touch connection block 73 (20) are, from left to right, the second touch connection block 73 (20) and the second touch connection block 73 (15). Second touch connection blocks 73 in the same row as the second touch connection block 73 (19) are, from left to right, the second touch connection block 73 (19) and the second touch connection block 73 (14). Second touch connection blocks 73 in the same row as the second touch connection block 73 (18) are, from left to right, the second touch connection block 73 (18) and the second touch connection block 73 (13). Second touch connection blocks 73 in the same row as the second touch connection block 73 (17) are, from left to right, the second touch connection block 73 (17) and the second touch connection block 73 (12). Second touch connection blocks 73 in the same row as the second touch connection block 73 (16) are, from left to right, the second touch connection block 73 (16) and the second touch connection block 73 (11).

The multiple second touch connection blocks 73 in the fourth connection region L4 and the multiple second touch connection blocks 73 in the fifth connection region L5 may be arranged symmetrically about the second direction Y. In this case, the second touch connection block 73 (1) and the second touch connection block 73 (20) are located in the same row, the second touch connection block 73 (2) and the second touch connection block 73 (19) are located in the same row, the second touch connection block 73 (3) and the second touch connection block 73 (18), the second touch connection block 73 (4) and the second touch connection block 73 (17) are located in the same row, and the second touch connection block 73 (5) and the second touch connection block 73 (16) are located in the same row. The symmetrical arrangement described here means that an arrangement path of the multiple second touch connection blocks 73 in the fourth connection region L4 from small to large according to their serial numbers and an arrangement path of the multiple second touch connection blocks 73 in the fifth connection region L5 from large to small according to their serial numbers are symmetrical about the second direction Y.

The specific arrangement of the second touch connection blocks 73 arranged in 5 rows in FIGS. 30 and 31 is for illustrative purposes only and is not intended to be a limitation on the specific implementations of the present disclosure.

It will be noted that in the touch and display driver integration chip 200, the plurality of second touch connection blocks 73 may, alternatively, be arranged in 2 rows, 6 rows, 7 rows or more rows. The specific number and arrangement of the second touch connection blocks 73 are designed accordingly depending on actual needs. It can be understood that the arrangement of the plurality of second touch connection blocks 73 includes, but is not limited to, the above examples, which are only used as illustrative descriptions here and not as a limitation on the specific implementations of the present disclosure.

There are some embodiments, in which:

in the display panel 100, as shown in FIGS. 32, and 33, the number of the plurality of second touch pins 33 is N×Q, Q≥3, and the plurality of second touch pins 33 are arranged in N rows and Q columns. Q second touch pins 33 in each row are numbered in sequence as a second touch pin 33 (1), a second touch pin 33 (2), . . . , a second touch pin 33 (Q); and N second touch pins 33 in each column have the same serial number. The Q columns of second touch pins 33 are respectively connected to the Q second touch leads 4.

The second touch pin 33 (1) to the second touch pin 33 (Q−y) are arranged in the fourth pin region J4, 1≤y<y+1≤Q; and along a direction from the first frame region K1 to the reference midline C, serial numbers of the second touch pins 33 become larger in sequence and are consecutive.

The second touch pin 33 (Q−y+1) to the second touch pin 33 (Q) are arranged in the fifth pin region J5; and along a direction from the second frame region K2 to the reference midline C, serial numbers of the second touch pins 33 become smaller in sequence and are consecutive.

For example, as shown in FIGS. 32 and 33, in the N rows of second touch pins 33 arranged in the first bonding region B1 of the display panel 100, in a case where multiple second touch pins 33 in the same column have the same serial number, each second touch lead 4 overlaps with all second touch pins 33 in a corresponding column, and a line width of a portion of the second touch lead 4 located in the first bonding region B1 is equal to a line width of a portion thereof located outside the first bonding region B1.

For example, as shown in FIGS. 32 and 33, a line width of the second touch lead 4 is greater than or equal to 10 μm, and a distance between two adjacent second touch leads 4 is greater than or equal to 10 μm.

With such a design, when each touch lead CK (e.g., the second touch lead 4) is connected to a second touch pin 33 corresponding thereto, the second touch lead 4 is not required to pass through the gap region between adjacent second touch pins 33. Therefore, a portion of the second touch lead 4 connected to the corresponding second touch pin 33 may have a larger line width. Accordingly, the line resistance of the second touch lead 4 is smaller, which is beneficial to reducing the power consumption of the display panel 100. Moreover, as the line width of the second touch lead 4 increases, it also allows the reliability of the second touch lead 4 to be increased, avoiding the problem of the second touch lead 4 being easily broken due to the line width of the second touch lead 4 being too small.

It will be noted that in a case where the second touch pins 33 in the same column have the same serial number, as shown in FIGS. 32 and 33, it may be that the same column includes multiple separate second touch pins 33 with the same serial number; alternatively, as shown in FIGS. 34 and 35, it may be that the same column includes a single second touch pin 33 extending along the column direction.

For example, as shown in FIGS. 32 and 33, the display panel 100 includes 20 second touch leads 4 and 60 second touch pins 33, and the 60 second touch pins 33 are arranged in 3 rows and 20 columns, with each column of second touch pins 33 including 3 second touch pins 33 with the same serial number. In 3 rows of second touch pins 33 in the fourth pin region J4, serial numbers of multiple second touch pins 33 in each row become larger in sequence along the direction from the left side to the right side in FIG. 32; and in 3 rows of second touch pins 33 in the fifth pin region J5, serial numbers of multiple second touch pins 33 in each row become smaller in sequence along the direction from the right side to the left side in FIG. 33.

In this case, in the 3 rows of second touch pins 33 in the fourth pin region J4, serial numbers of second touch pins 33 in the same row are consecutive; and in the 3 rows of second touch pins 33 in the fifth pin region J5, serial numbers of second touch pins 33 in the same row are consecutive.

It will be noted that in a case where the plurality of second touch leads 4 are divided into an odd-numbered group and an even-numbered group respectively leading out to the fourth pin region J4 and the fifth pin region J5, in the 3 rows of second touch pins 33 in the fourth pin region J4, the second touch pins 33 in each row are numbered as an arithmetic progression with a difference of 2; and in the 3 rows of second touch pins 33 in the fifth pin region J5, the second touch pins 33 in each row are numbered as an arithmetic progression with a difference of 2.

Accordingly, in some embodiments, in the touch and display driver integration chip 200, the number of the plurality of second touch connection blocks 73 is N×Q, Q≥3, and the plurality of second touch connection blocks 73 are arranged in N rows and Q columns. Q second touch connection blocks 73 in each row are numbered in sequence as a second touch connection block 73 (1), a second touch connection block 73 (2), . . . , a second touch connection block 73 (Q). N second touch connection blocks 73 in each column have the same serial number, and the Q columns of second touch connection blocks 73 are configured to respectively output second touch signals to the Q second touch channels 12.

The second touch connection block 73 (1) to the second touch connection block 73 (Q−y) are arranged in the fourth connection region L4, 1≤y<y+1≤Q; and along a direction from the right end of the touch and display driver integration chip 200 to the center of the touch and display driver integration chip 200, serial numbers of the second touch connection blocks 73 become larger in sequence and are consecutive.

The second touch connection block 73 (Q−y+1) to the second touch connection block 73 (Q) are arranged in the fifth connection region L5; and along a direction from the left end of the touch and display driver integration chip 200 to the center of the touch and display driver integration chip 200, serial numbers of the second touch connection blocks 73 become smaller in sequence and are consecutive.

For example, the touch and display driver integration chip 200 includes 60 second touch connection blocks 73, and the 60 second touch connection blocks 73 are arranged in 3 rows and 20 columns, with each column of second touch connection blocks 73 including 3 second touch connection blocks 73 with the same serial number. In 3 rows of second touch connection blocks 73 in the fourth connection region L4, serial numbers of multiple second touch connection blocks 73 in the same row become larger in sequence along the direction from the right end to the left end of the touch and display driver integration chip 200; and in 3 rows of second touch connection blocks 73 in the fifth connection region L5, serial numbers of multiple second touch connection blocks 73 in the same row become smaller in sequence along the direction from the left end to the right end of the touch and display driver integration chip 200.

In this case, in the 3 rows of second touch connection blocks 73 in the fourth connection region L4, serial numbers of second touch connection blocks 73 in the same row are consecutive; and in the 3 rows of second touch connection blocks 73 in the fifth connection region L5, serial numbers of second touch connection blocks 73 in the same row are consecutive.

It can be understood that in a case where the plurality of second touch leads 4 included in the display panel 100 correspondingly connected to the touch and display driver integration chip 200 are divided into an odd-numbered group and an even-numbered group respectively leading out to the fourth pin region J4 and the fifth pin region J5, in the 3 rows of second touch connection blocks 73 in the fourth connection region L4, the multiple second touch connection blocks 73 in the same row are numbered as an arithmetic progression with a difference of 2; and in the 3 rows of second touch connection blocks 73 in the fifth connection region L5, the multiple second touch connection blocks 73 in the same row are numbered as an arithmetic progression with a difference of 2.

In some embodiments, as shown in FIGS. 4, and 36 to 39, in each second bonding region B2 of the display panel 100, multiple second pins 6 are arranged in at least one column along the second direction Y. In a case where the multiple second pins 6 are arranged in multiple columns along the second direction Y, the multiple columns of second pins 6 are arranged in parallel and at intervals along the first direction X.

For example, two adjacent second pins 6 in the same column have a spacing therebetween, and two adjacent columns of second pins 6 are staggered in the first direction X.

As shown in FIG. 4, in a case where multiple second pins 6 in each second bonding region B2 are arranged in multiple columns and multiple rows, any two adjacent columns of second pins 6 are staggered in the row direction. In one aspect, in a case where a touch lead CK (e.g., the third touch lead 5) needs to pass through the gap region between two adjacent second pins 6 to be connected to a corresponding second pin 6, the third touch lead 5 has a simpler wiring path, thereby reducing the number of corners of the third touch lead 5. It can be understood that the third touch lead 5 is prone to breakage at the corners. By reducing the number of the corners of the third touch lead 5, it is possible to increase the reliability of the third touch lead 5 and reduce the risk of breakage of the third touch lead 5. In another aspect, in a case where the ACF is used to bond the display panel 100 and the touch and display driver integration chip 200, the second pin 6 with the staggered arrangement enables the ACF to provide a better connection tightness between the display panel 100 and the touch and display driver integration chip 200, ensuring the reliability of the bonding between the display panel 100 and the touch and display driver integration chip 200, and thereby ensuring the stability and reliability of the signal transmission.

In some embodiments, as shown in FIGS. 4, and 36 to 39, the number of the plurality of second pins 6 included in the display panel 100 is Q, and the plurality of second pins 6 are respectively connected to the Q second touch channels 12. According to the serial numbers of the second touch channels 12 corresponding to the second pins 6, the Q second pins 6 are numbered in sequence as a second pin 6 (1), a second pin 6 (2), . . . , a second pin 6 (Q). The two second bonding regions B2 are respectively a second bonding region B2 (A) and a second bonding region B2 (B), where the second bonding region B2 (A) is located at a side of the reference midline C proximate to the first frame region K1, and the second bonding region B2 (B) is located at a side of the reference midline C proximate to the second frame region K2.

The second pin 6 (1) to the second pin 6 (Q−y) are arranged in the second bonding region B2 (A), 1≤y<y+1≤Q; and along the second direction Y and in a direction from the third frame region K3 to the fourth frame region K4, serial numbers of second pins 6 in each column become larger in sequence and are of an arithmetic progression. The second pin 6 (Q−y+1) to the second pin 6 (Q) are arranged in the second bonding region B2 (B); and along the second direction Y and in the direction from the third frame region K3 to the fourth frame region K4, serial numbers of second pins 6 in each column become smaller in sequence and are of an arithmetic progression.

There are some embodiments, in which:

as shown in FIGS. 4, 6 and 7, the display panel 100 further includes a plurality of third touch leads 5. The number of the plurality of third touch leads 5 is Q, and the plurality of third touch leads 5 are respectively connected to the Q second touch channels 12. According to the serial numbers of the second touch channels 12 corresponding to the third touch leads 5, the Q third touch leads 5 are numbered in sequence as a third touch lead 5 (1), a third touch lead 5 (2), . . . , a third touch lead 5 (Q).

The third touch lead 5 (1) to the third touch lead 5 (Q−y) lead from the third frame region K3 and extend toward the first frame region K1; and in a region in proximity to a side of the second bonding region B2 (A) away from the first bonding region B1, serial numbers of the third touch leads 5 become smaller in sequence along the first direction X and in the direction from the first frame region K1 to the second frame region K2.

The third touch lead 5 (Q−y+1) to the third touch lead 5 (Q) lead from the third frame region K3 and extend toward the second frame region K2; and in a region in proximity to a side of the second bonding region B2 (B) away from the first bonding region B1, serial numbers of the third touch leads 5 become larger in sequence along the first direction X and in the direction from the second frame region K2 to the first frame region K1.

Figure 36:
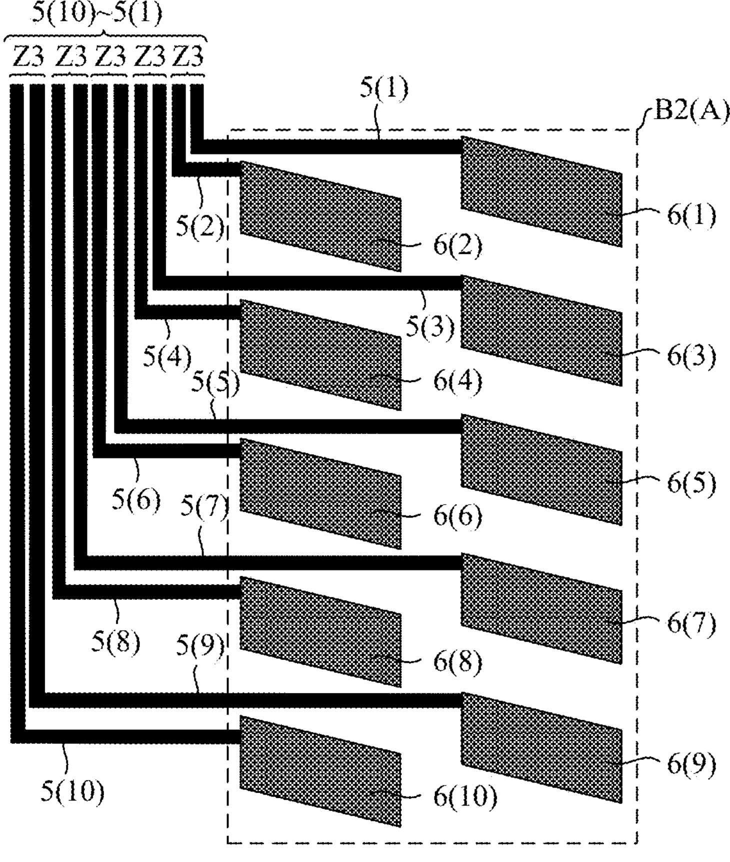
FIG. 36 is an enlarged diagram showing a structure of a second bonding region (A) of a display panel, in accordance with some embodiments.
Figure 37:
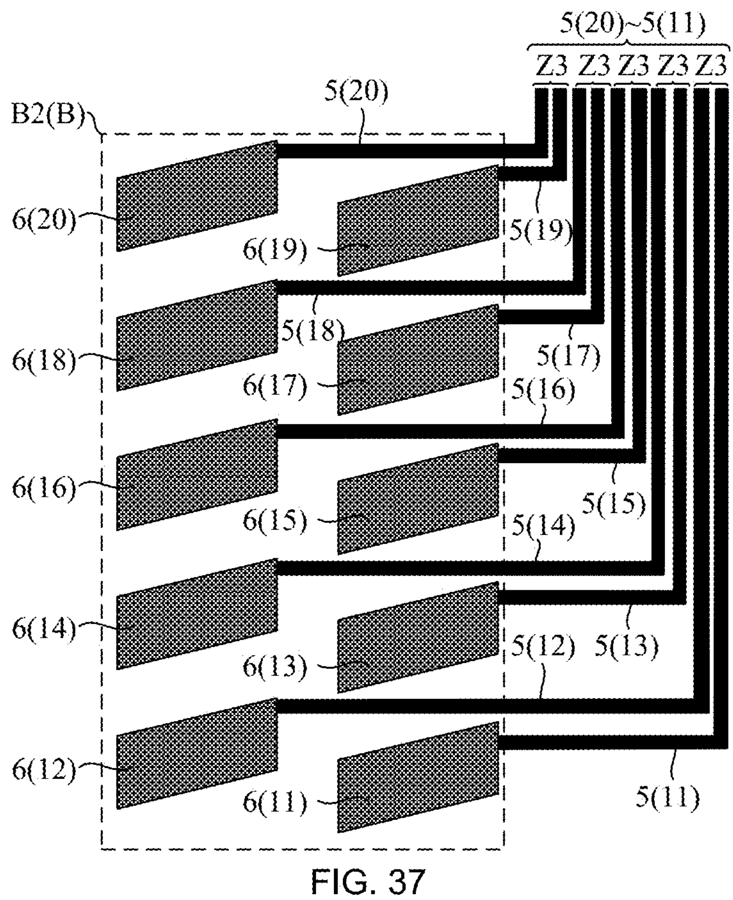
FIG. 37 is an enlarged diagram showing a structure of a second bonding region (B) of a display panel, in accordance with some embodiments.

For example, as shown in FIGS. 7, 36 and 37, each third touch lead 5 has one end connected to one second touch channel 12, and the other end connected to one second pin 6. Each second pin 6 is connected to one second touch channel 12 through one third touch lead 5.

The second touch channels 12, the third touch leads 5 and the second pins 6 are correspondingly connected according to their serial numbers. For example, a second touch channel 12 (R), a third touch lead 5 (R) and a second pin 6 (R) are connected in sequence, 1≤R≤Q.

For example, as shown in FIGS. 7, 36 and 37, taking an example that the display panel 100 includes 20 third touch leads 5, in the 20 third touch leads 5, the third touch lead 5 (1) to the third touch lead 5 (10) are grouped into one group leading from the third frame region K3, passing through the first frame region K1 and extending to the second bonding region B2 (A), and are correspondingly connected to the second pin 6 (1) to the second pin 6 (10). Along the direction from the left side to the right side in FIGS. 7 and 36, the third touch lead 5 (1) to the third touch lead 5 (10) are arranged in sequence, for example, in the order of their serial numbers.

The third touch lead 5 (11) to the third touch lead 5 (20) are grouped into one group leading from the third frame region K3, passing through the second frame region K2 and extending to the second bonding region B2 (B), and are correspondingly connected to the second pin 6 (11) to the second pin 6 (20). Along the direction from the left side to the right side in FIGS. 7 and 37, the third touch lead 5 (11) to the third touch lead 5 (20) are arranged in sequence, for example, in the order of their serial numbers.

At the side of the first bonding region B1 proximate to the display region AA, in the direction from the right side to the left side in FIGS. 7 and 36, the third touch lead 5 (1), the third touch lead 5 (2), . . . , the third touch lead 5 (10) are arranged in sequence in the order of ascending serial numbers, and in the direction from the right side to the left side in FIGS. 7 and 37, the third touch lead 5 (11), the third touch lead 5 (12), . . . , the third touch lead 5 (20) are arranged in sequence in the order of ascending serial numbers.

In some other embodiments, in the display panel 100, as shown in FIGS. 4, 6 and 7, in the third touch lead 5 (1) to the third touch lead 5 (Q), third touch leads 5 with odd serial numbers are grouped into one group leading from the third frame region K3, passing through the first frame region K1 and extending to the second bonding region B2 (A), and are correspondingly connected to the second pin 6 (1) to the second pin 6 (10); and in a region in proximity to a side of the second bonding region B2 (A) proximate to the display region AA, serial numbers of these third touch leads 5 become smaller in sequence along a direction from the first frame region K1 to the reference midline C. In the third touch lead 5 (1) to the third touch lead 5 (Q), third touch leads 5 with even serial numbers are grouped into one group leading from the third frame region K3, passing through the second frame region K2 and extending to the second bonding region B2 (B), and are correspondingly connected to the second pin 6 (11) to the second pin 6 (20); and in a region in proximity to a side of the second bonding region B2 (B) proximate to the display region AA, serial numbers of these third touch leads 5 become larger in sequence along a direction from the second frame region K2 to the reference midline C.

For example, taking an example that the display panel 100 includes 20 third touch leads 5, the 20 third touch leads 5 are divided into an odd-numbered group and an even-numbered group according to their serial numbers. For example, the third touch lead 5 (1), the third touch lead 5 (3), . . . , the third touch lead 5 (19) are grouped into the odd-numbered group, leading from the second frame region K2 and extending to the second bonding region B2 (A), and are correspondingly connected to the second pin 6 (1), the second pin 6 (3), . . . , the second pin 6 (19).

The third touch lead 5 (2), the third touch lead 5 (4), . . . , the third touch lead 5 (20) are grouped into the odd-numbered group, leading from the third frame region K3 and extending to the second bonding region B2 (B), and are correspondingly connected to the second pin 6 (2), the second pin 6 (4), . . . , the second pin 6 (20).

At a side of the second bonding region B2 (A) proximate to the first frame region K1, in the direction from the left side to the right side in FIG. 7, the third touch lead 5 (1), the third touch lead 5 (3), . . . , the third touch lead 5 (19) are arranged in sequence in the order of descending serial numbers.

At a side of the second bonding region B2 (B) proximate to the second frame region K2, in the direction from the right side to the left side in FIG. 7, the third touch lead 5 (2), the third touch lead 5 (4), . . . , the third touch lead 5 (20) are arranged in sequence in the order of ascending serial numbers.

It can be understood that in a case where the plurality of third touch leads 5 are divided into two groups leading from the third frame region K3, and respectively extending to the second bonding region B2 (A) and the second bonding region B2 (B), the grouping leading manner of the plurality of third touch leads 5 includes, but is not limited to, the above situations. The corresponding design is made depending on actual needs, and the foregoing is only an illustration of possible implementations, which is not intended to be a limitation on the specific implementations of the present disclosure.

The following gives descriptions by taking an example that the display panel 100 includes 20 third touch leads 5, in which the third touch lead 5 (1) to the third touch lead 5 (10)

are grouped into one group leading from the third frame region K3 and extending to the second bonding region B2 (A), and the third touch lead 5 (11) to the third touch lead 5 (20) are grouped into one group leading from the third frame region K3 and extending to the second bonding region B2 (B).

In some embodiments, in the display panel 100, as shown in FIGS. 4, 36 and 37, the number of the second pins 6 is Q, and the second pins 6 are respectively connected to the Q second touch channels 12. The Q second pins 6 are numbered in sequence as a second pin 6 (1), a second pin 6 (2), . . . , a second pin 6 (Q). The Q second pins 6 are arranged in K columns, K≥1, and serial numbers of second pins 6 in each column become larger in sequence and are of an arithmetic progression with a difference of K.

The second pin 6 (1) to the second pin 6 (Q−y) are arranged in the second bonding region B2 (A), and the second pin 6 (Q−y+1) to the second pin 6 (Q) are arranged in the second bonding region B2 (B), 1≤y<y+1≤Q.

The Q third touch leads 5 are divided into multiple sub-groups Z3, with each sub-group Z3 including K third touch leads 5 positioned adjacent to each other. A row of second pins 6 includes K second pins 6, and the K third touch leads 5 of each sub-group Z3 are respectively connected to the K second pins 6 in the same row.

For example, K≥2. For multiple second pins 6 in the second bonding region B2 (A), serial numbers of second pins 6 in the same row are consecutive; and for multiple second pins 6 in the second bonding region B2 (B), serial numbers of second pins 6 in the same row are consecutive.

It will be noted that a row of second pins 6 includes at least one second pin 6, and serial numbers of the second pins 6 in the same row are consecutive, which means that in a case where a row of second pins 6 includes multiple (two or more than two) second pins 6, serial numbers of the multiple second pins 6 in the same row are consecutive, moreover the multiple second pins 6 with consecutive serial numbers in the same row may be arranged in sequence along the row direction in the order of their serial numbers, or may be arranged in sequence along the row direction but not in the order of their serial numbers.

The following gives descriptions by taking an example that the number of the second pins 6 included in the display panel 100 is 20, according to the serial numbers of the second touch channels 12 correspondingly connected to the second pins 6, the 20 second pins 6 are numbered in sequence as a second pin 6 (1), a second pin 6 (2), . . . , a second pin 6 (20).

The second pin 6 (1) to the second pin 6 (10) are arranged in the second bonding region B2 (A), and serial numbers of second pins 6 in the same row become smaller in sequence along the direction from the left side to the right side in FIG. 36.

The second pin 6 (11) to the second pin 6 (20) are arranged in the second bonding region B2 (B), and serial numbers of second pins 6 in the same row become smaller in sequence along the direction from the left side to the right side in FIG. 37.

In some examples, as shown in FIGS. 36 and 37, the 10 second pins 6 in the second bonding region B2 (A) are arranged in 2 columns and 5 rows, and the 10 second pins 6 in the second bonding region B2 (B) are arranged in 2 columns and 5 rows. The multiple second pins 6 in each column are arranged in sequence, for example, along the second direction Y, and each column of second pins 6 includes five second pins 6.

The five second pins 6 in the first column of second pins 6 along the direction from the right side to the left side in FIG. 36 are the second pin 6 (1), the second pin 6 (3), the second pin 6 (5), the second pin 6 (7), and the second pin 6 (9) in sequence. The second pin 6 (1), the second pin 6 (3), the second pin 6 (5), the second pin 6 (7), and the second pin 6 (9) may be arranged along the column direction and along the direction from the third frame region K3 to the fourth frame region K4 in the order of ascending serial numbers, these serial numbers being of an arithmetic progression with a difference of 2.

The five second pins 6 in the first column of second pins 6 along the direction from the left side to the right side in FIG. 37 are the second pin 6 (20), the second pin 6 (18), the second pin 6 (16), the second pin 6 (14), and the second pin 6 (12) in sequence. The second pin 6 (20), the second pin 6 (18), the second pin 6 (16), the second pin 6 (14), and the second pin 6 (12) may be arranged along the column direction and along the direction from the third frame region K3 to the fourth frame region K4 in the order of descending serial numbers, these serial numbers being of an arithmetic progression with a difference of 2.

The multiple second pins 6 in the second bonding region B2 (A) and the multiple second pins 6 in the second bonding region B2 (B) may be arranged symmetrically about the second direction Y. In this case, the second pin 6 (1) and the second pin 6 (20) are located in the same row, the second pin 6 (2) and the second pin 6 (19) are located in the same row, the second pin 6 (3) and the second pin 6 (18) are located in the same row, the second pin 6 (4) and the second pin 6 (17) are located in the same row, and the second pin 6 (5) and the second pin 6 (16) are located in the same row. The symmetrical arrangement described here means that an arrangement path of the multiple second pin 6 in the second bonding region B2 (A) from small to large according to their serial numbers and an arrangement path of the multiple second pin 6 in the second bonding region B2 (B) from large to small according to their serial numbers are symmetrical about the second direction Y.

The specific arrangement of the second pins 6 arranged in 2 columns in FIGS. 36 and 37 is for illustrative purposes only and is not intended to be a limitation on the specific implementations of the present disclosure.

Figure 38:
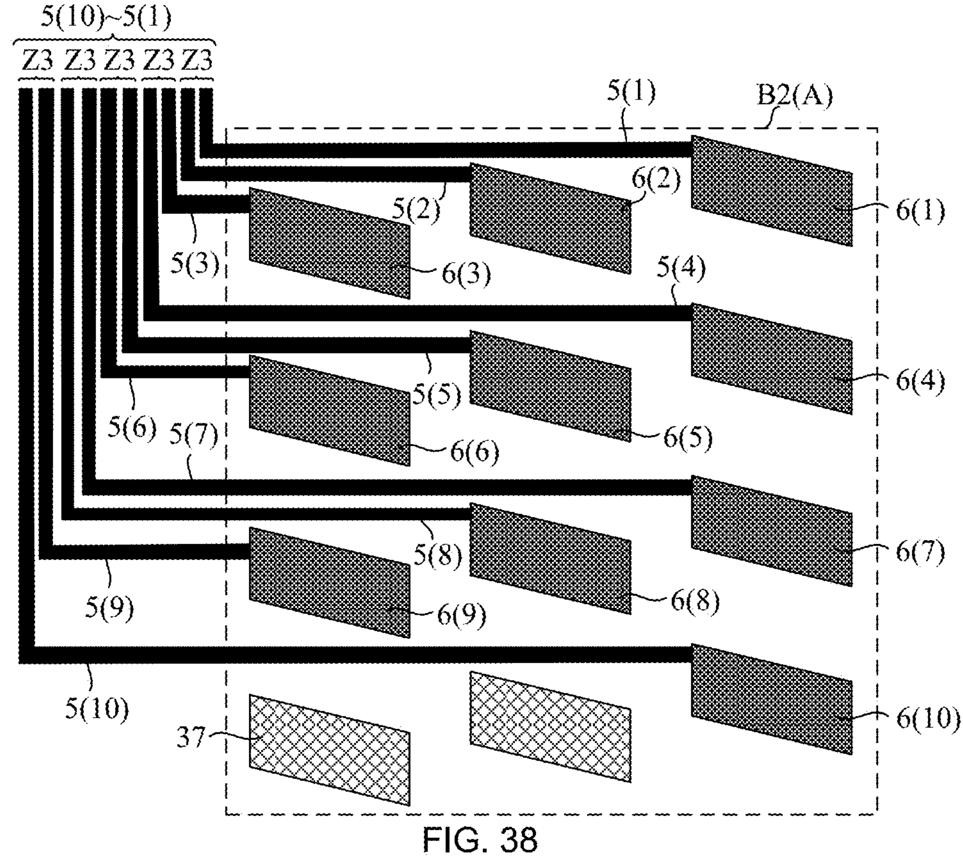
FIG. 38 is an enlarged diagram showing another structure of a second bonding region (A) of a display panel, in accordance with some embodiments.
Figure 39:
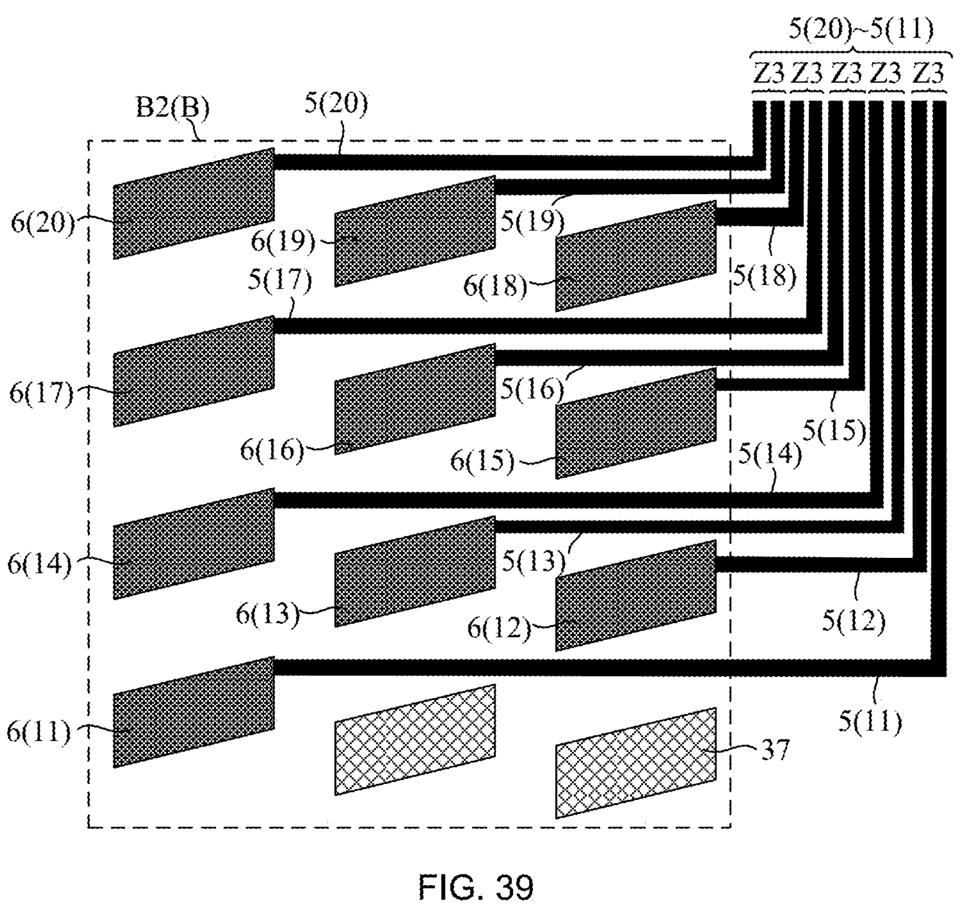
FIG. 39 is an enlarged diagram showing another structure of a second bonding region (B) of a display panel, in accordance with some embodiments.

In some other examples, as shown in FIGS. 38 and 39, the 10 second pins 6 in the second bonding region B2 (A) are arranged in 3 columns and 4 rows, and the 10 second pins 6 in the second bonding region B2 (B) are arranged in 3 columns and 4 rows. The multiple second pins 6 in each column are arranged in sequence, for example, along the second direction Y, and a column of second pins 6 includes three or four second pins 6.

It will be noted that the arrangement direction (column direction) of the multiple second pins 6 in each column may, alternatively, form an included angle being an acute angle with the second direction Y, the multiple second pins 6 in the second bonding region B2 (A) and/or the second bonding region B2 (B) may, alternatively, be arranged in 1 column, 4 columns or more columns, and the second bonding region B2 (A) and the second bonding region B2 (B) may have the same or different numbers of second pins 6. The corresponding design is made depending on actual needs, and the foregoing is only an exemplary illustration of possible implementations, which is not intended to be a limitation on the specific implementations of the present disclosure.

As shown in FIGS. 38 and 39, the multiple second pins 6 in each of the second bonding region B2 (A) and the second bonding region B2 (B) are arranged in, for example, 3 columns and 4 rows. It can be understood that in a case where each position defined by the 3 columns and 4 rows is arranged with a respective second pin 6, the display panel 100 is provided therein with a total of 24 second pins 6, and the display panel 100 includes, for example, 20 second touch channels 12, in which the signal transmission to each of the 20 second touch channels 12 can be implemented with only 20 of these second pins 6. In this case, in the manufacturing process of the display panel 100, when connecting the second touch channels 12 to the second pins 6 correspondingly, the 4 extra second pins 6 may not be connected to a touch signal line (e.g., the third touch lead 5), i.e., transmit no touch signal, serving as dummy pins 37. At least some of these second pins 6 serving as dummy pins 37 (connected to no touch signal line and transmitting no touch signal) may also be accessed to other signals as needed in the subsequent manufacturing process. The specific accessed signals are designed depending on actual needs accordingly, and are only used herein as exemplary illustrations of possible implementations, which are not intended to be a limitation on the specific implementations of the present disclosure.

In some embodiments, as shown in FIGS. 36 to 39, some of the plurality of third touch leads 5 included in the display panel 100 are each connected to a corresponding second pin 6 through a gap between second pins 6 arranged adjacent to each other along the first direction X, and a line width of a portion of the third touch lead 5 located in the gap is less than a line width of a portion thereof located outside the second bonding region B2.

For example, a line width of the third touch lead 5 between two adjacent second pins 6 ranges, for example, from 2 μm to 3 μm, and a line width of the third touch lead 5 located outside the second bonding region B2 (A) and/or the second bonding region B2 (B) is greater than or equal to 3 μm.

For example, a distance between adjacent third touch leads 5 is 13 μm.

In some embodiments, as shown in FIGS. 4, 40, 41 and 42, the plurality of second touch pins 33 in the first bonding region B1 of the display panel 100 are arranged in N rows and Q columns, and in a case where multiple second touch pins 33 in the same column have the same serial number, and the second touch pins 33 are configured to receive second touch signals and transmit the second touch signals to the touch structure 1, the display panel 100 further includes a plurality of fourth touch leads 8 connected to the touch structure 1.

The plurality of fourth touch leads 8 lead from the third frame region K3, and are divided into two groups respectively passing through the first frame region K1 and the second frame region K2, and respectively extending to the fourth pin region J4 and the fifth pin region J5. The two groups of fourth touch leads 8 are respectively connected to the two groups of second touch pins 33.

For example, each fourth touch lead 8 has one end connected to one second touch channel 12, and the other end connected to one column of second touch pins 33.

In some embodiments, as shown in FIG. 40, the number of the fourth touch leads 8 included in the display panel 100 is Q, and the fourth touch leads 8 are respectively connected to the Q second touch channels 12.

For example, a line width of the fourth touch lead 8 is greater than or equal to 10 μm, and a distance between two adjacent fourth touch leads 8 is greater than or equal to 10 μm.

For example, each fourth touch lead 8 has one end connected to one second touch channel 12, and the other end connected to one column of second touch pins 33. The second touch pin 33 is configured to receive a second touch signal and transmit the second touch signal to the touch structure 1 through the fourth touch lead 8.

For example, the second touch pin 33 is configured to receive a second touch signal and transmit the second touch signal to the second touch channel 12 through the fourth touch lead 8.

According to the serial numbers of the second touch channels 12 correspondingly connected to the fourth touch leads 8, the Q fourth touch leads 8 are numbered in sequence as a fourth touch lead 8 (1), a fourth touch lead 8 (2), . . . , a fourth touch lead 8 (Q). According to the serial numbers of the second touch channels 12 correspondingly connected to the second touch pins 33, the Q columns of second touch pins 33 are numbered in sequence as a second touch pin 33 (1), a second touch pin 33 (2), . . . , a second touch pin 33 (Q).

It will be noted that in a case where the Q columns of second touch pins 33 are numbered in sequence as the second touch pin 33 (1), the second touch pin 33 (2), . . . , the second touch pin 33 (Q), second touch pins 33 in the same column have the same serial number, and second touch pins 33 in different columns have different serial numbers.

The second touch channels 12, the fourth touch leads 8 and the second touch pins 33 are correspondingly connected according to their serial numbers. For example, a second touch channel 12 (R), a fourth touch lead 8 (R) and a second touch pin 33 (R) are connected in sequence, $1 \le R \le Q$. Here, the second touch pin 33 (R) is one column of second touch pins 33 (R) with the same serial number.

For example, in a case where multiple second touch pins 33 (R) in the same column have the same serial number, the multiple second touch pins 33 (R) in the same column are electrically connected together, so when connected to any one of the multiple second touch pins 33 (R), a structure can be electrically connected to each of the multiple second touch pins 33 (R) with the same serial number in the column.

The following gives descriptions by taking an example that the touch structure 1 includes 20 second touch channels 12. Along the direction from the first frame region K1 to the second frame region K2, the 20 second touch channels 12 are numbered in sequence as a second touch channel 12 (1), a second touch channel 12 (2), . . . , a second touch channel 12 (20). According to the serial numbers of the second touch channels 12 correspondingly connected to the fourth touch leads 8, the 20 fourth touch leads 8 are numbered in sequence as a fourth touch lead 8 (1), a fourth touch lead 8 (2), . . . , a fourth touch lead 8 (20).

The display panel 100 includes 20 fourth touch leads 8 and 60 second touch pins 33. According to the serial numbers of the second touch channels 12 correspondingly connected to the second touch pins 33, 20 columns of second touch pins 33 are numbered in sequence as a second touch pin 33 (1), a second touch pin 33 (2), . . . , a second touch pin 33 (20), where second touch pins 33 in each column have the same serial number, and a fourth touch lead 8 corresponding to a column of second touch pins 33 with the same serial number is connected to each second touch pin 33 in this column.

It will be noted that a situation in which a fourth touch lead 8 corresponding to a column of second touch pins 33 with the same serial number is connected to each second touch pin 33 in this column may be that these second touch pins 33 with the same serial number in the same column are electrically connected, and upon connecting any one of the second touch pins 33, the fourth touch lead 8 can be electrically connected to all the second touch pins 33 with the same serial number in this column; alternatively, it may be that the fourth touch lead 8 is electrically connected to each of the second touch pins 33 with the same serial number in this column. It can be understood that to ensure the normal transmission of the touch signal, it is sufficient that a touch pin (e.g., the second touch pin 33) is able to be connected to a touch lead CK (e.g., the fourth touch lead 8) corresponding thereto, so as to implement the signal transmission, and the foregoing is only an exemplary illustration and is not intended as a limitation of the present disclosure.

In a case where the display panel 100 includes the plurality of second touch leads 4 and the plurality of fourth touch leads 8, both ends of each second touch channel 12 are connected to a corresponding second touch pin 33 through one second touch lead 4 and one fourth touch lead 8. In this way, the second touch signal is separately transmitted from the second touch pin 33 to both ends of the second touch channel 12, which can reduce the signal path loss of the second touch signal on its transmission path (e.g., the signal distortion during transmission of the second touch signal due to the long transmission path), thereby ensuring the transmission reliability of the second touch signal.

Accordingly, in some embodiments, as shown in FIG. 5, multiple second connection blocks 8 in each second output region S2 of the touch and display driver integration chip 200 are arranged in at least one column along the second direction Y. The second direction Y is perpendicular to the first direction X, or the second direction Y and the first direction X form an included angle being an acute angle. In a case where the multiple second connection blocks 8 are arranged in multiple columns along the second direction Y, the multiple columns of second connection blocks 8 are arranged in parallel and at intervals along the first direction X.

For example, in a case where the included angle between the second direction Y and the first direction X is an acute angle, the included angle formed by the second direction Y and the first direction X is greater than or equal to 60° and less than 90°.

In some examples, the included angle formed by the second direction Y and the first direction X is greater than or equal to 75° and less than 90°.

The following gives descriptions by taking an example that for the multiple second connection blocks 8 arranged in at least one column, each column of second connection blocks 8 has an arrangement direction perpendicular to the first direction X.

For example, in the touch and display driver integration chip 200, two adjacent second connection blocks 8 in the same column have a spacing therebetween, and two adjacent columns of second connection blocks 8 are staggered in the first direction X.

Accordingly, in some embodiments, as shown in FIG. 5, the number of the second connection blocks 8 included in the touch and display driver integration chip 200 is Q, Q≥3. The second connection blocks 8 are numbered in sequence as a second connection block 8 (1), a second connection block 8 (2), . . . , a second connection block 8 (Q), and are configured to respectively output second touch signals to the Q second touch channels 12 of the display panel 100.

The second connection block 8 (1) to the second connection block 8 (Q−y) are arranged in the second output region S2 at the right end of the touch and display driver integration chip 200, 1≤y<y+1≤Q; and along the second direction Y and in a direction from the first output region S1 to the input region R1, serial numbers of second connection blocks 8 in each column become larger in sequence and are of an arithmetic progression.

The second connection block 8 (Q−y+1) to the second connection block 8 (Q) are arranged in the second output region S2 at the left end of the touch and display driver integration chip 200; and along the second direction Y and in a direction from the first output region S1 to the input region R1, serial numbers of second connection blocks 8 in each column become smaller in sequence and are of an arithmetic progression.

For example, the touch and display driver integration chip 200 is correspondingly connected to the display panel 100, and the display panel 100 has a display region AA, a first bonding region B1 located on a side of the display region AA for bonding the touch and display driver integration chip 200, and a second bonding region B2 (A) and a second bonding region B2 (B) located on a side of the first bonding region B1 away from the display region AA, the second bonding region B2 (A) and the second bonding region B2 (B) being respectively arranged at two ends of the first bonding region B1. The display panel 100 has a touch structure 1, and the second bonding region B2 (A) and the second bonding region B2 (B) of the display panel 100 are each provided therein with multiple second pins 6. The second pins 6 are configured to receive second touch signals and transmit the second touch signals to the touch structure 1 of the display panel 100, or are configured to be connected to no touch signal line (not to transmit the second touch signal to the touch structure 1).

In some examples, the arrangement of the multiple second pins 6 in the second bonding region B2 (A) of the display panel 100 is shown in FIG. 36, and the arrangement of the multiple second pins 6 in the second bonding region B2 (B) of the display panel 100 is shown in FIG. 37. In this case, as shown in FIG. 5, the two second output regions S2 of the touch and display driver integration chip 200 are each provided therein with, for example, 10 second connection blocks 8, i.e., the touch and display driver integration chip 200 includes 20 second connection blocks 8, each of which is configured to output a touch signal.

As shown in FIG. 5, the second connection block 8 (1) to the second connection block 8 (10) are arranged in the second output region S2 at the right end of the touch and display driver integration chip 200. The second connection block 8 (1) to the second connection block 8 (10) are arranged in two columns and five rows. Along the direction from the left side to the right side in FIG. 5, the second connection blocks 8 in the first column are the second connection block 8 (1), the second connection block 8 (3), the second connection block 8 (5), the second connection block 8 (7), and the second connection block 8 (9) in sequence; and the second connection blocks 8 in the second column are the second connection block 8 (2), the second connection block 8 (4), the second connection block 8 (6), the second connection block 8 (8), and the second connection block 8 (10) in sequence. Here, the second connection block 8 (1) and the second connection block 8 (2) are located in the same row.

The second connection block 8 (11) to the second connection block 8 (20) are arranged in the second output region S2 at the left end of the touch and display driver integration chip 200. The second connection block 8 (11) to the second connection block 8 (20) are arranged in two columns and five rows. Along the direction from the left side to the right side in FIG. 5, the second connection blocks 8 in the first column are the second connection block 8 (19), the second connection block 8 (17), the second connection block 8 (15), the second connection block 8 (13), and the second connection block 8 (11) in sequence; and the second connection blocks 8 in the second column are the second connection block 8 (20), the second connection block 8 (18), the second connection block 8 1 (6), the second connection block 8 (14), and the second connection block 8 (12) in sequence. Here, the second connection block 8 (20) and the second connection block 8 (19) are located in the same row.

In some other examples, the arrangement of the multiple second pins 6 in the second bonding region B2 (A) of the display panel 100 is shown in FIG. 38, and the arrangement of the multiple second pins 6 in the second bonding region B2 (B) of the display panel 100 is shown in FIG. 39. In this case, the two second output regions S2 of the touch and display driver integration chip 200 are each provided therein with, for example, 12 second connection blocks 8, i.e., the touch and display driver integration chip 200 includes 24 second connection blocks 8, of which 20 second connection blocks 8 are configured to output touch signals, and 4 second connection blocks 8 are configured not to output any touch signal.

The second connection block 8 (1) to the second connection block 8 (10) are arranged in the second output region S2 at the right end of the touch and display driver integration chip 200, and the second connection block 8 (1) to the second connection block 8 (10) are arranged in three columns and four rows. Along a direction from the right end to the left end of the touch and display driver integration chip 200, the second connection blocks 8 in the first column are the second connection block 8 (1), the second connection block 8 (4), the second connection block 8 (7), and the second connection block 8 (10) in sequence; the second connection blocks 8 in the second column are the second connection block 8 (2), the second connection block 8 (5) and the second connection block 8 (8) in sequence; and the second connection blocks 8 in the third column are the second connection block 8 (3), the second connection block 8 (6) and the second connection block 8 (9) in sequence. Here, the second connection block 8 (1), the second connection block 8 (2) and the second connection block 8 (3) are located in the same row.

The second connection block 8 (11) to the second connection block 8 (20) are arranged in the second output region S2 at the left end of the touch and display driver integration chip 200, and the second connection block 8 (11) to the second connection block 8 (20) are arranged in three columns and four rows. Along a direction from the right end to the left end of the touch and display driver integration chip 200, the second connection blocks 8 in the first column are the second connection blocks 8 (18), the second connection blocks 8 (15) and the second connection blocks 8 (12) in sequence; the second connection blocks 8 in the second column are the second connection blocks 8 (19), the second connection blocks 8 (16) and the second connection blocks 8 (13) in sequence; and the second connection blocks 8 in the third column are the second connection blocks 8 (20), the second connection blocks 8 (17), the second connection blocks 8 (14), and the second connection blocks 8 (11) in sequence. Here, the second connection block 8 (20), the second connection block 8 (19) and the second connection block 8 (18) are located in the same row.

It will be noted that these second connection blocks 8, which are configured not to output any touch signal in the plurality of second connection blocks 8, serve as dummy connection blocks 77. At least some of these second connection blocks 8 serving as dummy connection blocks 77 (not outputting any touch signal) may also be configured to output other signals as needed. The corresponding design is made depending on actual needs, and the foregoing is only an exemplary illustration, which is not intended to be a limitation on the specific implementations of the present disclosure.

The specific arrangement of the plurality of second connection blocks 8 included in the touch and display driver integration chip 200 includes, but is not limited to, the above examples, and the two second output regions S2 of the touch and display driver integration chip 200 may also be provided with different numbers of second connection blocks 8. For example, the second output region S2 at the left end is provided therein with second connection blocks 8, the number of these second connection blocks 8 being a, and the second output region S2 at the right end is provided therein with no second connection block 8, where a is not 0; alternatively, the second output region S2 at the left end is provided therein with second connection blocks 8, the number of these second connection blocks 8 being a, and the second output region S2 at the right end is provided therein with second connection blocks 8, the number of these second connection blocks 8 being b, where a≠b. The corresponding design is made depending on actual needs, and the foregoing is only an exemplary illustration, which is not intended to be a limitation on the specific implementations of the present disclosure. Here, although the same reference character "8" herein is employed for the second connection block and the fourth touch lead in different figures, it should be understood that the second connection block and the fourth touch lead, which are respectively disposed in the touch and display driver integration chip 200 and the display panel 100, are two different types of structures.

In some embodiments, as shown in FIGS. 9 to 19, 32, 33, 41 and 42, the display panel 100 further includes shielding lines 9, located between first touch leads 2 and second touch leads 4 that are adjacent to each other. The plurality of first pins 3 further include a plurality of shielding pins 34, located between first touch pins 31 and second touch pins 33 that are adjacent to each other. A shielding pin 34 is connected to a shielding line 9.

For example, the shielding pin 34 is configured to receive a shielding signal. The shielding signal is, for example, a constant voltage signal, such as a ground signal (GND) or a voltage signal (VDD).

In a case where the first touch pin 31 is configured to receive a first touch signal and transmit the first touch signal to the touch structure 1, and the second touch pin 33 is configured to receive a second touch signal and transmit the second touch signal to the touch structure 1, the shielding pin 34 is arranged between a first touch pin 31 and a second touch pin 33 that are adjacent to each other. In this way, the first touch lead 2 and the second touch lead 4 that are adjacent to each other are separated, and the first touch pin 31 and the second touch pin 33 that are adjacent to each other are separated, by the shielding signal transmitted by the shielding pin 34 and the shielding line 9, so as to prevent crosstalk between the first touch signal and the second touch signal, thereby ensuring the transmission stability and reliability of touch signals (e.g., the first touch signal and/or the second touch signal).

It can be understood that in a case where the second touch pin 33 is configured not to transmit the touch signal, the display panel 100 does not include the second touch lead 4, and the shielding pin 34 may or may not be provided between a first touch pin 31 and a second touch pin 33 that are adjacent to each other. In this case, the plurality of shielding pins 34 provided may be accessed to shielding signals, or may not be accessed to signals, serving as dummy pins 37. At least some of these shielding pins 34 serving as dummy pins 37 (not accessed to the shielding signal) may also be accessed to other signals as needed. The specific accessed signals are designed depending on actual needs accordingly, and are only used herein as exemplary illustrations of possible implementations, which are not intended to be a limitation on the specific implementations of the present disclosure.

Accordingly, in some embodiments, in the touch and display driver integration chip 200, as shown in FIGS. 20 to 31, the plurality of first connection blocks 7 further include a plurality of shielding connection blocks 74.

For example, as shown in FIGS. 20 to 31, the shielding connection blocks 74 are located between first touch connection blocks 71 and second touch connection blocks 73 that are adjacent to each other.

In some examples, the first touch connection block 71 is configured to output a first touch signal, the second touch connection block 73 is configured to output a second touch signal, and the shielding connection block 74 between a first touch connection block 71 and a second touch connection block 73 that are adjacent to each other is configured to output a shielding signal. The shielding signal is, for example, a constant voltage signal, such as a ground signal (GND) or a voltage signal (VDD).

The shielding connection block 74 for outputting a shielding signal is provided between a first touch connection block 71 and a second touch connection block 73 that are adjacent to each other, so as to prevent crosstalk between the first touch signal and the second touch signal, thereby ensuring the transmission stability and reliability of touch signals (the first touch signal and/or the second touch signal).

In some other examples, the first touch connection block 71 is configured to output a first touch signal, and the second touch connection block 73 is configured not to output any touch signal, so no crosstalk problem of touch signals (first touch signal and second touch signal) will occur between the adjacent first touch connection block 71 and second touch connection block 73. In this case, the shielding connection block 74 may not output any shielding signal. In this case, the shield connection block 74 may be configured to transmit no signal, or configured to output other signals as needed.

In some embodiments, in the display panel 100, as shown in FIGS. 18 and 19, in the first bonding region B1, N shielding pins 34 are arranged in a region between sides at where the first pin region J1 and the fourth pin region J4 are proximate to each other, and N×c shielding pins 34 are arranged in a region between sides at where the third pin region J3 and the fifth pin region J5 are proximate to each other, c≥1. In each row of first pins 3, a first touch pin 31 and a second touch pin 33 that are adjacent to each other are provided therebetween with at least one shielding pin 34.

For example, the N shielding pins 34 are arranged in N rows and at least one column.

For example, the shielding pin 34 is configured to receive a shielding signal. The shielding signal is, for example, a constant voltage signal, such as a ground signal (GND) or a voltage signal (VDD).

For example, in each row of first pins 3, a first touch pin 31 and a second touch pin 33 that are adjacent to each other are provided therebetween with two or more than two shielding pins 34.

For example, in a case where the display panel 100 adopts the design as shown in FIGS. 8 to 15, the first pin region J1 and the fourth pin region J4 may be provided therebetween with at least one column of shielding pins 34, and the third pin region J3 and the fifth pin region J5 may also be provided therebetween with at least one column of shielding pins 34. Each row of shielding pins 34 is located between a first touch pin 31 and a second touch pin 33 closest to each other along the row direction. In each row of first pins 3, the first touch pin 31 and the second touch pin 33 that are adjacent to each other are provided therebetween with two or more than two shielding pins 34.

For example, in each row of first pins 3, a first touch pin 31 and a second touch pin 33 that are adjacent to each other are provided therebetween with one shielding pin 34.

In some examples, as shown in FIGS. 8 to 15, in each row of first pins 3, a first touch pin 31 and a second touch pin 33 that are adjacent to each other are provided therebetween with one shielding pin 34. N shielding pins 34 are arranged in N rows and two columns, in which one column of shielding pins 34 is located in the first pin region J1 and is disposed proximate to the fourth pin region J4, and the other column is located in the fourth pin region J4 and is disposed proximate to the first pin region J1.

In some other examples, as shown in FIGS. 16 to 19, in each row of first pins 3, a first touch pin 31 and a second touch pin 33 that are adjacent to each other are provided therebetween with one shielding pin 34. N shielding pins 34 are arranged in N rows and one column between the first pin region J1 and the fourth pin region J4, and N shielding pins 34 are arranged in N rows and one column between the third pin region J3 and the fifth pin region J5.

For example, in a case where the display panel 100 adopts the design as shown in FIGS. 8 to 15, the plurality of first pins 3 are arranged in 3 rows. In each row of first pins 3, a first touch pin 31 and a second touch pin 33 that are adjacent to each other are provided therebetween with one shielding pin 34. A part of the shielding pins 34 are arranged in three rows and divided into two columns that are respectively arranged in the first pin region J1 and the fourth pin region J4, and the other part of the shielding pins 34 are arranged in three rows and divided into two columns that are respectively arranged in the third pin region J3 and the fifth pin region J5. The shielding pin 34 is provided between the first touch pin 31 and the second touch pin 33 that are closest to each other along the row direction.

As another example, in a case where the display panel 100 adopts the design as shown in FIGS. 16 to 19, the plurality of first pins 3 are arranged in 4 rows or 5 rows. In each row of first pins 3, a first touch pin 31 and a second touch pin 33 that are adjacent to each other are provided therebetween with one shielding pin 34. A part of the shielding pins 34 are arranged in four rows or five rows, and arranged in one column between the first pin region J1 and the fourth pin region J4; and the other part of the shielding pins 34 are arranged in four rows or five rows, and arranged in one column between the third pin region J3 and the fifth pin region J5. The shielding pin 34 is provided between the first touch pin 31 and the second touch pin 33 that are closest to each other along the row direction.

The number and specific arrangement of the shielding pins 34 include, but are not limited to, the above examples, which are only used as exemplary illustrations and are not intended to be limitations on the specific implementations of the present disclosure.

In a case where the first touch pin 31 and the second touch pin 33 are both configured to transmit touch signals (e.g., the first touch signal and/or the second touch signal), by providing the shielding pin 34 and configuring the shielding pin

34 to transmit the shielding signal, crosstalk will not be generated between the touch signals transmitted by the first touch pin 31 and the second touch pin 33 that are adjacent to each other, thereby ensuring the transmission stability and reliability of the touch signals.

In a case where the first touch pin 31 is configured to transmit a touch signal and the second touch pin 33 is configured not to be connected to a touch signal line (e.g., the second touch lead 4 and the fourth touch lead 8), the shielding pin 34 may be configured not to be connected to a signal line (e.g., the shielding signal line 9), i.e., not to transmit the shielding signal, serving as a dummy pin 37. Some of shielding pins 34 (the shielding pins 34 that are not connected to the shielding signal line 9 and do not transmit the shielding signal) serving as dummy pins 37 may also be accessed to other signals as needed. The specific accessed signals are designed depending on actual needs accordingly, and are only used herein as exemplary illustrations of possible implementations, which are not intended to be a limitation on the specific implementations of the present disclosure.

Accordingly, in some embodiments, in the touch and display driver integration chip 200, as shown in FIGS. 28 to 31, in the first output region S1, N shielding connection blocks 74 are arranged in a region between sides at where the first connection region L1 and the fourth connection region L4 are proximate to each other, and N shielding connection blocks 74 are arranged in a region between sides at where the third connection region L3 and the fifth connection region L5 are proximate to each other. In each row of first connection blocks 7, a first touch connection block 71 and a second touch connection block 73 that are adjacent to each other are provided therebetween with at least one shielding connection block 74.

For example, the N shielding connection blocks 74 are arranged in N rows and at least one column.

For example, the shielding connection block 74 is configured to output a shielding signal. The shielding signal is, for example, a constant voltage signal, such as a ground signal (GND) or a voltage signal (VDD).

In some examples, as shown in FIGS. 20 to 27, in each row of first connection blocks 7, a first touch connection block 71 and a second touch connection block 73 that are adjacent to each other are provided therebetween with one shielding connection block 74. N shielding connection blocks 74 are arranged in N rows and two columns, in which one column of shielding connection blocks 74 is located in the first connection region L1 and is disposed proximate to the fourth connection region L4, and the other column of shielding connection blocks 74 is located in the fourth connection region L4 and is disposed proximate to the first connection region L1.

In some other examples, as shown in FIGS. 28 to 31, the first connection region L1 and the fourth connection region L4 are provided therebetween with N shielding connection blocks 74, and the third connection region L3 and the fifth connection region L5 are also provided therebetween with N shielding connection blocks 74. In each row of first connection blocks 7, a first touch connection block 71 and a second touch connection block 73 that are adjacent to each other are provided therebetween with one shielding connection block 74.

For example, in a case where the touch and display driver integration chip 200 adopts the design shown in FIGS. 20 to 27, the plurality of first connection blocks 7 are arranged in 3 rows. In each row of first connection blocks 7, a first touch connection block 71 and a second touch connection block 73 that are adjacent to each other are provided therebetween with one shielding connection block 74. A part of the shielding connection blocks 74 are arranged in three rows and divided into two columns that are respectively arranged in the first connection region L1 and the fourth connection region L4, and the other part of the shielding connection blocks 74 are arranged in three rows and divided into two columns that are respectively arranged in the third connection region L3 and the fifth connection region L5. The shielding connection block 74 is provided between the first touch connection block 71 and the second touch connection block 73 that are closest to each other along the row direction.

As another example, in a case where the touch and display driver integration chip 200 adopts the design shown in FIGS. 28 to 31, the plurality of first connection blocks 7 are arranged in 4 rows or 5 rows. In each row of first connection blocks 7, a first touch connection block 71 and a second touch connection block 73 that are adjacent to each other are provided therebetween with one shielding connection block 74. A part of the shielding connection blocks 74 are arranged in four rows or five rows, and arranged in one column between the first connection region L1 and the fourth connection region L4; and the other part of the shielding connection blocks 74 are arranged in four rows or five rows, and arranged in one column between the third connection region L3 and the fifth connection region L5. The shielding connection block 74 is provided between the first touch connection block 71 and the second touch connection block 73 that are closest to each other along the row direction.

The number and specific arrangement of the shielding connection blocks 74 include, but are not limited to, the above examples, which are only used as exemplary illustrations and are not intended to be limitations on the specific implementations of the present disclosure.

In a case where the first touch connection block 71 and the second touch connection block 73 are both configured to output touch signals (e.g., the first touch signal and/or the second touch signal), by providing the shielding connection block 74 and configuring the shielding connection block 74 to output the shielding signal, crosstalk will not be generated between the touch signals output by the first touch connection block 71 and the second touch connection block 73 that are adjacent to each other, thereby ensuring the transmission stability and reliability of the touch signals.

In a case where the first touch connection block 71 is configured to output a touch signal (e.g., the first touch signal) and the second touch connection block 73 is configured not to output a touch signal (e.g., the second touch signal), the shielding connection block 74 may be configured not to output a signal, serving as a dummy connection block 77. At least some of shielding connection blocks 74 serving as dummy connection blocks 77 (that do not output any shielding signal) may also be configured to output other signals as needed. The corresponding design is made depending on actual needs, and the foregoing is only an exemplary illustration of possible implementations, which is not intended to be a limitation on the specific implementations of the present disclosure.

In some embodiments, in the display panel 100, as shown in FIG. 4, the first bonding region B1 further includes a sixth pin region J6 and a seventh pin region J7, which are arranged on both sides of the second pin region J2.

The plurality of first pins 3 further include a plurality of display control pins 35, a plurality of initialization pins 36, and a plurality of groups of dummy pins 37. The display control pins 35 are configured to receive display control signals required for driving an image display, and transmit the display control signals to the display panel 100. The initialization pins 36 are configured to receive initialization signals required for driving an image display, and transmit the initialization signals to the display panel 100. The plurality of groups of dummy pins 37 are configured to be connected to no signal line.

The plurality of display control pins 35 are divided into two groups that are respectively arranged in the sixth pin region J6 and the seventh pin region J7. The initialization pins 36 are divided into two groups that are respectively arranged in the sixth pin region J6 and the seventh pin region J7. Display control pins 35 in the sixth pin region J6 and display control pins 35 in the seventh pin region J7 are both farther away from the reference midline C relative to the initialization pins 36. The display control pins 35 and the initialization pins 36 are provided therebetween with one group of dummy pins 37, the initialization pins 36 and the first touch pins 31 are provided therebetween with one group of dummy pins 37, and the second touch pins 33 and the data pins 32 are provided therebetween with one group of dummy pins 37.

For example, the display control signals include, but are not limited to, a clock signal (CLK), an initialization signal (STV), a first power supply voltage signal (VGH), a second power supply voltage signal (VGL), a reset signal (RST), and the like.

For example, as shown in FIG. 4, the plurality of data pins 32 in the second pin region J2 are arranged in N rows and arranged in multiple columns. The second pin region J2 is further provided therein with at least one group of dummy pins 37, and the at least one group of dummy pins 37 is arranged in N rows and arranged in at least one column.

In a case where the dummy pins 37 in the second pin region J2 are arranged in N rows and arranged in one column, this column of dummy pins 37 is located at a side of any column of data pins 32.

In a case where the dummy pins 37 in the second pin region J2 are arranged in N rows and arranged in multiple columns, at least one column of dummy pins 37 is arranged on a side of at least one column of data pins 32 in multiple columns of data pins 32.

For example, as shown in FIG. 4, the sixth pin region J6 is located at a side of the first pin region J1 away from the second pin region J2, and the seventh pin region J7 is located at a side of the third pin region J3 away from the second pin region J2.

For example, as shown in FIG. 4, multiple display control pins 35 are arranged in N rows and arranged in at least one column. In a case where the multiple display control pins 35 are arranged in multiple columns, one of the columns of display control pins 35 (a column at a side closest to the first frame region K1 of the display panel 100, or a column at a side closest to the second frame region K2 of the display panel 100) includes at least one display control pin 35, and the remaining columns of display control pins 35 each include N display control pins 35. In the display control pins 35 arranged in N rows and arranged in multiple columns, if the number of display control pins 35 included in one column is less than N, a position in this column where no display control pin 35 is arranged may be provided with a dummy pin 37.

It will be noted that the above is a description for the arrangement of multiple display control pins 35 within a single pin region, such as the sixth pin region J6 or the seventh pin region J7.

For example, each display control pin 35 is correspondingly connected to at least one pixel. The display control pin 35 is configured to receive a display control signal required for driving an image display, and transmit the display control signal to the pixel correspondingly connected thereto.

Each display control pin 35 may be connected to one row, one column or one group of pixels.

For example, as shown in FIG. 4, multiple initialization pins 36 are arranged in N rows and arranged in at least one column. In a case where the multiple initialization pins 36 are arranged in multiple columns, one of the columns of initialization pins 36 (a column at a side closest to the first frame region K1 of the display panel 100, or a column at a side closest to the second frame region K2 of the display panel 100) includes at least one initialization pin 36, and the remaining columns of initialization pins 36 each include N initialization pins 36. In the initialization pins 36 arranged in N rows and arranged in multiple columns, if the number of initialization pins 36 included in one column is less than N, a position in this column where no initialization pin 36 is arranged may be provided with a dummy pin 37.

It will be noted that the above is a description for the arrangement of multiple initialization pins 36 within a single pin region, such as the sixth pin region J6 or the seventh pin region J7.

For example, each initialization pin 36 is correspondingly connected to at least one pixel. The initialization pin 36 is configured to receive an initialization signal required for driving an image display, and transmit the initialization signal to the pixel correspondingly connected thereto.

Each initialization pin 36 may be connected to one row, one column or one group of pixels.

For example, a portion of the plurality of groups of dummy pins 37 may also be configured to be accessed to other signals as needed. The corresponding design is made depending on actual needs, and the foregoing is only an exemplary illustration of possible implementations, which is not intended to be a limitation on the specific implementations of the present disclosure.

For example, dummy pins 37 in each group are arranged in N rows and arranged in at least one column.

In a case where dummy pins 37 in each group are arranged in N rows and arranged in multiple columns, some dummy pins 37 in the plurality of groups of dummy pins 37 included in the display panel 100 may also be configured to be accessed to other signals as needed.

The corresponding design is made depending on actual needs, and the foregoing is only an exemplary illustration of possible implementations, which is not intended to be a limitation on the specific implementations of the present disclosure.

Accordingly, in some embodiments, as shown in FIG. 5, in the touch and display driver integration chip 200, the first output region S1 further includes a sixth connection region L6 and a seventh connection region L7, which are arranged on both sides of the second connection region L2. The plurality of first connection blocks 7 further include a plurality of display control connection blocks 75, a plurality of initialization connection blocks 76, and a plurality of groups of dummy connection blocks 77.

The plurality of display control connection blocks 75 are divided into two groups that are respectively arranged in the sixth connection region L6 and the seventh connection region L7, and are configured to output display control signals required for driving an image display.

The plurality of initialization connection blocks 76 are divided into two groups that are respectively arranged in the sixth connection region L6 and the seventh connection region L7, and are configured to output initialization signals required for driving an image display. Display control connection blocks 75 in the sixth connection region L6 and display control connection blocks 75 in the seventh connection region L7 are both farther away from the center of the touch and display driver integration chip 200 relative to the initialization connection blocks 76.

The plurality of groups of dummy connection blocks 77 are configured to output no signal. The display control connection blocks 75 and the initialization connection blocks 76 are provided therebetween with one group of dummy connection blocks 77, the initialization connection blocks 76 and the first touch connection blocks 71 are provided therebetween with one group of dummy connection blocks 77, and the second touch connection blocks 73 and the data connection blocks 72 are provided therebetween with one group of dummy connection blocks 77.

For example, the sixth connection region L6 is located at a side of the first connection region L1 away from the second connection region L2, and the seventh connection region L7 is located at a side of the third connection region L3 away from the second connection region L2.

For example, the display control signals include, but are not limited to, a clock signal (CLK), an initialization signal (STV), a first power supply voltage signal (VGH), a second power supply voltage signal (VGL), a reset signal (RST), and the like.

For example, as shown in FIG. 5, the plurality of data connection blocks 72 in the second connection region L2 are arranged in N rows and arranged in multiple columns. The second connection region L2 is further provided therein with at least one group of dummy connection blocks 77, and the at least one group of dummy connection blocks 77 is arranged in N rows and arranged in at least one column.

In a case where the dummy connection blocks 77 in the second connection region L2 are arranged in N rows and arranged in one column, this column of dummy connection blocks 77 is located at a side of any column of data connection blocks 72.

In a case where the dummy connection blocks 77 in the second connection region L2 are arranged in N rows and arranged multiple columns, at least one column of data connection blocks 72 is arranged at a side of at least one column of data connection blocks 72 in multiple columns of data connection blocks 72.

For example, as shown in FIG. 5, the sixth connection region L6 is located at a side of the first connection region L1 away from the second connection region L2, and the seventh connection region L7 is located at a side of the third connection region L3 away from the second connection region L2.

For example, as shown in FIG. 5, multiple display control connection blocks 75 are arranged in N rows and arranged in at least one column. In a case where the multiple display control connection blocks 75 are arranged in multiple columns, one of the columns of display control connection blocks 75 (a column closest to the right end of the touch and display driver integration chip 200, or a column closest to the left end of the touch and display driver integration chip 200) includes at least one display control connection block 75, and the remaining columns of display control connection blocks 75 each include N display control connection blocks 75. In the display control connection blocks 75 arranged in N rows and arranged in multiple columns, if the number of display control connection blocks 75 included in one column is less than N, a position in this column where no display control connection block 75 is arranged may be provided with a dummy connection block 77.

It will be noted that the above is a description for the arrangement of multiple display control connection blocks 75 within a single pin region, such as the sixth connection region L6 or the seventh connection region L7.

For example, as shown in FIG. 5, multiple initialization connection blocks 76 are arranged in N rows and arranged in at least one column. In a case where the multiple initialization connection blocks 76 are arranged in multiple columns, one of the columns of initialization connection blocks 76 (a column closest to the right end of the touch and display driver integration chip 200, or a column closest to the left end of the touch and display driver integration chip 200) includes at least one initialization connection block 76, and the remaining columns of initialization connection blocks 76 each include N initialization connection blocks 76. In the initialization connection blocks 76 arranged in N rows and arranged in multiple columns, if the number of initialization connection blocks 76 included in one column is less than N, a position in this column where no initialization connection block 76 is arranged may be provided with a dummy connection block 77.

It will be noted that the above is a description for the arrangement of multiple initialization connection blocks 76 within a single pin region, such as the sixth connection region L6 or the seventh connection region L7.

For example, a portion of the plurality of groups of dummy connection blocks 77 may also be configured to output other signals as needed. The corresponding design is made depending on actual needs, and the foregoing is only an exemplary illustration of possible implementations, which is not intended to be a limitation on the specific implementations of the present disclosure.

For example, dummy connection blocks 77 in each group are arranged in N rows and arranged in at least one column.

In a case where dummy connection blocks 77 in each group are arranged in N rows and arranged in multiple columns, some dummy connection blocks 77 in the plurality of groups of dummy connection blocks 77 included in the touch and display driver integration chip 200 may also be configured to output other signals as needed.

The corresponding design is made depending on actual needs, and the foregoing is only an exemplary illustration of possible implementations, which is not intended to be a limitation on the specific implementations of the present disclosure.

Figure 43:
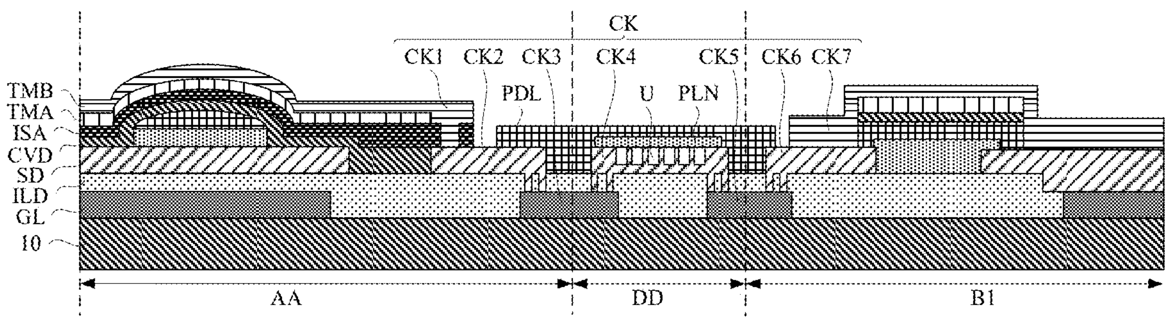
FIG. 43 is a cross-sectional view taken along the section line FF in FIG. 6.

In some embodiments, as shown in FIG. 43, the display panel 100 includes a substrate 10, a gate conductive layer GL, an insulating dielectric layer ILD, a source-drain conductive layer SD, a planarization layer PLN, a pixel defining layer PDL, an encapsulation layer CVD, a thermal insulation layer ISA, a first touch conductive layer TMA, and a second touch conductive layer TMB, which are stacked in sequence.

For example, materials of the gate conductive layer GL, the source-drain conductive layer SD, the first touch conductive layer TMA, and the second touch conductive layer TMB each include a metal material.

For example, an insulating spacer layer (not shown in the figure) is further included between the first touch conductive layer TMA and the second touch conductive layer TMB.

For example, the plurality of first touch leads 2 are located in the first touch conductive layer TMA.

For example, in a case where the display panel 100 includes a plurality of second touch leads 4, the plurality of second touch leads 4 are located in the second touch conductive layer TMB.

For example, in a case where the display panel 100 includes a plurality of third touch leads 5, the plurality of third touch leads 5 are located in the second touch conductive layer TMB.

For example, in a case where the display panel 100 includes a plurality of fourth touch leads 8, the plurality of fourth touch leads 8 are located in the second touch conductive layer TMB.

As shown in FIG. 43, each touch lead CK, e.g., the first touch lead 2, the second touch lead 4, the third touch lead 5, or the fourth touch lead 8, is divided into multiple sub-portions connected in sequence, and at least two of the multiple sub-portions of each touch lead CK are located in different film layer structures.

For example, a portion of the touch lead CK located in the bending region DD is provided with multiple openings U penetrating through or half-penetrating the touch lead CK from the upper surface of the touch lead CK.

By providing the multiple openings U, in the manufacturing process of the display panel 100, when the first bonding region B1 is bent toward the non-display surface of the display panel 100 opposite to the display surface, the stress on the touch lead during bending can be dispersed through the multiple openings U, thereby preventing the touch lead from breaking under the influence of stress.

In some examples, as shown in FIG. 43, a first sub-portion CK1 of each touch lead CK is located in the first touch conductive layer TMA or the second touch conductive layer TMB and located in the display region AA. The first sub-portion CK1 has one end connected to the touch structure 1, and the other end connected to a second sub-portion CK2.

The second sub-portion CK2 of the touch lead CK is located in the source-drain conductive layer SD and located in the display region AA. The second sub-portion CK2 has one end connected to the first sub-portion CK1, and the other end connected to a third sub-portion CK3.

The third sub-portion CK3 of the touch lead CK is located in the gate conductive layer GL and located at the junction between the display region AA and the bending region DD. The third sub-portion CK3 has one end located in the display region AA and connected to the second sub-portion CK2, and the other end extending to the bending region DD.

A fourth sub-portion CK4 of the touch lead CK is located in the source-drain conductive layer SD and located in the bending region DD. The fourth sub-portion CK4 has one end connected to the third sub-portion CK3, and the other end connected to a fifth sub-portion CK5. The fourth sub-portion CK4 is provided with, for example, the multiple openings U penetrating through or half-penetrating the fourth sub-portion CK4 from the upper surface of the fourth sub-portion CK4.

The fifth sub-portion CK5 of the touch lead CK is located in the gate conductive layer GL and located at the junction of the bending region DD and the first bonding region B1. The fifth sub-portion CK5 has one end located in the bending region DD and connected to the fourth sub-portion CK4, and the other end extending to the first bonding region B1.

A sixth sub-portion CK6 of the touch lead CK is located in the source-drain conductive layer SD and located in the first bonding region B1. The sixth sub-portion CK6 has one end connected to the fifth sub-portion CK5, and the other end connected to a seventh sub-portion CK7.

The seventh sub-portion CK7 of the touch lead CK is located in the first bonding region B1 and is connected to a driver chip (e.g., the touch and display driver integration chip 200).

With this design, the portion of the touch lead CK located in the bending region DD and the portion proximate to the bending region DD are closer to the substrate 10 than the portion thereof located in the display region AA. In this way, when the display panel 100 is bent along the bending region DD, the touch lead CK is less affected by the stress generated during the bending, so as to reduce the risk of the touch lead CK breaking under the stress generated during the bending, thereby ensuring the stability of the signal transmission of the touch lead CK.

Figure 44:
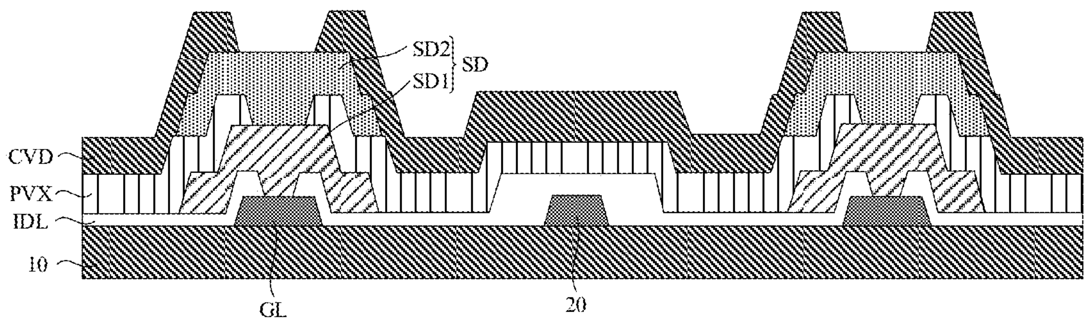
FIG. 44 is a cross-sectional view taken along the section line GG in FIG. 4.

In some embodiments, as shown in FIG. 44, in the display panel 100, the source-drain conductive layer SD may be a source-drain metal layer SD, which includes a first source-drain metal layer SD1 and a second source-drain metal layer SD2.

For example, a passivation layer PVX is further included between the first source-drain metal layer SD1 and the second source-drain metal layer SD2.

As shown in FIG. 44, the plurality of pins (e.g., the first pins 3, the second pins 6, etc.) included in the display panel 100 and connected to the driver chip all adopt, for example, a stacked conductive structure, so that each pin includes multiple sub-portions arranged in a stack.

As shown in FIG. 44, each pin includes, for example, a first sub-portion located in the gate conductive layer GL, a second sub-portion located in the first source-drain metal layer SD1, and a third sub-portion located in the second source-drain metal layer SD2.

It can be understood that in a case where the display panel 100 includes the two source-drain metal layers, each pin may include two sub-portions arranged in a stack; and in a case where the display panel 100 further includes other conductive film layer structures, each pin may further include a portion of the conductive film layer structure.

With such a design, the existing film layer structures in the display panel 100 are fully utilized. Without adding the film layer structure, each pin is made to include multiple sub-portions arranged in a stack, so compared to a single-layer conductive structure, the overall resistance of the pin using the stacked-layer conductive structure is smaller, with a better electrical conductivity, which is more conducive to the stability of the signal transmission, and is conducive to lowering the power consumption of the display panel 100.

The connection blocks in the touch and display driver integration chip 200, e.g., the first connection blocks 7 and the second connection blocks 8, may adopt a single-layer conductive structure or a stacked-layer conductive structure. In a case where the connection block adopts a stacked-layer conductive structure design, the overall resistance of the single connection block is smaller, with a better electrical conductivity, which is more conducive to the stability of the signal transmission, and is conducive to lowering the power consumption of the touch and display driver integration chip 200. The specific film layer structure refers to the description of the pins in the display panel 100, which will not be repeated here.

The foregoing description is only specific embodiments of the present disclosure, but the scope of protection of the present disclosure is not limited thereto. Any changes or replacements that a person skilled in the art could conceive of within the technical scope of the present disclosure shall be included in the protection scope of the present disclosure.

Therefore, the protection scope of the present disclosure shall be subject to the protection scope of the claims.

The invention claimed is:

1. A touch and display driver integration chip, having a first output region, the first output region comprising a first connection region, a second connection region and a third connection region arranged in sequence along a first direction and in a direction from a right end to a left end of the chip, the first direction being parallel to a length direction of the chip;

the chip comprising a plurality of first connection blocks, arranged in the first output region, wherein the plurality of first connection blocks are arranged in multiple columns, with a column direction intersecting the first direction, an included angle formed by the column direction and the first direction being greater than or equal to 60° and less than or equal to 90°, wherein the plurality of first connection blocks comprise:

a plurality of first touch connection blocks, divided into two groups that are respectively arranged in the first connection region and the third connection region, wherein the first touch connection blocks are configured to output first touch signals; and a plurality of data connection blocks, arranged in the second connection region, wherein the data connection blocks are configured to output data signals required for displaying an image;

wherein a number of the plurality of first touch connection blocks is P, P≥3; and the plurality of first touch connection blocks are numbered in sequence as a first touch connection block (1), a first touch connection block (2), . . . , a first touch connection block (P), and are configured to respectively output the first touch signals to P first touch channels of a display panel electrically connected to the chip, wherein the first touch connection block (1) to a first touch connection block (P−x) are arranged in the first connection region, 1≤x<x+1≤P; and along a direction from the right end of the chip to a center of the chip, serial numbers of first touch connection blocks in each row become larger in sequence and are of an arithmetic progression with a difference of N; a first touch connection block (P−x+1) to the first touch connection block (P) are arranged in the third connection region; and along a direction from the left end of the chip to the center of the chip, serial numbers of first touch connection blocks in each row become larger in sequence and are of an arithmetic progression with a difference of N; and each column of first touch connection blocks comprises N first touch connection blocks with consecutive serial numbers;

or a number of the plurality of first touch connection blocks is N×P, P≥3, and the plurality of first touch connection blocks are arranged in N rows and P columns; and P first touch connection blocks in each row are numbered in sequence as a first touch connection block (1), a first touch connection block (2), . . . , a first touch connection block (P), wherein the first touch connection block (1) to a first touch connection block (P−x) are arranged in the first connection region, 1≤x<x+1≤P; and along a direction from the right end of the chip to a center of the chip, serial numbers of the first touch connection blocks become larger in sequence and are consecutive; a first touch connection block (P−x+1) to the first touch connection block (P) are arranged in the third connection region; and along a direction from the left end of the chip to the center of the chip, serial numbers of the first touch connection blocks become larger in sequence and are consecutive; and N first touch connection blocks in each column have a same serial number, and the P columns of first touch connection blocks are configured to respectively output the first touch signals to P first touch channels of a display panel electrically connected to the chip.

2. The chip according to claim 1, wherein the plurality of first connection blocks are arranged in N rows along the column direction, N≥3.

3. The chip according to claim 1, wherein the first output region further comprises a fourth connection region and a fifth connection region; and along the first direction, the fourth connection region and the fifth connection region are respectively located at both sides of the second connection region; and the plurality of first connection blocks further comprise:

a plurality of second touch connection blocks, divided into two groups that are respectively arranged in the fourth connection region and the fifth connection region, wherein the second touch connection blocks are configured to output second touch signals.

4. The chip according to claim 3, wherein a number of the plurality of second touch connection blocks is Q, Q≥3; and the plurality of second touch connection blocks are numbered in sequence as a second touch connection block (1), a second touch connection block (2), . . . , a second touch connection block (Q), and are configured to respectively output the second touch signals to Q second touch channels of a display panel electrically connected to the chip, wherein the second touch connection block (1) to a second touch connection block (Q−y) are arranged in the fourth connection region, 1≤y<y+1≤Q; and along a direction from the right end of the chip to a center of the chip, serial numbers of second touch connection blocks in each row become larger in sequence and are of an arithmetic progression with a difference of N;

a second touch connection block (Q−y+1) to the second touch connection block (Q) are arranged in the fifth connection region; and along a direction from the left end of the chip to the center of the chip, serial numbers of second touch connection blocks in each row become smaller in sequence and are of an arithmetic progression with a difference of N; and each column of second touch connection blocks comprises N second touch connection blocks with consecutive serial numbers;

or a number of the plurality of second touch connection blocks is N×Q, Q≥3, and the plurality of second touch connection blocks are arranged in N rows and Q columns; and Q second touch connection blocks in each row are numbered in sequence as a second touch connection block (1), a second touch connection block (2), . . . , a second touch connection block (Q), wherein the second touch connection block (1) to a second touch connection block (Q−y) are arranged in the fourth connection region, 1≤y<y+1≤Q; and along a direction from the right end of the chip to a center of the chip, serial numbers of the second touch connection blocks become larger in sequence and are consecutive;

a second touch connection block (Q−y+1) to the second touch connection block (Q) are arranged in the fifth connection region; and along a direction from the left end of the chip to the center of the chip, serial numbers of the second touch connection blocks become smaller in sequence and are consecutive; and N second touch connection blocks in each column have a same serial number, and the Q columns of second touch connection blocks are configured to respectively output the second touch signals to Q second touch channels of a display panel electrically connected to the chip.

5. The chip according to claim 3, wherein the plurality of first connection blocks further comprise:

a plurality of shielding connection blocks, located between first touch connection blocks and second touch connection blocks that are adjacent to each other, and the shielding connection blocks being configured to output shielding signals.

6. The chip according to claim 5, wherein the first connection region and the fourth connection region are provided therebetween with N shielding connection blocks of the shielding connection blocks, and the third connection region and the fifth connection region are provided therebetween with N shielding connection blocks of the shielding connection blocks; and in each row of first connection blocks, a first touch connection block and a second touch connection block that are adjacent to each other are provided therebetween with one of the shielding connection blocks; wherein the first output region further comprises a sixth connection region and a seventh connection region, the sixth connection region being located at a side of the first connection region away from the second connection region, and the seventh connection region being located at a side of the third connection region away from the second connection region;

the plurality of first connection blocks further comprise:

a plurality of display control connection blocks, divided into two groups that are respectively arranged in the sixth connection region and the seventh connection region, the display control connection blocks being configured to output display control signals required for driving an image display;

a plurality of initialization connection blocks, divided into two groups that are respectively arranged in the sixth connection region and the seventh connection region, the initialization connection blocks being configured to output initialization signals required for driving the image display, wherein display control connection blocks in the sixth connection region and display control connection blocks in the seventh connection region are both farther away from a center of the chip relative to the initialization connection blocks; and a plurality of groups of dummy connection blocks, the dummy connection blocks being configured to output no signal, wherein the display control connection blocks and the initialization connection blocks are provided therebetween with one of the groups of dummy connection blocks, the initialization connection blocks and the first touch connection blocks are provided therebetween with one of the groups of dummy connection blocks, and the second touch connection blocks and the data connection blocks are provided therebetween with one of the groups of dummy connection blocks.

7. The chip according to claim 1, wherein the chip further comprises two second output regions respectively located at the left end and the right end of the chip;

the chip further comprises a plurality of second connection blocks, wherein the plurality of second connection blocks are divided into two groups that are respectively arranged in the two second output regions, and the second connection blocks are configured to output second touch signals, or configured to output no touch signal;

in a case where the chip comprises the plurality of second connection blocks and further comprises a plurality of second touch connection blocks, at least one of a second touch connection block and a second connection block is configured to output a second touch signal.

8. The chip according to claim 7, wherein a number of the plurality of second connection blocks is Q, $Q \geq 3$; and the plurality of second connection blocks are numbered in sequence as a second connection block (1), a second connection block (2), . . . , a second connection block (Q), and are configured to respectively output the second touch signals to Q second touch channels of a display panel electrically connected to the chip; and the chip further has an input region, arranged opposite to the first output region, wherein the second connection block (1) to a second connection block (Q−y) are arranged in a second output region at the right end of the chip, $1 \leq y < y+1 \leq Q$; and along the second direction and in a direction from the first output region to the input region, serial numbers of second connection blocks in each column become larger in sequence and are of an arithmetic progression; and a second connection block (Q−y+1) to the second connection block (Q) are arranged in a second output region at the left end of the chip; and along the second direction and in the direction from the first output region to the input region, serial numbers of second connection blocks in each column become smaller in sequence and are of an arithmetic progression.

9. A display device, comprising the touch and display driver integration chip as described in claim 1, and a display panel, wherein a display surface of the display panel comprises: a display region, a first frame region and a second frame region respectively located at two opposite sides of the display region in a first direction, a third frame region and a fourth frame region respectively located at two opposite sides of the display region in a second direction, and a first bonding region located at a non-display surface of the display panel opposite to the display surface, the first bonding region and the fourth frame region being arranged on a same side of the display panel; the first direction is perpendicular to the second direction; and the first bonding region comprises a first pin region, a second pin region and a third pin region arranged in sequence along the first direction and in a direction from the first frame region to the second frame region;

the display panel comprises:

a touch structure, arranged in the display region;

a plurality of first touch leads, connected to the touch structure, wherein the plurality of first touch leads are divided into two groups respectively leading from the first frame region and the second frame region, and respectively extending to the first pin region and the third pin region; and a plurality of first pins, arranged in the first bonding region, wherein the plurality of first pins are arranged in multiple columns, with a column direction intersecting the first direction, an included angle formed by the column direction and the first direction being greater than or equal to 60° and less than or equal to 90°, wherein the plurality of first pins comprise:

a plurality of first touch pins, divided into two groups that are respectively arranged in the first pin region and the third pin region, and are respectively connected to the two groups of first touch leads, wherein the first touch pins are configured to receive first touch signals and transmit the first touch signals to touch electrodes of the touch structure through the first touch leads; and a plurality of data pins, arranged in the second pin region, wherein the data pins are configured to receive data signals required for displaying an image and transmit the data signals to pixels of the display panel; and the plurality of first touch connection blocks of the chip are respectively connected to the plurality of first touch pins of the display panel, and the plurality of data connection blocks of the chip are respectively connected to the plurality of data pins of the display panel.

10. A display panel, wherein a display surface of the display panel comprises: a display region, a first frame region and a second frame region respectively located at two opposite sides of the display region in a first direction, a third frame region and a fourth frame region respectively located at two opposite sides of the display region in a second direction, and a first bonding region located at a non-display surface of the display panel opposite to the display surface, the first bonding region and the fourth frame region being arranged on a same side of the display panel; the first direction is perpendicular to the second direction; and the first bonding region comprises a first pin region, a second pin region and a third pin region arranged in sequence along the first direction and in a direction from the first frame region to the second frame region;

the display panel comprises:

a touch structure, arranged in the display region;

a plurality of first touch leads, connected to the touch structure, wherein the plurality of first touch leads are divided into two groups respectively leading from the first frame region and the second frame region, and respectively extending to the first pin region and the third pin region; and a plurality of first pins, arranged in the first bonding region, wherein the plurality of first pins are arranged in multiple columns, with a column direction intersecting the first direction, an included angle formed by the column direction and the first direction being greater than or equal to 60° and less than or equal to 90°, wherein the plurality of first pins comprise:

a plurality of first touch pins, divided into two groups that are respectively arranged in the first pin region and the third pin region, and are respectively connected to the two groups of first touch leads, wherein the first touch pins are configured to receive first touch signals and transmit the first touch signals to touch electrodes of the touch structure through the first touch leads; and a plurality of data pins, arranged in the second pin region, wherein the data pins are configured to receive data signals required for displaying an image and transmit the data signals to pixels of the display panel;

the display panel further comprises two second bonding regions, located at a side of the first bonding region away from the display region and arranged to be corresponding to both ends of the first bonding region, respectively; and the display panel further comprises:

a plurality of third touch leads, connected to the touch structure, wherein the plurality of third touch leads lead from the third frame region, and are divided into two groups respectively passing through the first frame region and the second frame region, and respectively extending to the two second bonding regions; and a plurality of second pins, divided into two groups that are respectively arranged in the two second bonding regions and respectively connected to the two groups of third touch leads, wherein the second pins are configured to receive second touch signals and transmit the second touch signals to touch electrodes of the touch structure through the third touch leads.

11. The display panel according to claim 10, wherein the plurality of first pins are arranged in N rows along the column direction, N≥3.

12. The display panel according to claim 10, wherein the first bonding region further comprises a fourth pin region and a fifth pin region; and along the first direction, the fourth pin region and the fifth pin region are respectively located at both sides of the second pin region;

the display panel further comprises:

a plurality of second touch leads, connected to the touch structure, wherein the plurality of second touch leads lead from the fourth frame region, and are divided into two groups respectively extending to the fourth pin region and the fifth pin region; and the plurality of first pins further comprise:

a plurality of second touch pins, divided into two groups that are respectively arranged in the fourth pin region and the fifth pin region, and are respectively connected to the two groups of second touch leads, wherein the second touch pins are configured to receive second touch signals and transmit the second touch signals to touch electrodes of the touch structure through the second touch leads.

13. The display panel according to claim 12, wherein the touch structure comprises Q second touch channels arranged in parallel and at intervals along the first direction, Q≥3, with each second touch channel extending along the second direction; and a number of the plurality of second touch leads is Q, and the plurality of second touch leads are respectively connected to the Q second touch channels; and a number of the plurality of second touch pins is Q, and the plurality of second touch pins are respectively connected to the Q second touch leads; and the Q second touch pins are numbered in sequence as a second touch pin (1), a second touch pin (2), . . . , a second touch pin (Q), wherein the Q second touch leads are divided into multiple sub-groups, with each sub-group comprising N second touch leads positioned adjacent to each other; a column of second touch pins comprises N second touch pins, the N second touch leads of each sub-group are respectively connected to N second touch pins in one column, and serial numbers of N second touch pins in each column are consecutive;

the second touch pin (1) to a second touch pin (Q−y) are arranged in the fourth pin region, 1≤y<y+1≤Q; and along a direction from the first frame region to a reference midline, serial numbers of second touch pins in each row become larger in sequence and are of an arithmetic progression with a difference of N, the reference midline being a midline of the display panel along the second direction; and a second touch pin (Q−y+1) to the second touch pin (Q) are arranged in the fifth pin region; and along a direction from the second frame region to the reference midline, serial numbers of second touch pins in each row become smaller in sequence and are of an arithmetic progression with a difference of N;

or the touch structure comprises Q second touch channels arranged in parallel and at intervals along the first direction, Q≥3, with each second touch channel extending along the second direction; and a number of the plurality of second touch leads is Q, and the plurality of second touch leads are respectively connected to the Q second touch channels; and a number of the plurality of second touch pins is N×Q, Q≥3, and the plurality of second touch pins are arranged in N rows and Q columns; Q second touch pins in each row are numbered in sequence as a second touch pin (1), a second touch pin (2), . . . , a second touch pin (Q); and N second touch pins in each column have a same serial number, and the Q columns of second touch pins are respectively connected to the Q second touch leads, wherein the second touch pin (1) to a second touch pin (Q−y) are arranged in the fourth pin region, 1≤y<y+1≤Q; and along a direction from the first frame region to a reference midline, serial numbers of the second touch pins become larger in sequence and are consecutive, the reference midline being a midline of the display panel along the second direction; and a second touch pin (Q−y+1) to the second touch pin (Q) are arranged in the fifth pin region; and along a direction from the second frame region to the reference midline, serial numbers of the second touch pins become smaller in sequence and are consecutive.

14. The display panel according to claim 13, wherein along a direction from the first frame region to the second frame region, the Q second touch channels are numbered in sequence as a second touch channel (1), a second touch channel (2), . . . , a second touch channel (Q); and according to the serial numbers of the second touch channels correspondingly connected to the second touch leads, the Q second touch leads are numbered in sequence as a second touch lead (1), a second touch lead (2), . . . , a second touch lead (Q), wherein the second touch lead (1) to a second touch lead (Q−y) lead from the fourth frame region; and in a region in proximity to a side of the first bonding region proximate to the display region, serial numbers of the second touch leads become larger in sequence along the direction from the first frame region to the reference midline; and a second touch lead (Q−y+1) to the second touch lead (Q) lead from the fourth frame region; and in the region in proximity to the side of the first bonding region proximate to the display region, serial numbers of the second touch leads become smaller in sequence along the direction from the second frame region to the reference midline.

15. The display panel according to claim 12, wherein the display panel further comprises shielding lines, located between first touch leads and second touch leads that are adjacent to each other; and the plurality of first pins further comprise a plurality of shielding pins, located between first touch pins and second touch pins that are adjacent to each other, wherein a shielding pin is connected to a shielding line.

16. The display panel according to claim 10, wherein the touch structure comprises P first touch channels arranged in parallel and at intervals along the second direction, P≥3, with each first touch channel extending along the first direction; and a number of the plurality of first touch leads is P, and the plurality of first touch leads are respectively connected to the P first touch channels; and a number of the plurality of first touch pins is P, and the plurality of first touch pins are respectively connected to the P first touch leads; and the P first touch pins are numbered in sequence as a first touch pin (1), a first touch pin (2), . . . , a first touch pin (P), wherein the P first touch leads are divided into multiple sub-groups, with each sub-group comprising N first touch leads positioned adjacent to each other; a column of first touch pins comprises N first touch pins, the N first touch leads of each sub-group are respectively connected to N first touch pins in one column, and serial numbers of N first touch pins in each column are consecutive;

the first touch pin (1) to a first touch pin (P−x) are arranged in the first pin region, 1≤x<x+1≤P; and along a direction from the first frame region to a reference midline, serial numbers of first touch pins in each row become larger in sequence and are of an arithmetic progression with a difference of N, the reference midline being a midline of the display panel along the second direction; and a first touch pin (P−x+1) to the first touch pin (P) are arranged in the third pin region; and along a direction from the second frame region to the reference midline, serial numbers of first touch pins in each row become larger in sequence and are of an arithmetic progression with a difference of N;

or the touch structure comprises P first touch channels arranged in parallel and at intervals along the second direction, P≥3, with each first touch channel extending along the first direction; and a number of the plurality of first touch leads is P, and the plurality of first touch leads are respectively connected to the P first touch channels; and a number of the plurality of first touch pins is N×P, P≥3, and the plurality of first touch pins are arranged in N rows and P columns; P first touch pins in each row are numbered in sequence as a first touch pin (1), a first touch pin (2), . . . , a first touch pin (P); and N first touch pins in each column have a same serial number, and the P columns of first touch pins are respectively connected to the P first touch leads;

the first touch pin (1) to a first touch pin (P−x) are arranged in the first pin region, 1≤x<x+1≤P; and along a direction from the first frame region to a reference midline, serial numbers of the first touch pins become larger in sequence and are consecutive, the reference midline being a midline of the display panel along the second direction; and a first touch pin (P−x+1) to the first touch pin (P) are arranged in the third pin region; and along a direction from the second frame region to the reference midline, serial numbers of the first touch pins become larger in sequence and are consecutive.

17. The display panel according to claim 16, wherein along a direction from the third frame region to the fourth frame region, the P first touch channels are numbered in sequence as a first touch channel (1), a first touch channel (2), . . . , a first touch channel (P); and according to the serial numbers of the first touch channels correspondingly connected to the first touch leads, the P first touch leads are numbered in sequence as a first touch lead (1), a first touch lead (2), . . . , a first touch lead (P), wherein the first touch lead (1) to a first touch lead (P−x) lead from the first frame region;

and in a region in proximity to a side of the first bonding region proximate to the display region, serial numbers of the first touch leads become larger in sequence along the direction from the first frame region to the reference midline; and a first touch lead (P−x+1) to the first touch lead (P) lead from the second frame region; and in the region in proximity to the side of the first bonding region proximate to the display region, serial numbers of the first touch leads become larger in sequence along the direction from the second frame region to the reference midline.

18. The display panel according to claim 10, wherein the touch structure comprises Q second touch channels arranged in parallel and at intervals along the first direction, Q≥3, with each second touch channel extending along the second direction; and a number of the plurality of third touch leads is Q, and the plurality of third touch leads are respectively connected to the Q second touch channels; and a number of the plurality of second pins is Q, and the plurality of second pins are respectively connected to the Q third touch leads, and the Q second pins are numbered in sequence as a second pin (1), a second pin (2), . . . , a second pin (Q), wherein the two second bonding regions are respectively a second bonding region (A) and a second bonding region (B), the second bonding region (A) being located at a side of a reference midline proximate to the first frame region, and the second bonding region (B) being located at a side of the reference midline proximate to the second frame region, the reference midline being a midline of the display panel along the second direction;

the second pin (1) to a second pin (Q−y) are arranged in the second bonding region (A), 1≤y<y+1≤Q; and along the second direction and in a direction from the third frame region to the fourth frame region, serial numbers of second pins in each column become larger in sequence and are of an arithmetic progression; and a second pin (Q−y+1) to the second pin (Q) are arranged in the second bonding region (B); and along the second direction and in the direction from the third frame region to the fourth frame region, serial numbers of second pins in each column become smaller in sequence and are of an arithmetic progression.

19. The display panel according to claim 18, wherein along a direction from the first frame region to the second frame region, the Q second touch channels are numbered in sequence as a second touch channel (1), a second touch channel (2), . . . , a second touch channel (Q); and according to the serial numbers of the third touch channels correspondingly connected to the second touch leads, the Q third touch leads are numbered in sequence as a third touch lead (1), a third touch lead (2), . . . , a third touch lead (Q), wherein the third touch lead (1) to a third touch lead (Q−y) lead from the third frame region and extend toward the first frame region; and in a region in proximity to a side of the second bonding region (A) away from the first bonding region, serial numbers of the third touch leads become smaller in sequence along the first direction and in the direction from the first frame region to the second frame region; and a third touch lead (Q−y+1) to the third touch lead (Q) lead from the third frame region and extend toward the second frame region; and in a region in proximity to a side of the second bonding region (B) away from the first bonding region, serial numbers of the third touch leads become larger in sequence along the first direction and in a direction from the second frame region to the first frame region.

20. The display panel according to claim 18, wherein the display panel further comprises a plurality of fourth touch leads, connected to the touch structure; the plurality of fourth touch leads lead from the third frame region, and are divided into two groups respectively passing through the first frame region and the second frame region, and respectively extending to the fourth pin region and the fifth pin region, wherein each fourth touch lead has one end connected to one of the second touch channels, and the other end connected to one column of second touch pins.

* * * * *